(12) United States Patent
Lee et al.

(10) Patent No.: US 11,265,569 B2
(45) Date of Patent: Mar. 1, 2022

(54) APPARATUS AND METHOD FOR ENCODING MOTION INFORMATION, AND DECODING APPARATUS AND METHOD

(71) Applicant: SAMSUNG ELECTRONICS CO., LTD., Suwon-si (KR)

(72) Inventors: Jin-young Lee, Suwon-si (KR); Woong-il Choi, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/760,566

(22) PCT Filed: Mar. 30, 2018

(86) PCT No.: PCT/KR2018/003827
§ 371 (c)(1),
(2) Date: Apr. 30, 2020

(87) PCT Pub. No.: WO2019/093598
PCT Pub. Date: May 16, 2019

(65) Prior Publication Data
US 2020/0351513 A1    Nov. 5, 2020

Related U.S. Application Data

(60) Provisional application No. 62/583,739, filed on Nov. 9, 2017.

(51) Int. Cl.
*H04N 19/513* (2014.01)
*H04N 19/44* (2014.01)
*H04N 19/176* (2014.01)

(52) U.S. Cl.
CPC ......... *H04N 19/513* (2014.11); *H04N 19/176* (2014.11); *H04N 19/44* (2014.11)

(58) Field of Classification Search
CPC ....... H04N 19/513; H04N 19/96; H04N 19/51
See application file for complete search history.

(56) References Cited

U.S. PATENT DOCUMENTS 9,955,182 B2    4/2018  Kim et al.
10,992,951 B2   4/2021  Jeong et al.
(Continued)

FOREIGN PATENT DOCUMENTS

EP          2 202 985 A1    6/2010
KR     10-2010-0048435 A    5/2010
(Continued)

OTHER PUBLICATIONS

International Search Report and Written Opinion dated Aug. 28, 2018 issued by the International Searching Authority in counterpart International Application No. PCT/KR2018/003827 (PCT/ISA/220, PCT/ISA/210, and PCT/ISA/237).
(Continued)

*Primary Examiner* — Mainul Hasan
(74) *Attorney, Agent, or Firm* — Sughrue Mion, PLLC

(57) ABSTRACT

A method of decoding motion information includes: identifying a type of omission motion information not included in a bitstream from among a plurality of pieces of motion information used to decode a current block that is inter predicted; obtaining the omission motion information by using a predetermined method; and decoding the current block based on the plurality of pieces of motion information including the obtained omission motion information.

3 Claims, 38 Drawing Sheets

(56) References Cited

U.S. PATENT DOCUMENTS

| | | | |
|---|---|---|---|
| 2010/0142617 A1* | 6/2010 | Koo | H04N 19/597 |
| | | | 375/240.16 |
| 2012/0114039 A1 | 5/2012 | Wang | |
| 2012/0195368 A1* | 8/2012 | Chien | H04N 19/895 |
| | | | 375/240.02 |
| 2012/0328015 A1* | 12/2012 | Kim | H04N 19/40 |
| | | | 375/240.13 |
| 2013/0077689 A1* | 3/2013 | Lim | H04N 19/56 |
| | | | 375/240.15 |
| 2014/0307788 A1* | 10/2014 | Lim | H04N 19/61 |
| | | | 375/240.12 |
| 2015/0208077 A1* | 7/2015 | Kim | H04N 19/70 |
| | | | 375/240.16 |
| 2015/0215639 A1* | 7/2015 | Lee | H04N 19/172 |
| | | | 375/240.16 |
| 2016/0241867 A1* | 8/2016 | Sugio | H04N 19/70 |
| 2016/0286230 A1* | 9/2016 | Li | H04N 19/176 |
| 2017/0105021 A1* | 4/2017 | Lim | H04N 19/52 |
| 2017/0332078 A1* | 11/2017 | Lim | H04N 19/513 |
| 2018/0359483 A1* | 12/2018 | Chen | H04N 19/44 |
| 2019/0246103 A1* | 8/2019 | Jun | H04N 19/119 |
| 2019/0373252 A1* | 12/2019 | Moon | H04N 19/573 |
| 2020/0045305 A1* | 2/2020 | Jang | H04N 19/96 |

FOREIGN PATENT DOCUMENTS

| | | |
|---|---|---|
| KR | 10-2013-0002242 A | 1/2013 |
| KR | 10-2014-0135307 A | 11/2014 |
| KR | 10-2017-0078672 A | 7/2017 |
| WO | 2016/160609 A1 | 10/2016 |

OTHER PUBLICATIONS

Communication dated May 11, 2020 issued by the Korean Intellectual Property Office in counterpart Korean Application No. 10-2020-7006645.

Jianle Chen et al., "Algorithm Description of Joint Exploration Test Model 3", Joint Video Exploration Team (JVET) of ITU-T SG 16 WP 3 and ISO/IEC JTC 1/SC 29/WG 11, Document: JVET-C1001_v3, Jun. 1, 2016, 38 pages total.

Communication dated Apr. 15, 2021 issued by the Korean Intellectual Property Office in counterpart Korean Application No. 10-2020-7032751.

Communication dated Jun. 16, 2021 issued by the European Intellectual Property Office in counterpart European Application No. 18875061.6.

Steffen Kamp et al., "Decoder Side Motion Vector Derivation for Inter Frame Video Coding", 15th IEEE International Conference on Image Processing, ICIP 2008, IEEE, Oct. 12, 2008, pp. 1120-1123, 4 pages total, XP031374203.

* cited by examiner

FIG. 4
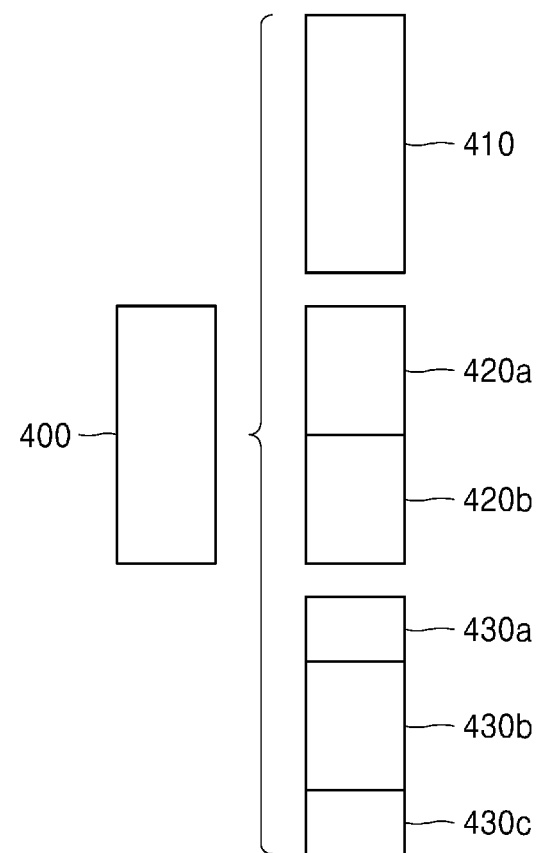
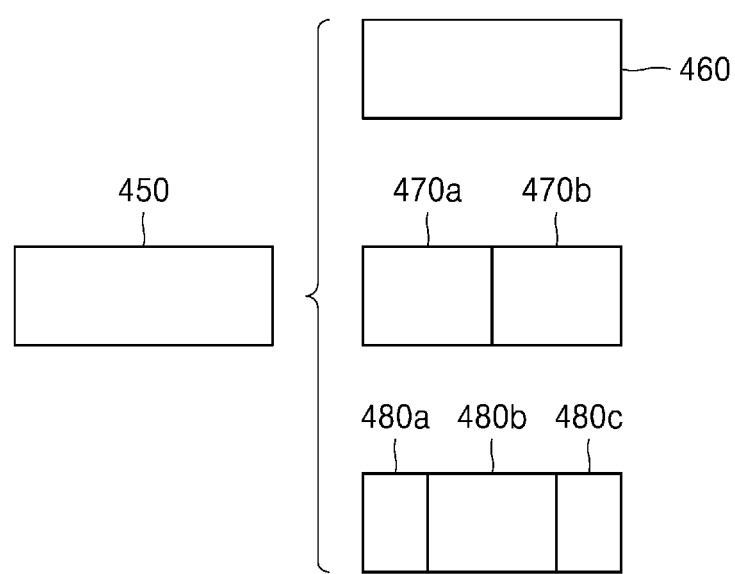

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 18

| SQUARE BLOCK | |
|---|---|
| (00)b | □ |
| (01)b | ⊞ |
| (10)b | ⊟ |
| (11)b | ⊡ |

| NON-SQUARE BLOCK | | |
|---|---|---|
| (0)b | ▭ | ▯ |
| (10)b | ⊟ | ⊡ |
| (11)b | ⊟ | ⊡ |

FIG. 19

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

| OMISSION MODE | OMISSION MOTION INFORMATION |
|---|---|
| MODE 1 | Ref_idx, MVP_idx |
| MODE 2 | Ref_idx |
| MODE 3 | Ref_idx, MVP_idx, MVD |

FIG. 32

| OMISSION MODE | OMISSION MOTION INFORMATION |
|---|---|
| MODE 1 | . |
| MODE 2 | MVD0 |
| MODE 3 | MVD1 |

FIG. 35

```
coding_unit( x0, y0, log2width, log2height ) {
a ─┤   if( slice_type != I &&
       !(log2width <= LOG2_MIN_CU && log2height <= LOG2_MIN_CU) {
b ─┤     cu_skip_flag[ x0 ][ y0 ]
c ─┤     if( cu_skip_flag[ x0 ][ y0 ] ) {
           cu_skip_umve[ x0 ][ y0 ]
           if( cu_skip_umve[ x0 ][ y0 ] ) {
             cu_mode = SKIP_UMVE
             mvp_idx_umve( x0, y0, identical_list0_list1_flag )
           }
           else if( log2width >= 3 && log2height >= 3 ) {
             cu_skip_affine[ x0 ][ y0 ]
             if( cu_skip_affine[ x0 ][ y0 ] ) {
               cu_mode = SKIP_AFFINE
             }
             else {
               mvp_idx[ x0 ][ y0 ]
               cu_mode = SKIP
             }
           }
           else {
             mvp_idx[ x0 ][ y0 ]
             cu_mode = SKIP
           }
         }
d ─┤     else {
e ─┤       pred_mode_flag[ x0 ][ y0 ]
           cu_mode = pred_mode_flag[ x0 ][ y0 ]
f ─┤       if( pred_mode_flag[x0][y0] != MODE_INTRA )
g ─┤         pred_mvr_idx[ x0 ][ y0 ]
         }
       }
```

FIG. 36
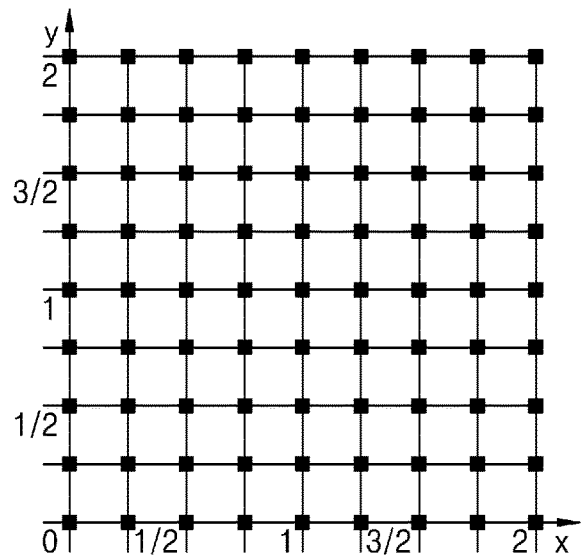
(a) 1/4-PIXEL UNIT
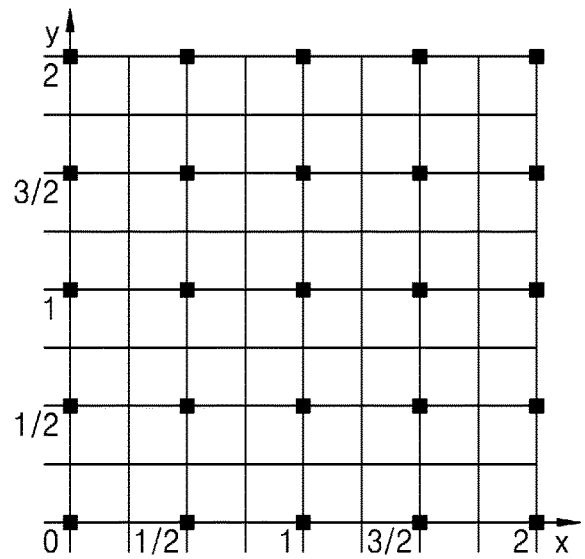
(b) 1/2-PIXEL UNIT
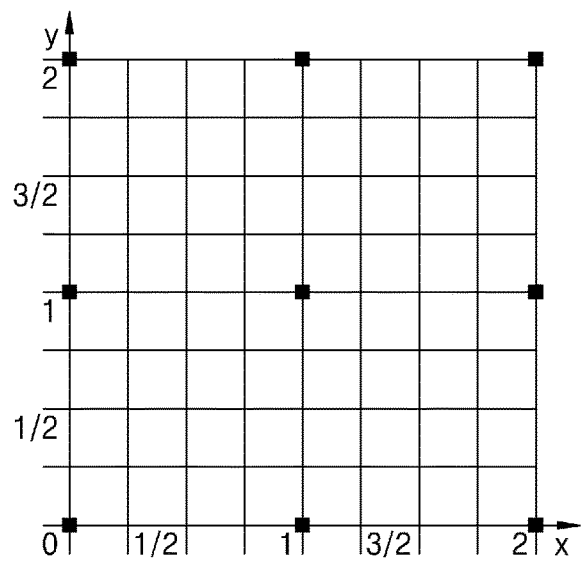
(c) 1-PIXEL UNIT
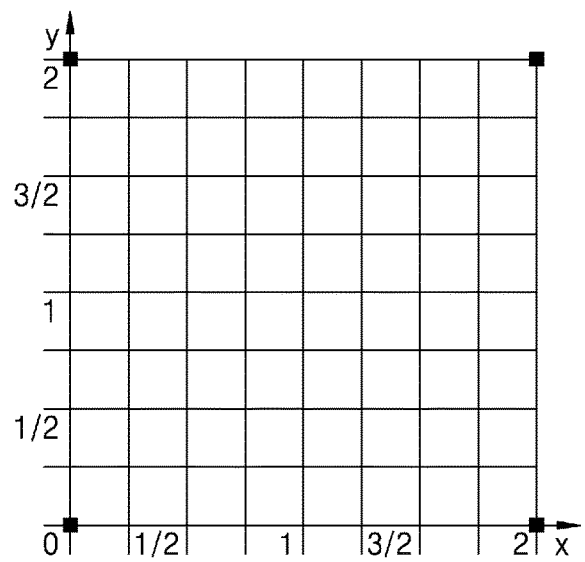
(d) 2-PIXEL UNIT

APPARATUS AND METHOD FOR ENCODING MOTION INFORMATION, AND DECODING APPARATUS AND METHOD

TECHNICAL FIELD

The present disclosure relates to the field of video encoding and decoding. More particularly, the present disclosure relates to a method and apparatus for encoding motion information of a video, and a method and apparatus for decoding motion information of a video.

BACKGROUND ART

In a method of encoding and decoding a video, in order to encode an image, one picture may be split into macroblocks and each of the macroblocks may be prediction encoded by using inter prediction or intra prediction.

Inter prediction refers to a method of compressing an image by removing temporal redundancy between pictures, and a representative example thereof is motion estimation encoding. In motion estimation encoding, blocks of a current picture are predicted by using at least one reference picture. A reference block that is most similar to a current block may be found within a predetermined search range by using a predetermined evaluation function.

A current block is predicted based on a reference block, and a residual block, which is generated by subtracting from the current block a prediction block generated as a prediction result, is encoded. In this case, in order to more accurately perform prediction, interpolation is performed on a search range of the reference picture, sub-pel-unit pixels smaller than integer-pel-unit pixels may be generated, and inter prediction may be performed on the generated sub-pel-unit pixels.

In a codec such as H.264 advanced video coding (AVC) and high efficiency video coding (HEVC), in order to predict a motion vector of a current block, a motion vector of previously encoded blocks adjacent to the current block or blocks included in a previously encoded picture is used as a prediction motion vector of the current block.

DESCRIPTION OF EMBODIMENTS

Solution to Problem

A method of decoding motion information according to an embodiment includes: identifying a type of omission motion information not included in a bitstream from among a plurality of pieces of motion information used to decode a current block that is inter predicted; obtaining the omission motion information by using a predetermined method; and decoding the current block based on the plurality of pieces of motion information including the obtained omission motion information.

Advantageous Effects of Disclosure

An apparatus and method for encoding motion information according to an embodiment, and an apparatus and method for decoding motion information may reduce the number of bits by omitting some of various pieces of motion information needed to decode an inter predicted block.

BRIEF DESCRIPTION OF DRAWINGS

In order to more fully understand the accompanying drawings, a brief explanation of each drawing is provided.

FIG. 4 illustrates a process of determining at least one coding unit by splitting a non-square coding unit, according to an embodiment.

FIG. 13 illustrates a process of determining a depth of a coding unit as a shape and a size of the coding unit change, when the coding unit is recursively split such that a plurality of coding units are determined, according to an embodiment.

FIG. 18 illustrates various shapes of a coding unit determinable based on split shape information representable as a binary code, according to an embodiment.

FIG. 19 illustrates other shapes of a coding unit determinable based on split shape information representable as a binary code, according to an embodiment.

FIG. 23 illustrates an index according to a Z-scan order of a coding unit, according to an embodiment.

FIGS. 31 and 32 are diagrams illustrating omission motion information corresponding to a motion information omission mode.

FIG. 35 illustrates syntax for obtaining information indicating a motion vector resolution (MVR) of a current block.

FIG. 36 is a diagram illustrating positions of pixels that may be indicated by motion vectors according to a ¼ pixel unit MVR, a ½ pixel unit MVR, a 1 pixel unit MVR, and a 2 pixel unit MVR when a minimum MVR selectable for a current block is the ¼ pixel unit MVR.

BEST MODE

Figure 1:
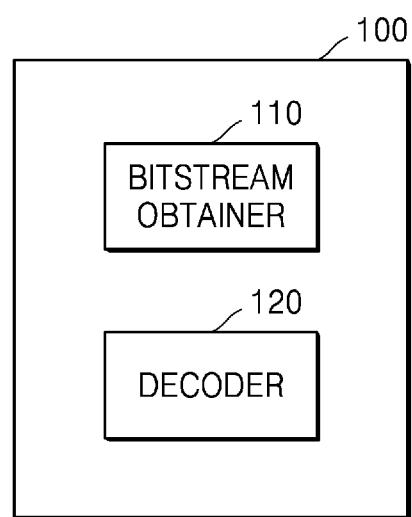
FIG. 1 is a block diagram of an image decoding apparatus capable of decoding an image based on at least one of block shape information and split shape information, according to an embodiment.

A method of decoding motion information according to an embodiment includes: identifying a type of omission motion information not included in a bitstream from among a plurality of pieces of motion information used to decode a current block that is inter predicted; obtaining the omission motion information by using a predetermined method; and decoding the current block based on the plurality of pieces of motion information including the obtained omission motion information.

The omission motion information may be obtained based on, while determining whether there exists motion information of a plurality of candidate blocks spatially or temporally related to the current block according to a priority order, motion information of a candidate block whose motion information is first determined to exist.

The omission motion information may be obtained by combining pieces of motion information of a plurality of candidate blocks having motion information from among a plurality of candidate blocks spatially or temporally related to the current block.

The omission motion information may be obtained based on preset base motion information.

The omission motion information may be obtained based on motion information derived through decoder side motion vector derivation (DMVD).

When there are a plurality of pieces of omission motion information, the obtaining of the omission motion information may include obtaining each of the plurality of pieces of omission motion information by using different methods.

The type of the omission motion information may be identified based on at least one of a motion vector resolution of the current block, a prediction direction of the current block, information about the current block, information about a previously decoded neighboring block, and information indicating an omission mode of motion information.

The method may further include obtaining information indicating whether a motion information omission process is applied, wherein, when it is determined that the motion information omission process is applied, the type of the omission motion information is identified.

The information indicating whether the motion information omission process is applied may include at least one of a motion vector resolution of the current block, a prediction direction of the current block, information about the current block, information about a previously decoded neighboring block, and a flag indicating whether the motion information omission process is applied.

When the current block is bidirectionally predicted, the method may further include obtaining information indicating an omission mode of motion information, wherein the omission mode of the motion information includes at least one of a first mode in which a motion vector difference corresponding to a first reference image list is identified as the omission motion information and a second mode in which a motion vector difference corresponding to a second reference image list is identified as the omission motion information.

The plurality of pieces of motion information may include information about a motion vector resolution of the current block and information indicating a prediction motion vector, wherein the method further includes adjusting the prediction motion vector according to the motion vector resolution of the current block.

The method may further include obtaining, from the bitstream, motion information other than the omission motion information from among the plurality of pieces of motion information.

A method of decoding motion information according to an embodiment includes: obtaining information indicating a bidirectional prediction type of a current block that is bidirectionally predicted; and decoding the current block by using motion information other than at least one of a first motion vector difference corresponding to a first reference image list and a second motion vector difference corresponding to a second reference image list from among a plurality of pieces of motion information related to the current block, based on the information indicating the bidirectional prediction type.

An apparatus for decoding motion information according to an embodiment includes: an identifier configured to identify a type of omission motion information not included in a bitstream from among a plurality of pieces of motion information used to decode a current block that is inter predicted; and a decoder configured to obtain the omission motion information by using a predetermined method and decode the current block based on the plurality of pieces of motion information including the obtained omission motion information.

A method of encoding motion information according to an embodiment includes: an identifier configured to identify a type of omission motion information not included in a bitstream from among a plurality of pieces of motion information used to decode a current block that is inter predicted; and a decoder configured to obtain the omission motion information by using a predetermined method and decode the current block based on the plurality of pieces of motion information including the obtained omission motion information.

MODE OF DISCLOSURE

As the present disclosure allows for various changes and numerous embodiments, exemplary embodiments will be illustrated in the drawings and described in detail in the written description. However, this is not intended to limit the present disclosure to particular modes of practice, and it is to be appreciated that all changes, equivalents, and replacements that do not depart from the spirit and technical scope of the present disclosure are encompassed in the present disclosure.

In the description of the present disclosure, certain detailed explanations of the related art are omitted when it is deemed that they may unnecessarily obscure the essence of the present disclosure. Also, numbers (e.g., first and second) used in the description of embodiments of the disclosure are intended to merely distinguish one component from another.

When a component is referred to as being "connected" or "accessed" to or by any other component, it should be understood that the component may be directly connected or accessed to or by the other component, but another new component may also be interposed between them, unless otherwise specifically indicated.

Regarding an element with a suffix such as 'unit' or 'module', two or more elements may be combined into one element or one element may be divided into two or more elements according to functions. In addition, each of respective components to be described below may additionally perform some or all functions among functions which other components take charge of in addition to a primary function which each component takes charge of, and some functions among primary functions which the respective components take charge of may be exclusively performed by other components.

Also, the term 'image' or 'picture' used herein may refer to a still image of a video, or a moving image, i.e., a video itself.

Also, the term 'sample' used herein refers to data that is assigned to a sampling location of an image and is to be processed. For example, pixels in an image of a spatial domain or transform coefficients in a transform domain may be samples. A unit including one or more samples may be defined as a block.

Also, the term 'current block' used herein may refer to a block of a largest coding unit, a coding unit, a prediction unit, or a transform unit of a current image to be encoded or decoded.

Also, the term 'motion vector resolution (MVR)' used herein may refer to the precision of a position of a pixel that may be indicated by a motion vector determined through inter prediction, from among pixels included in a reference image (or an interpolated reference image). When an MVR has an N pixel unit (N is a rational number), it means that a motion vector may have the precision of N pixel unit. For example, an MVR of ¼ pixel unit may mean that a motion vector may indicate a pixel position of a ¼ pixel unit (i.e., a subpixel unit) in an interpolated reference image, and an MVR of 1 pixel unit may mean that a motion vector may indicate a pixel position corresponding to a 1 pixel unit (i.e., an integer pixel unit) in an interpolated reference image.

Also, the term 'candidate MVR' used herein refers to one or more MVRs that may be selected as an MVR of a block, and the term 'candidate block' refers to one or more blocks that are mapped to a candidate MVR and may be used as a block for a prediction motion vector of a block to be inter predicted.

Also, the term 'pixel unit' used herein may be interchangeably used with the terms 'pixel precision' and 'pixel accuracy'.

An image encoding method and apparatus and an image decoding method and apparatus based on transform units and coding units having a tree structure according to an embodiment will be described with reference to FIGS. 1 through 24. An image encoding apparatus 200 and an image decoding apparatus 100 to be described with reference to FIGS. 1 through 24 may respectively include a motion information encoding apparatus 2700 and a motion information decoding apparatus 2500 to be described with reference to FIGS. 25 through 38.

FIG. 1 is a block diagram of the image decoding apparatus 100 capable of decoding an image based on at least one of block shape information and split shape information, according to an embodiment.

Referring to FIG. 1, the image decoding apparatus 100 may include a bitstream obtainer 110 for obtaining predetermined information such as split shape information and block shape information from a bitstream and a decoder 120 for decoding an image by using the obtained information according to an embodiment. When the bitstream obtainer 110 of the image decoding apparatus 100 obtains at least one of the block shape information and the split shape information according to an embodiment, the decoder 120 of the image decoding apparatus 100 may determine at least one coding unit that splits an image based on at least one of the block shape information and the split shape information.

According to an embodiment, the decoder 120 of the image decoding apparatus 100 may determine a shape of a coding unit based on the block shape information. For example, the block shape information may include information indicating whether the coding unit has a square shape or a non-square shape. The decoder 120 may determine the shape of the coding unit by using the block shape information.

According to an embodiment, the decoder 120 may determine which shape the coding unit is to be split into based on the split shape information. For example, the split shape information may indicate information about a shape of at least one coding unit included in the coding unit.

According to an embodiment, the decoder 120 may determine whether the coding unit is split or not split according to the split shape information. The split shape information may include information about at least one coding unit included in the coding unit, and when the split shape information indicates that only one coding unit is included in the coding unit or the coding unit is not split, the decoder 120 may determine that the coding unit including the split shape information is not split. When the split shape information indicates that the coding unit is split into a plurality of coding units, the decoder 120 may split the coding unit into the plurality of coding units included in the coding unit based on the split shape information.

According to an embodiment, the split shape information may indicate the number of coding units into which the coding unit is to be split or a direction in which the coding unit is to be split. For example, the split shape information may indicate that the coding unit is split in at least one of a vertical direction and a horizontal direction or is not split.

Figure 3:
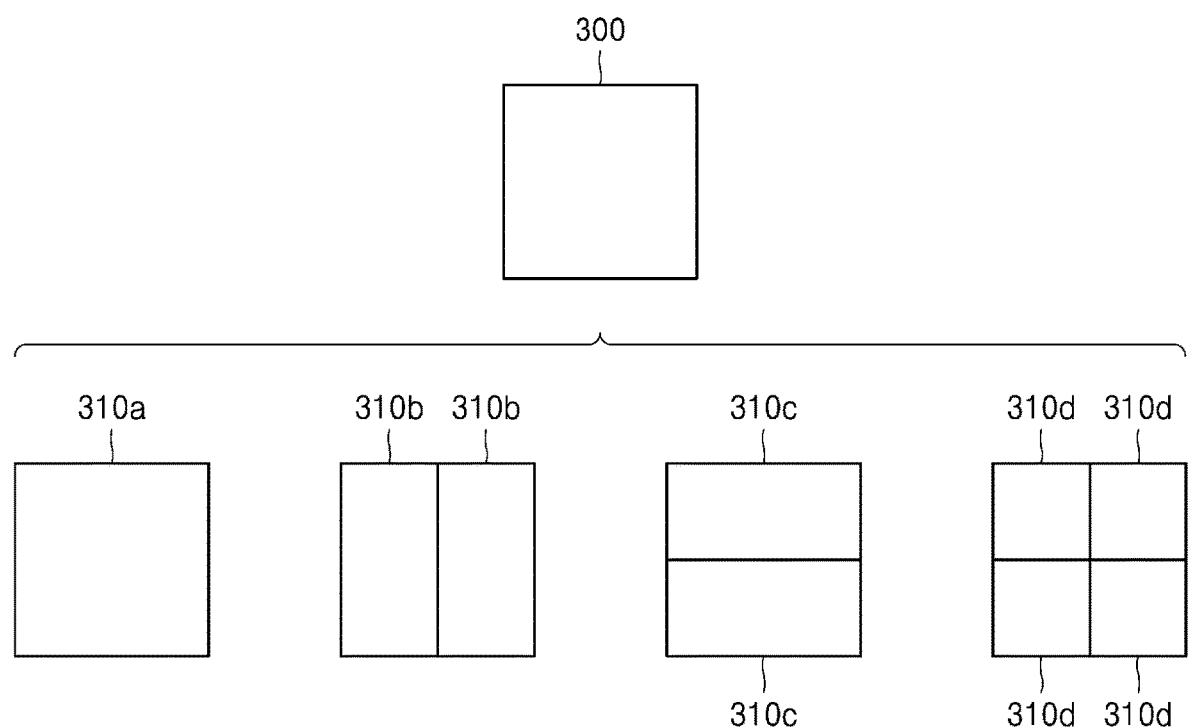
FIG. 3 illustrates a process of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, or N×4N. N may be a positive integer. Block shape information is information indicating at least one of a shape, a direction, a ratio between a width and a height, and a size of a coding unit.

The shape of the coding unit may include a square shape and a non-square shape. When the width and the height of the coding unit are the same (i.e., when the block shape of the coding unit is 4N×4N), the image decoding apparatus 100 may determine the block shape information of the coding unit as a square shape. The image decoding apparatus 100 may determine the shape of the coding unit as a non-square shape.

When the width and the height of the coding unit are different from each other (i.e., when the block shape of the coding unit is 4N×2N, 2N×4N, 4N×N, or N×4N), the image decoding apparatus 100 may determine the block shape information of the coding unit as a non-square shape. When the shape of the coding unit is a non-square shape, the image decoding apparatus 100 may determine the ratio of the width and the height in the block shape information of the coding unit as at least one of 1:2, 2:1, 1:4, 4:1, 1:8, and 8:1. Also, the image decoding apparatus 100 may determine whether the coding unit is in a horizontal direction or a vertical direction, based on a length of the width and a length of the height of the coding unit. Also, the image decoding apparatus 100 may determine the size of the coding unit, based on at least one of the length of the width, the length of the height, and an area of the coding unit.

According to an embodiment, the image decoding apparatus 100 may determine a shape of the coding unit by using the block shape information, and may determine which shape the coding unit is split into by using split shape mode information. That is, a coding unit splitting method indicated by the split shape mode information may be determined according to which block shape is indicated by the block shape information used by the image decoding apparatus 100.

The image decoding apparatus 100 may obtain the split shape mode information from a bitstream. However, the present disclosure is not limited thereto, and the image decoding apparatus 100 and the image encoding apparatus 200 may determine the split shape mode information that is pre-promised based on the block shape information. The image decoding apparatus 100 may determine the split shape mode information that is pre-promised for a largest coding unit or a smallest coding unit. For example, the image decoding apparatus 100 may determine a size of the largest coding unit to be 256×256. The image decoding apparatus 100 may determine that the pre-promised split shape mode information indicates quad splitting. The quad splitting is a split shape mode in which the width and the height of the coding unit are halved. The image decoding apparatus 100 may obtain the coding unit having a size of 128×128 from the largest coding unit having a size of 256×256 based on the split shape mode information. Also, the image decoding apparatus 100 may determine a size of the smallest coding unit to be 4×4. The image decoding apparatus 100 may obtain the split shape mode information indicating "not to perform splitting" for the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, and 310d split based on the split shape mode information indicating a predetermined splitting method.

Referring to FIG. 3, according to an embodiment, the image decoding apparatus 100 may determine two coding units 310b obtained by vertically splitting the current coding unit 300, based on the split shape mode information indicating to vertically perform splitting. The image decoding apparatus 100 may determine two coding units 310c obtained by horizontally splitting the current coding unit 300, based on the split shape mode information indicating to horizontally perform splitting. The image decoding apparatus 100 may determine four coding units 310d obtained by vertically and horizontally splitting the current coding unit 300, based on the split shape mode information indicating to vertically and horizontally perform splitting. However, splitting methods of the square coding unit are not limited to the above-described methods, and the split shape mode information may include various methods. Predetermined splitting methods of splitting the square coding unit will be described in detail below through various embodiments.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine, according to split shape mode information, whether not to split the non-square current coding unit or whether to split the non-square current coding unit by using a predetermined method. Referring to FIG. 4, when the block shape information of a current coding unit 400 or 450 indicates a non-square shape, the image decoding apparatus 100 may determine a coding unit 410 or 460 having the same size as the current coding unit 400 or 450 based on the split shape mode information indicating not to perform splitting, or determine coding units 420a and 420b, 430a to 430c, 470a and 470b, or 480a to 480c split based on the split shape mode information indicating a predetermined splitting method. Predetermined splitting methods of splitting a non-square coding unit will be described in detail below through various embodiments.

According to an embodiment, the image decoding apparatus 100 may determine a splitting method of a coding unit by using the split shape mode information and, in this case, the split shape mode information may indicate the number of one or more coding units generated by splitting the coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450 by splitting the current coding unit 400 or 450 based on the split shape mode information.

According to an embodiment, when the image decoding apparatus 100 splits the non-square current coding unit 400 or 450 based on the split shape mode information, the location of a long side of the non-square current coding unit 400 or 450 may be considered. For example, the image decoding apparatus 100 may determine a plurality of coding units by splitting the long side of the current coding unit 400 or 450, in consideration of the shape of the current coding unit 400 or 450.

According to an embodiment, when the split shape mode information indicates to split (tri split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio between a width and a height of the current coding unit 400 or 450 may be 4:1 or 1:4. When the ratio between the width and the height is 4:1, a length of the width is greater than a length of the height, and thus the block shape information may be horizontal. When the ratio between the width and the height is 1:4, a length of the width is less than a length of the height, and thus the block shape information may be vertical. The image decoding apparatus 100 may determine to split the current coding unit into an odd number of blocks based on the split shape mode information. Also, the image decoding apparatus 100 may determine a split direction of the current coding unit 400 or 450 based on the block shape information of the current coding unit 400 or 450. For example, when the current coding unit 400 is in a vertical direction, the image decoding apparatus 100 may horizontally split the current coding unit 400 and may determine the coding units 430a, 430b, and 430c. Also, when the current coding unit 450 is in a horizontal direction, the image decoding apparatus 100 may vertically split the current coding unit 450 and may determine the coding units 480a, 480b, and 480c.

According to an embodiment, the image decoding apparatus 100 may determine an odd number of coding units included in the current coding unit 400 or 450, and sizes of all of the determined coding units may not be the same. For example, a predetermined coding unit 430b or 480b from among the determined odd number of coding units 430a, 430b, and 430c, or 480a, 480b, and 480c may have a size different from sizes of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into an odd number of blocks, the image decoding apparatus 100 may determine an odd number of coding units included in the current coding unit 400 or 450, and may put a predetermined restriction on at least one coding unit from among the odd number of coding units generated by splitting the current coding unit 400 or 450. Referring to FIG. 4, the image decoding apparatus 100 may allow a decoding method of the coding unit 430b or 480b to be different from that of the other coding units 430a and 430c, or 480a and 480c, wherein the coding unit 430b or 480b is at a center location from among the three coding units 430a, 430b, and 430c, or 480a, 480b, and 480c generated by splitting the current coding unit 400 or 450. For example, the image decoding apparatus 100 may restrict the coding unit 430b or 480b at the center location to be no longer split or to be split only a predetermined number of times, unlike the other coding units 430a and 430c, or 480a and 480c.

Figure 5:
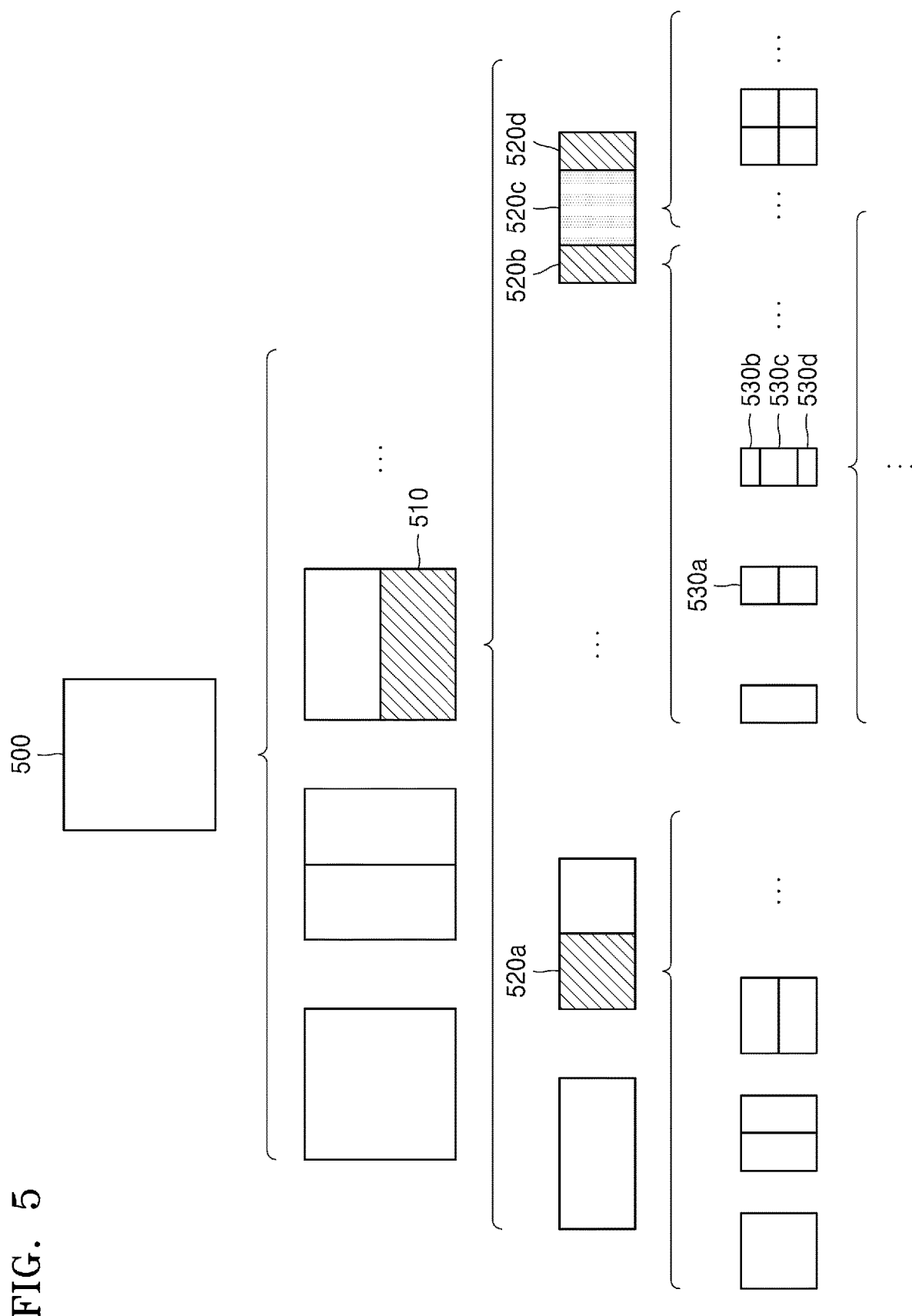
FIG. 5 illustrates a process of splitting a coding unit based on at least one of block shape information and split shape information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that a relationship among the first coding unit, the second coding unit, and the third coding unit applies to the following descriptions.

According to an embodiment, the image decoding apparatus 100 may determine to split or not to split the determined second coding unit 510 into coding units, based on at least one of the block shape information and the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on at least one of the block shape information and the split shape mode information. The image decoding apparatus 100 may obtain at least one of the block shape information and the split shape mode information, and may split a plurality of various-shaped second coding units (e.g., 510) by splitting the first coding unit 500, based on at least one of the obtained block shape information and split shape mode information, and the second coding unit 510 may be split by using a splitting method of the first coding unit 500 based on at least one of the block shape information and the split shape mode information. According to an embodiment, when the first coding unit 500 is split into the second coding units 510 based on at least one of the block shape information and the split shape mode information of the first coding unit 500, the second coding unit 510 may also be split into the third coding units 520a, or 520b, 520c, and 520d based on at least one of the block shape information and the split shape mode information of the second coding unit 510. That is, a coding unit may be recursively split based on at least one of the block shape information and the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit at a center location or a square coding unit) from among an odd number of third coding units 520b, 520c, and 520d determined by splitting the non-square second coding unit 510 may be recursively split. According to an embodiment, the square third coding unit 520b from among the odd number of third coding units 520b, 520c, and 520d may be split in a horizontal direction into a plurality of fourth coding units 530, 530b, 530c, and 530d. A non-square fourth coding unit 530b or 530d from among the plurality of fourth coding units 530a, 530b, 530c, and 530d may be split again into a plurality of coding units. For example, the non-square fourth coding unit 530b or 530d may be split again into an odd number of coding units, A method that may be used to recursively split a coding unit will be described below through various embodiments.

According to an embodiment, the image decoding apparatus 100 may split each of the third coding units 520a, or 520b, 520c, and 520d into coding units, based on at least one of the block shape information and the split shape mode information. Also, the image decoding apparatus 100 may determine not to split the second coding unit 510 based on at least one of the block shape information and the split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain at least one of the block shape information and the split shape mode information, which is used to split a current coding unit, from a predetermined location in the current coding unit.

Figure 6:
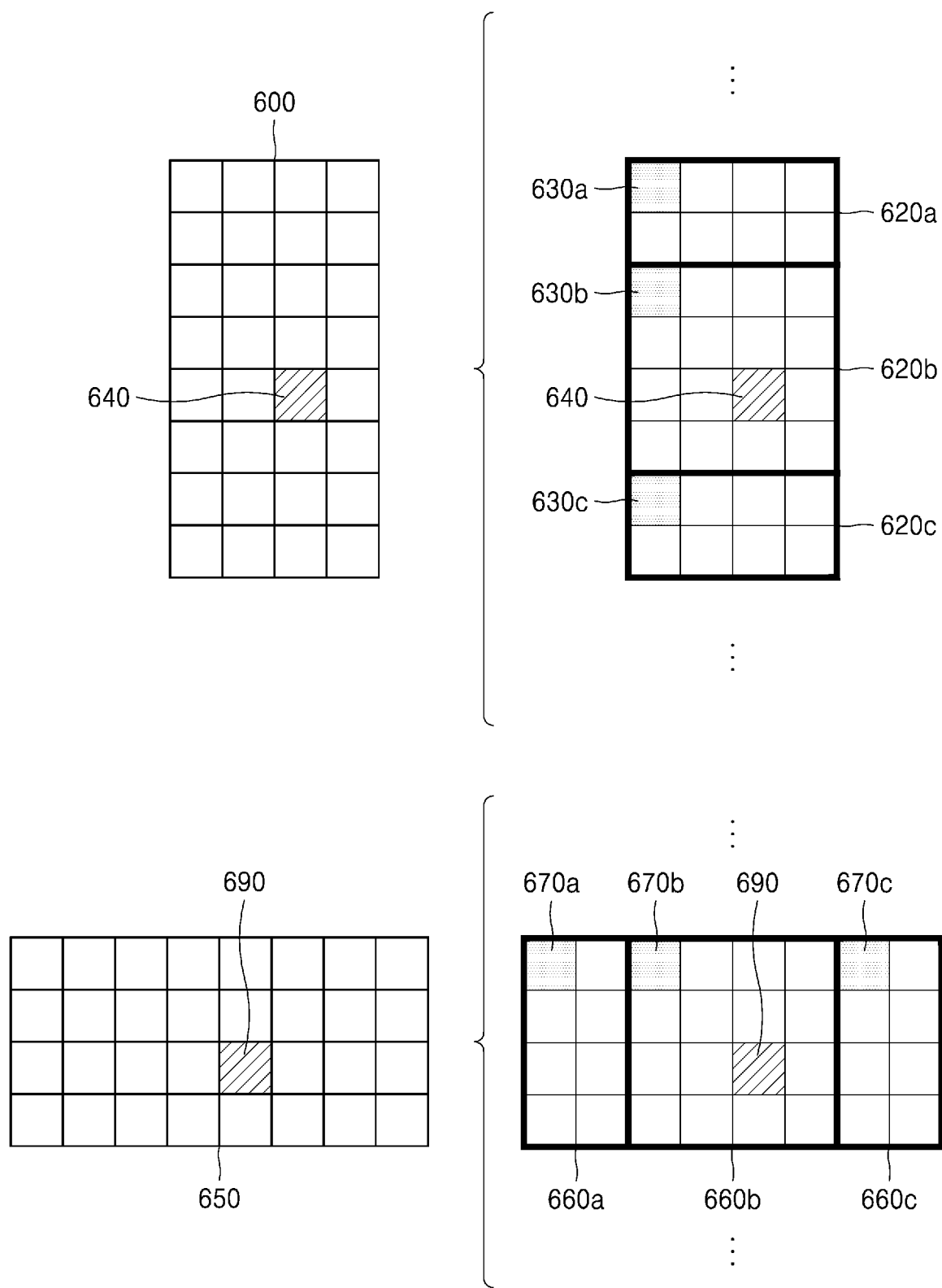
FIG. 6 illustrates a method of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, at least one of block shape information and split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one of the block shape information and the split shape mode information may be obtained, is not limited to the center location in FIG. 6, and may include various locations (e.g., top, bottom, left, right, top left, bottom left, top right, and bottom right locations) included in the current coding unit 600. The image decoding apparatus 100 may obtain at least one of the block shape information and the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods that may be used to select one of a plurality of coding units will be described below through various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of an odd number of coding units to determine a coding unit at a center location from among the odd number of coding units. Referring to FIG. 6, the image decoding apparatus 100 may determine an odd number of coding units 620a, 620b, and 620c or an odd number of coding units 660a, 660b, and 660c by splitting the current coding unit 600 or the current coding unit 650. The image decoding apparatus 100 may determine the coding unit 620b at a center location or the coding unit 660b at a center location by using information about locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top left samples 630a, 630b, and 630c of the coding units 620a, 620b, and 620c.

According to an embodiment, the information indicating the locations of the top left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top left sample 630a of the upper coding unit 620a may include coordinates (xa, ya), information indicating the location of the top left sample 630*b* of the middle coding unit 620*b* may include coordinates (xb, yb), and information indicating the location of the top left sample 630*c* of the lower coding unit 620*c* may include coordinates (xc, yc). The image decoding apparatus 100 may determine the middle coding unit 620*b* by using the coordinates of the top left samples 630*a*, 630*b*, and 630*c* which are included in the coding units 620*a*, 620*b*, and 620*c*, respectively. For example, when the coordinates of the top left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the top left samples 630*a*, 630*b*, and 630*c* may include coordinates indicating absolute locations in the picture, or may use coordinates (dxb, dyb) indicating a relative location of the top left sample 630*b* of the middle coding unit 620*b* and coordinates (dxc, dyc) indicating a relative location of the top left sample 630*c* of the lower coding unit 620*c*, with reference to the location of the top left sample 630*a* of the upper coding unit 620*a*. Also, a method of determining a coding unit at a predetermined location by using coordinates of a sample included in the coding unit as information indicating a location of the sample is not limited to the above-described method, and may include various arithmetic methods capable of using the coordinates of the sample.

According to an embodiment, the image decoding apparatus 100 may split the current coding unit 600 into the plurality of coding units 620*a*, 620*b*, and 620*c*, and may select one of the coding units 620*a*, 620*b*, and 620*c* based on a predetermined criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the widths or heights of the coding units 620*a*, 620*b*, and 620*c* by using the coordinates (xa, ya) indicating the location of the top left sample 630*a* of the upper coding unit 620*a*, the coordinates (xb, yb) indicating the location of the top left sample 630*b* of the middle coding unit 620*b*, and the coordinates (xc, yc) indicating the location of the top left sample 630*c* of the lower coding unit 620*c*. The image decoding apparatus 100 may determine sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be a width of the current coding unit 600. The image decoding apparatus 100 may determine the height of the upper coding unit 620*a* to be yb-ya. According to an embodiment, the image decoding apparatus 100 may determine the width of the middle coding unit 620*b* to be a width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 and the widths or heights of the upper and middle coding units 620*a* and 620*b*. The image decoding apparatus 100 may determine a coding unit, which has a size different from that of the others, based on the determined widths and heights of the coding units 620*a* to 620*c*. Referring to FIG. 6, the image decoding apparatus 100 may determine the middle coding unit 620*b*, which has a size different from the size of the upper and lower coding units 620*a* and 620*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine a width or a height of each of the coding units 660*a*, 660*b*, and 660*c* by using coordinates (xd, yd) that are information indicating a location of a top left sample 670*a* of the left coding unit 660*a*, coordinates (xe, ye) that are information indicating a location of a top left sample 670*b* of the middle coding unit 660*b*, and coordinates (xf, yf) that are information indicating a location of a top left sample 670*c* of the right coding unit 660*c*. The image decoding apparatus 100 may determine sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* as the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 600. According to an embodiment, the image decoding apparatus 100 may determine the width or the height of the right coding unit 660*c* by using the width or the height of the current coding unit 650 and the width and the height of the left coding unit 660*a* and the middle coding unit 660*b*. The image decoding apparatus 100 may determine a coding unit, which has a size different from that of the others, based on the determined widths and heights of the coding units 660*a*, 660*b*, and 660*c*. Referring to FIG. 6, the image decoding apparatus 100 may determine the middle coding unit 660*b*, which has a size different from the size of the left coding unit 660*a* and the right coding unit 660*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above with reference to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a coding unit at a center location, in a splitting operation to determine the coding unit at the center location from among the plurality of coding units determined by splitting the current coding unit.

Referring to FIG. 6, the image decoding apparatus 100 may split the current coding unit 600 into the plurality of coding units 620a, 620b, and 620c based on at least one of the block shape information and the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which at least one of the block shape information and the split shape mode information is obtained. That is, at least one of the block shape information and the split shape mode information of the current coding unit 600 may be obtained from the sample 640 at a center location of the current coding unit 600 and, when the current coding unit 600 is split into the plurality of coding units 620a, 620b, and 620c based on at least one of the block shape information and the split shape mode information, the coding unit 620b including the sample 640 may be determined as the coding unit at the center location. However, information used to determine the coding unit at the center location is not limited to at least one of the block shape information and the split shape mode information, and various kinds of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use at least one of the block shape information and the split shape mode information, which is obtained from a sample at a predetermined location in the current coding unit 600 (e.g., a sample at a center location of the current coding unit 600) to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620b including a sample, from which predetermined information (e.g., at least one of the block shape information and the split shape mode information) may be obtained, from among the plurality of coding units 620a, 620b, and 620c determined by splitting the current coding unit 600, and may put a predetermined restriction on the coding unit 620b. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information may be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the predetermined information may be obtained.

According to an embodiment, when the current coding unit is split into a plurality of coding units, the image decoding apparatus 100 may use at least one of the block shape information and the split shape mode information to determine a coding unit at a predetermined location from among the plurality of coding units. According to an embodiment, the image decoding apparatus 100 may obtain at least one of the block shape information and the split shape mode information from a sample at a predetermined location in a coding unit, and may split the plurality of coding units, which are generated by splitting the current coding unit, by using at least one of the block shape information and the split shape mode information, which is obtained from the sample of the predetermined location in each of the plurality of coding units. That is, a coding unit may be recursively split based on at least one of the block shape information and the split shape mode information, which is obtained from the sample at the predetermined location in each coding unit. An operation of recursively splitting a coding unit has been described above with reference to FIG. 5, and thus detailed descriptions thereof will not be provided here.

According to an embodiment, the image decoding apparatus 100 may determine one or more coding units by splitting the current coding unit, and may determine an order of decoding the one or more coding units based on a predetermined block (e.g., the current coding unit).

Figure 7:
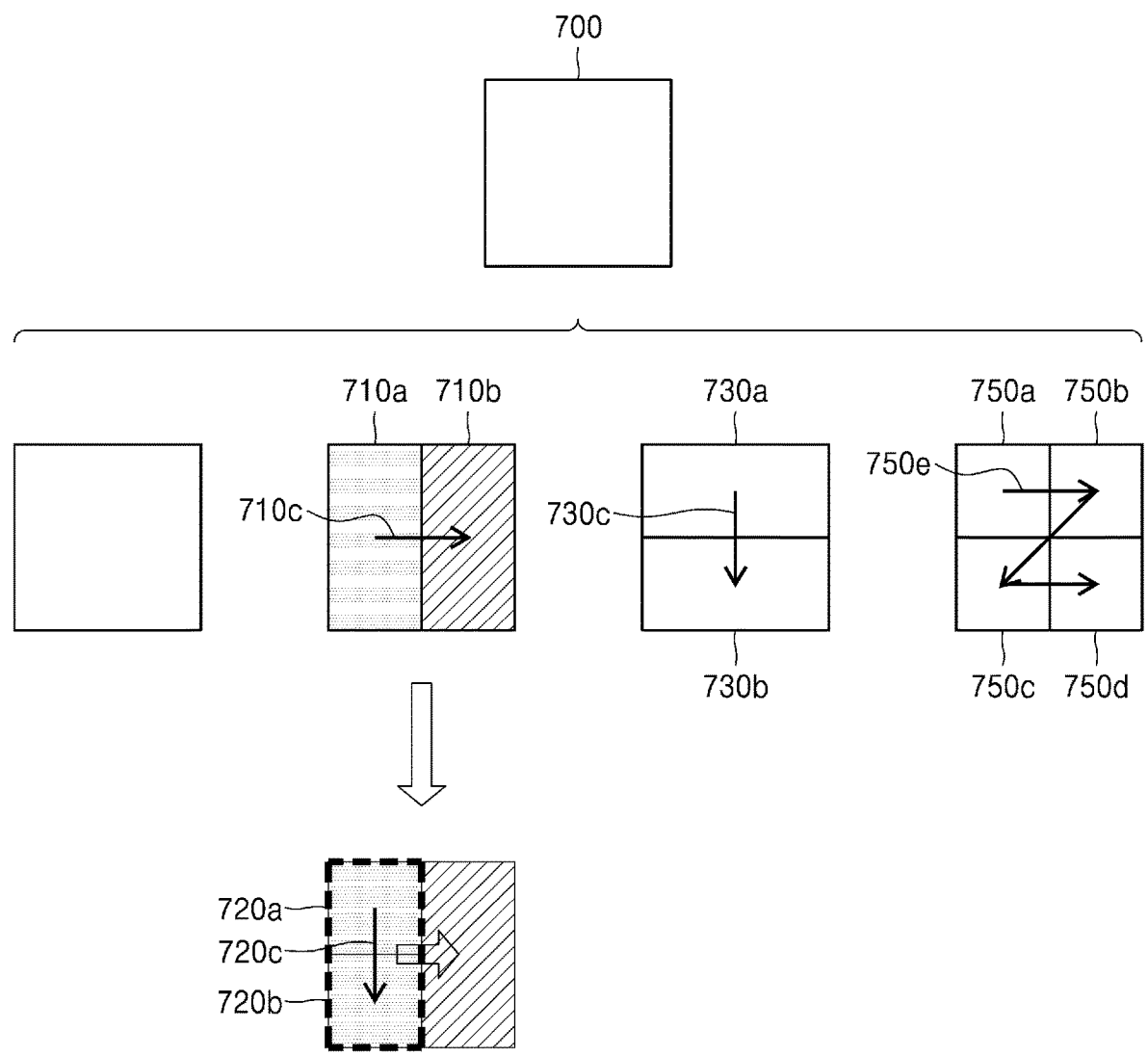
FIG. 7 illustrates an order of processing a plurality of coding units when the plurality of coding units are determined by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on block shape information and split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a predetermined order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of second coding units 710a, 710b, 730a, 730b, 750a, 750b, 750c, and 750d by splitting the first coding unit 700, and may recursively split each of the determined plurality of second coding units 710a, 710b, 730a, 730b, 750a, 750b, 750c, and 750d. A splitting method of the plurality of second coding units 710a, 710b, 730a, 730b, 750a, 750b, 750c, and 750d may correspond to a splitting method of the first coding unit 700. As such, each of the plurality of second coding units 710a, 710b, 730a, 730b, 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 8:
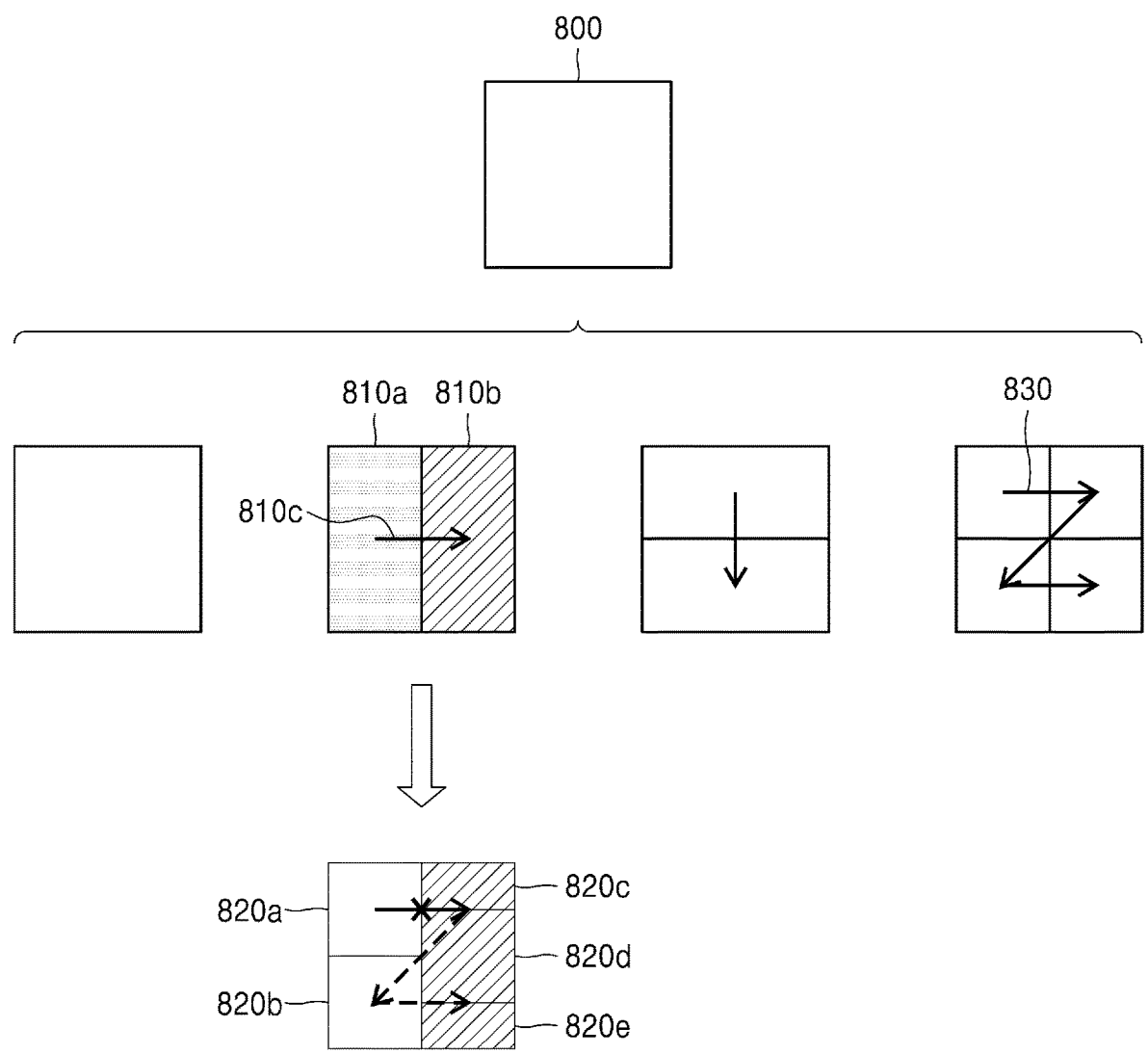
FIG. 8 illustrates a process of determining that a current coding unit is to be split into an odd number of coding units when the coding units are not processable in a predetermined order, according to an embodiment.

FIG. 8 illustrates a process, performed by the image decoding apparatus 100, of determining that a current coding unit is to be split into an odd number of coding units when the coding units are not processable in a predetermined order, according to an embodiment.

According to an embodiment, the image decoding apparatus 100 may determine whether the current coding unit is split into an odd number of coding units, based on obtained block shape information and split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a predetermined order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c, 820d, and 820e is split into an odd number of coding units, based on at least one of block shape information and split shape mode information. For example, the right second coding unit 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may decide whether the third coding units 820c, 820d, and 820e, which are determined by splitting the right second coding unit 810b into an odd number of coding units, satisfy a condition for processing in the predetermined order. According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units

810*a* and 810*b* is divided in half along a boundary of the third coding units 820*a* and 820*b*, and 820*c*, 820*d*, and 820*e*. For example, the third coding units 820*a* and 820*b* determined by dividing the height of the non-square left second coding unit 810*a* in half may satisfy the condition. However, because boundaries of the third coding units 820*c*, 820*d*, and 820*e* determined by splitting the right second coding unit 810*b* into three coding units do not divide the width or height of the right second coding unit 810*b* in half, it may be determined that the third coding units 820*c*, 820*d*, and 820*e* do not satisfy the condition. When the condition is not satisfied as described above, the image decoding apparatus 100 may decide disconnection of a scan order, and determine that the right second coding unit 810*b* is split into an odd number of coding units, based on a result of the decision. According to an embodiment, when a coding unit is split into an odd number of coding units, the image decoding apparatus 100 may put a predetermined restriction on a coding unit at a predetermined location among the split coding units, and the restriction or the predetermined location has been described above through various embodiments and thus detailed descriptions thereof will not be provided here.

Figure 9:
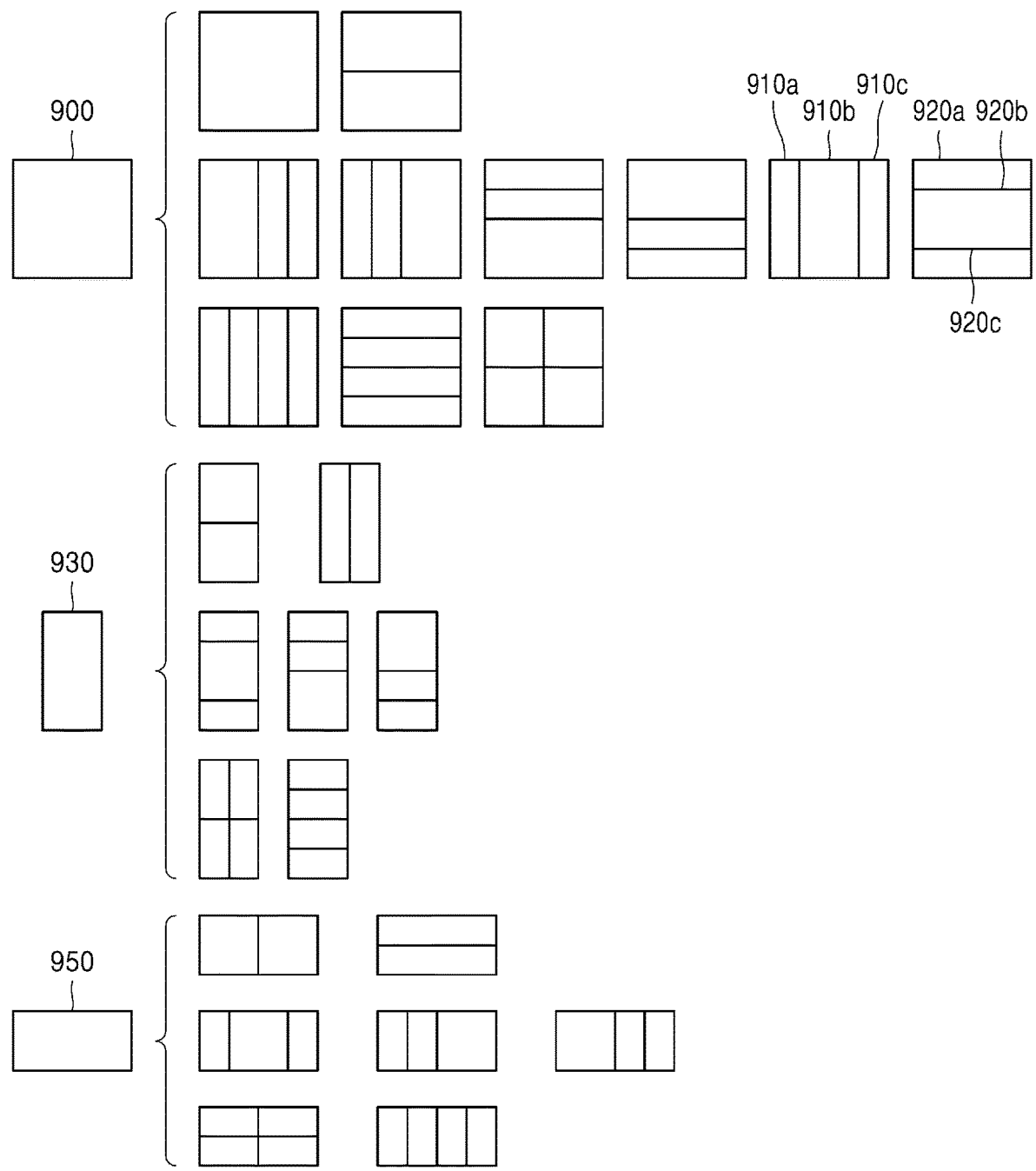
FIG. 9 illustrates a process of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and split shape mode information, which is obtained by the bitstream obtainer 110. The square first coding unit 900 may be split into four square coding units, or may be split into a plurality of non-square coding units. For example, referring to FIG. 9, when the block shape information indicates that the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a predetermined order, and the condition relates to whether at least one of a width and height of the first coding unit 900 is divided in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not divide the width of the first coding unit 900 in half, it may be determined that the first coding unit 900 does not satisfy the condition for processing in the predetermined order. In addition, because boundaries of the second coding units 920*a*, 920*b*, and 920*c* determined by splitting the square first coding unit 900 in a horizontal direction do not divide the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units based on a result of the decision. According to an embodiment, when a coding unit is split into an odd number of coding units, the image decoding apparatus 100 may put a predetermined restriction on a coding unit at a predetermined location from among the split coding units, and the restriction or the predetermined location has been described above through various embodiments and thus detailed descriptions thereof will not be provided here.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
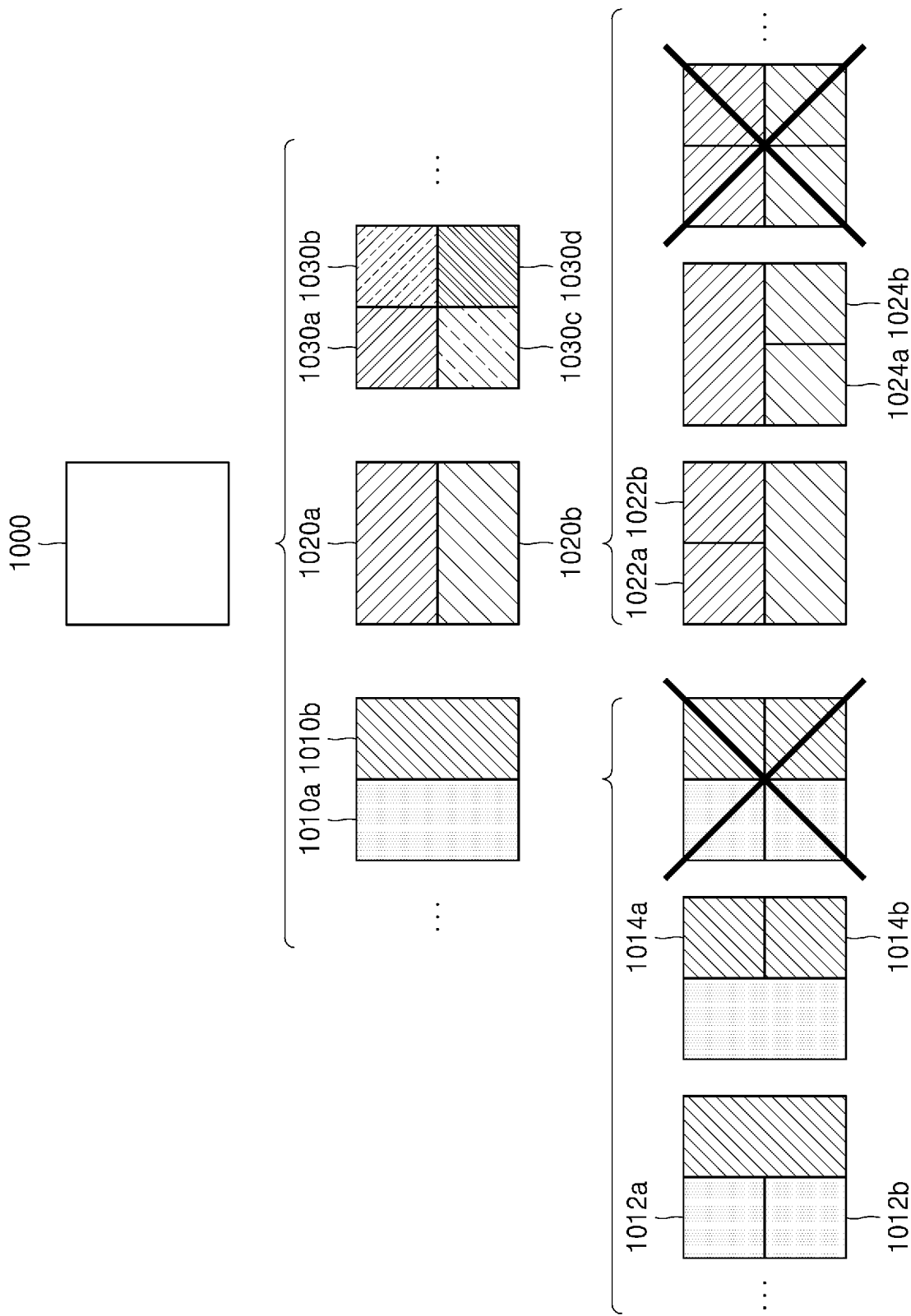
FIG. 10 illustrates that a shape into which a second coding unit is splittable is restricted when a second non-square second coding unit determined by splitting a first coding unit satisfies a predetermined condition, according to an embodiment.

FIG. 10 illustrates that a shape into which a second coding unit is splittable by the image decoding apparatus 100 is restricted when a second coding unit having a non-square shape, which is determined by splitting a first coding unit 1000, satisfies a predetermined condition, according to an embodiment.

According to an embodiment, the image decoding apparatus 100 may determine to split the square first coding unit 1000 into non-square second coding units 1010*a*, 1010*b*, 1020*a*, and 1020*b*, based on at least one of block shape information and split shape mode information, which is obtained by the bitstream obtainer 110. The second coding units 1010*a*, 1010*b*, 1020*a*, and 1020*b* may be independently split. As such, the image decoding apparatus 100 may determine to split or not to split the first coding unit 1000 into a plurality of coding units, based on at least one of the block shape information and the split shape mode information of each of the second coding units 1010*a*, 1010*b*, 1020*a*, and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* to not be split in a horizontal direction in which the left second coding unit 1010*a* is split. When third coding units 1014*a* and 1014*b* are determined by splitting the right second coding unit 1010*b* in the same direction, because the left and right second coding units 1010*a* and 1010*b* are independently split in a horizontal direction, the third coding units 1012*a*, 1012*b*, 1014*a*, and 1014*b* may be determined. However, this case serves equally as a case in which the image decoding apparatus 100 splits the first coding unit 1000 into four square second coding units 1030*a*, 1030*b*, 1030*c*, and 1030*d*, based on at least one of the block shape information and the split shape mode information, and may be inefficient in terms of image decoding.

According to an embodiment, the image decoding apparatus 100 may determine third coding units 1022*a*, 1022*b*, 1024*a*, and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) to not be split in a vertical direction in which the upper second coding unit 1020*a* is split.

Figure 11:
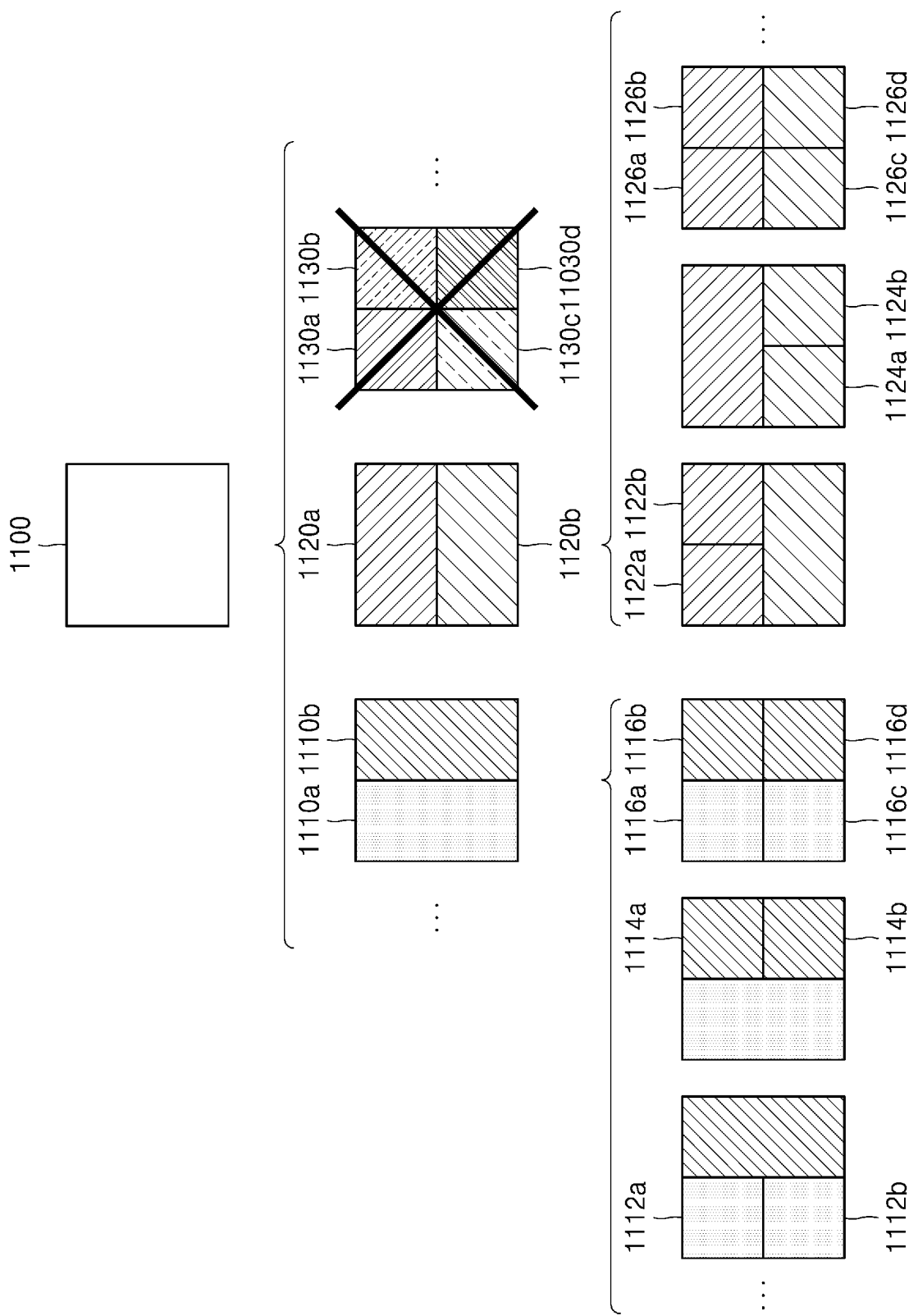
FIG. 11 illustrates a process of splitting a square coding unit when split shape information indicates that the square coding unit is not to be split into four square coding units, according to an embodiment.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110*a*, 1110*b*, 1120*a*, 1120*b*, etc. by splitting a first coding unit 1100 based on at least one of block shape information and split shape mode information. The split shape mode information may include information about various methods of splitting a coding unit but, the information about various splitting methods may not include information for splitting a coding unit into four square coding units. According to such split shape mode information, the image decoding apparatus 100 may not split the first square coding unit 1100 into four square second coding units 1130*a*, 1130*b*, 1130*c*, and 1130*d*. The image decoding apparatus 100 may determine the non-square second coding units 1110*a*, 1110*b*, 1120*a*, 1120*b*, etc., based on the split shape mode information.

According to an embodiment, the image decoding apparatus 100 may independently split the non-square second coding units 1110*a*, 1110*b*, 1120*a*, 1120*b*, etc. Each of the second coding units 1110*a*, 1110*b*, 1120*a*, 1120*b*, etc. may be recursively split in a predetermined order, and this splitting method may correspond to a method of splitting the first coding unit 1100 based on at least one of the block shape information and the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
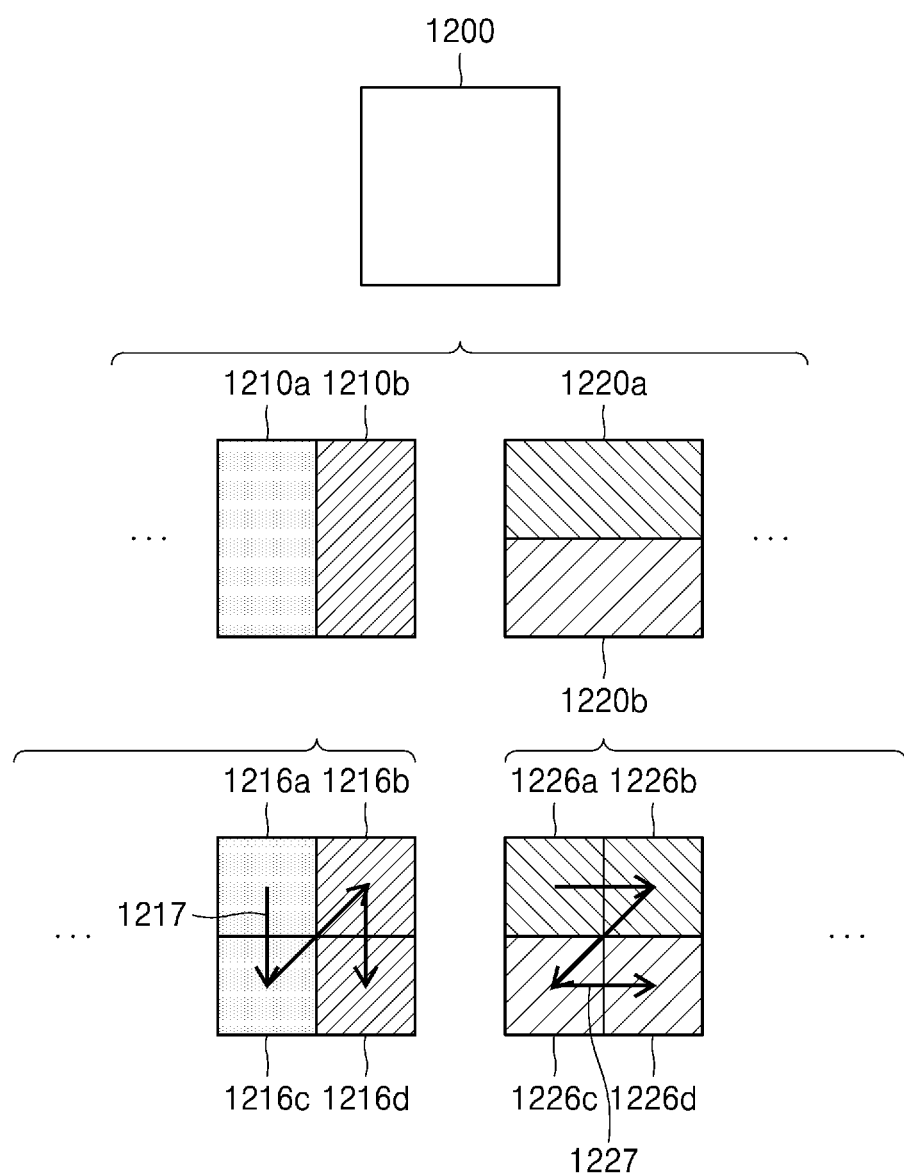
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on block shape information and split shape mode information. When the block shape information indicates a square shape and the split shape mode information indicates to split the first coding unit 1200 in at least one of horizontal and vertical directions, the image decoding apparatus 100 may determine second coding units 1210*a*, 1210*b*, 1220*a*, 1220*b*, etc. by splitting the first coding unit 1200. Referring to FIG. 12, the non-square second coding units 1210*a*, 1210*b*, 1220*a*, and 1220*b* determined by splitting the first coding unit 1200 in only a horizontal direction or vertical direction may be independently split based on the block shape information and the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a horizontal direction. An operation of splitting the second coding units 1210*a*, 1210*b*, 1220*a*, and 1220*b* has been described above with reference to FIG. 11, and thus detailed descriptions thereof will not be provided here.

According to an embodiment, the image decoding apparatus 100 may process coding units in a predetermined order. An operation of processing coding units in a predetermined order has been described above with reference to FIG. 7, and thus detailed descriptions thereof will not be provided here. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a*, 1210*b*, 1220*a*, and 1220*b*, respectively. Although the second coding units 1210*a* and 1210*b* are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on at least one of the block shape information and the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302, a third coding unit 1304, etc. of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by dividing a width and height of the first coding unit 1300 to ½ may have a size of N×N. Furthermore, the third coding unit 1304 determined by dividing a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322, a third coding unit 1314 or 1324, etc. of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by dividing at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by dividing at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine the third coding unit 1304, 1314, or 1324 by dividing at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
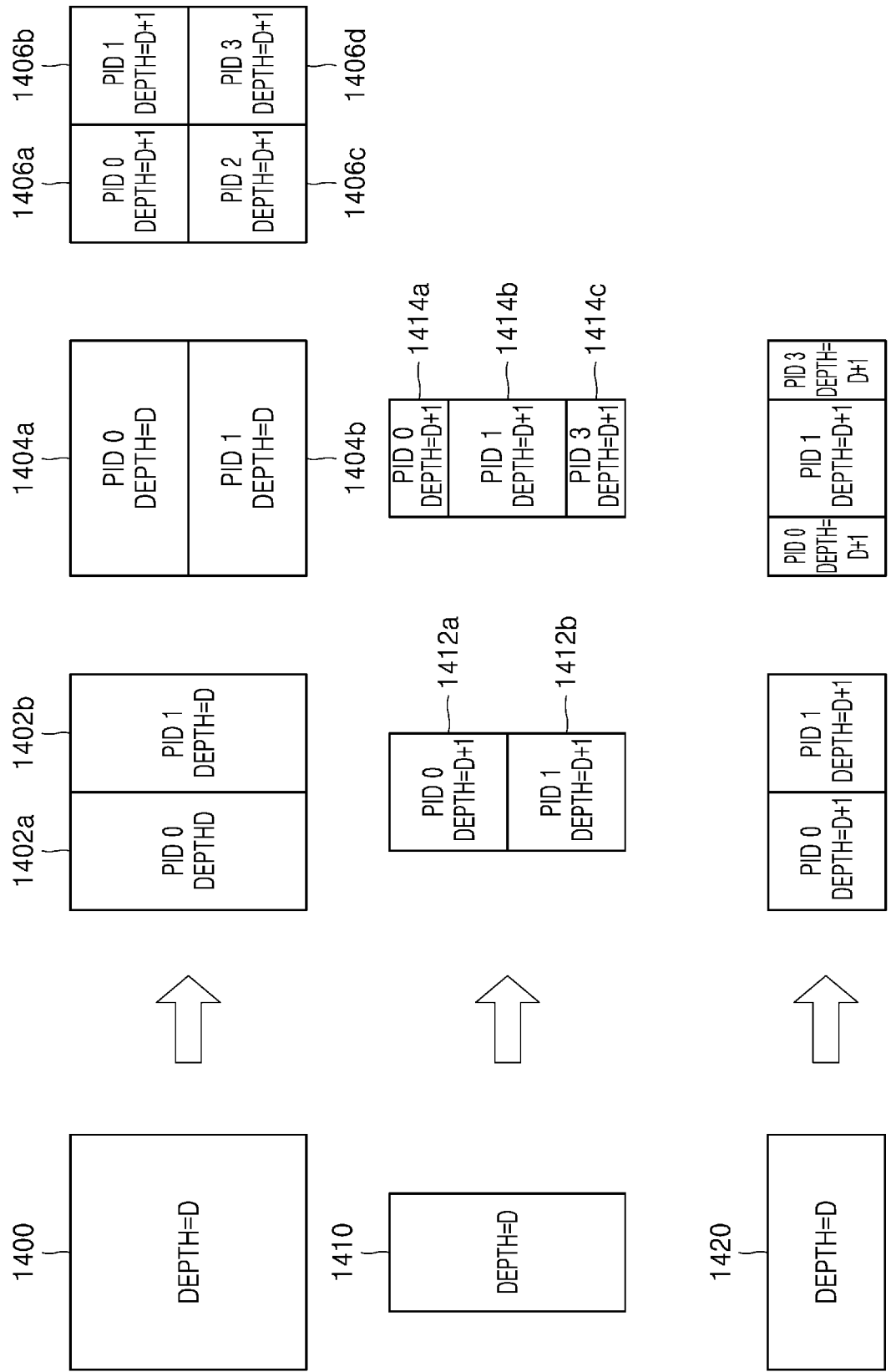
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shaped second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, 1414a, 1414b, and 1414c, 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, the coding unit 1414b of a center location among the odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs to identify respective coding units. According to an embodiment, the PID may be obtained from a sample of a predetermined location (e.g., a top left sample) of each coding unit.

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location (e.g., a coding unit of a center location) among an odd number of coding units has a size different from that of the other coding units. In this case, the image decoding apparatus 100 may determine the coding unit of the center location, which has a different size, by using PIDs of the coding units. However, the PID and the size or location of the coding unit of the predetermined location to be determined are not limited to the above-described examples, and various PIDs and various locations and sizes of coding units may be used.

According to an embodiment, the image decoding apparatus 100 may use a predetermined data unit where a coding unit starts to be recursively split.

Figure 15:
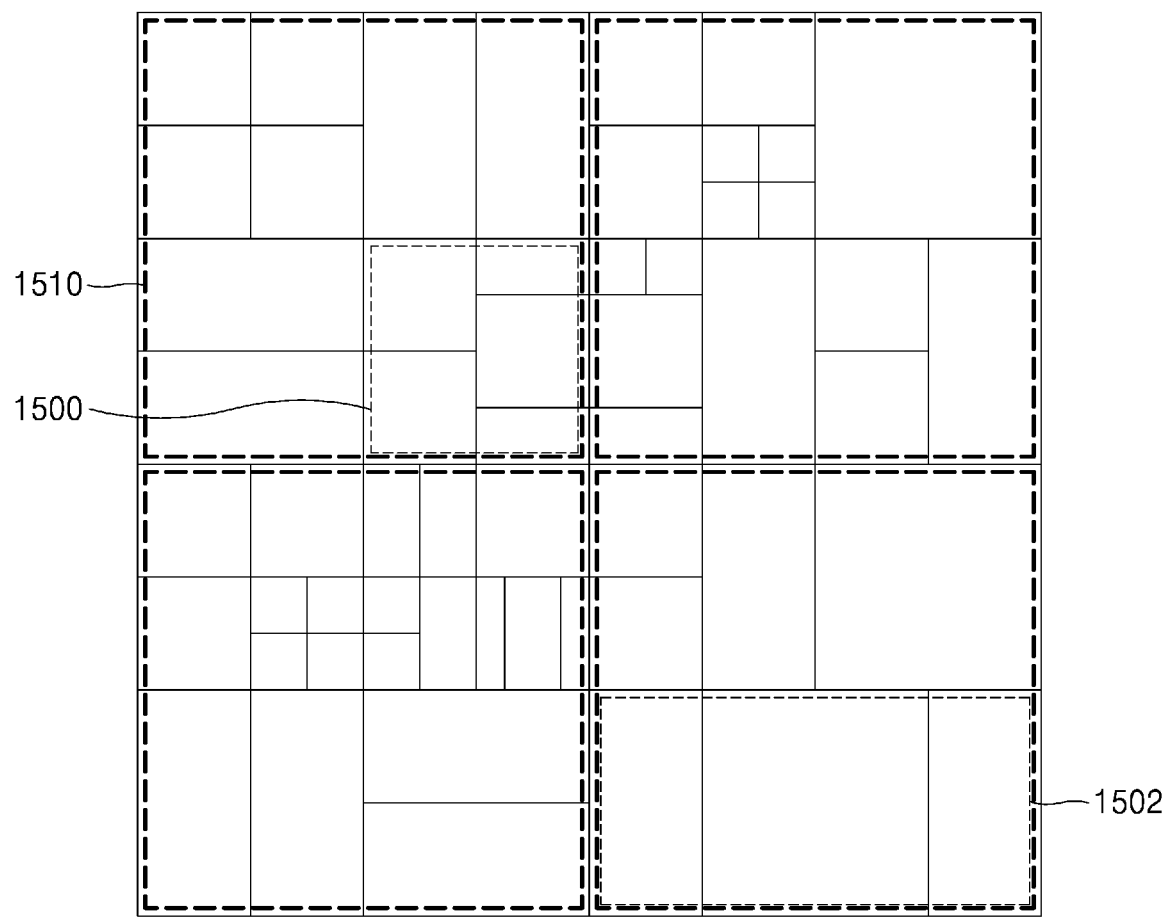
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using split shape mode information for each reference data unit. The operation of splitting the reference data unit may correspond to a splitting operation using a quadtree structure.

According to an embodiment, the image decoding apparatus 100 may previously determine a minimum size allowed for the reference data units included in the current picture. Accordingly, the image decoding apparatus 100 may determine various reference data units having sizes equal to or greater than the minimum size, and may determine one or more coding units by using the split shape mode information and block shape information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the bitstream obtainer 110 of the image decoding apparatus 100 may obtain, from a bitstream, at least one of reference coding unit shape information and reference coding unit size information with respect to each of the various data units. An operation of determining one or more coding units included in the square reference coding unit 1500 has been described above in relation to the operation of splitting the current coding unit 300 of FIG. 3, and an operation of determining one or more coding units included in the non-square reference coding unit 1502 has been described above in relation to the operation of splitting the current coding unit 400 or 450 of FIG. 4, and thus, detailed descriptions thereof will not be provided here.

According to an embodiment, the image decoding apparatus 100 may use a PID for identifying the size and shape of reference coding units, to determine the size and shape of reference coding units according to some data units previously determined based on a predetermined condition. That is, the bitstream obtainer 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus

100 may determine the reference coding units by splitting the largest coding unit n times based on a quadtree structure, and may split the reference coding unit based on at least one of the block shape information and the split shape mode information according to various embodiments.

Figure 16:
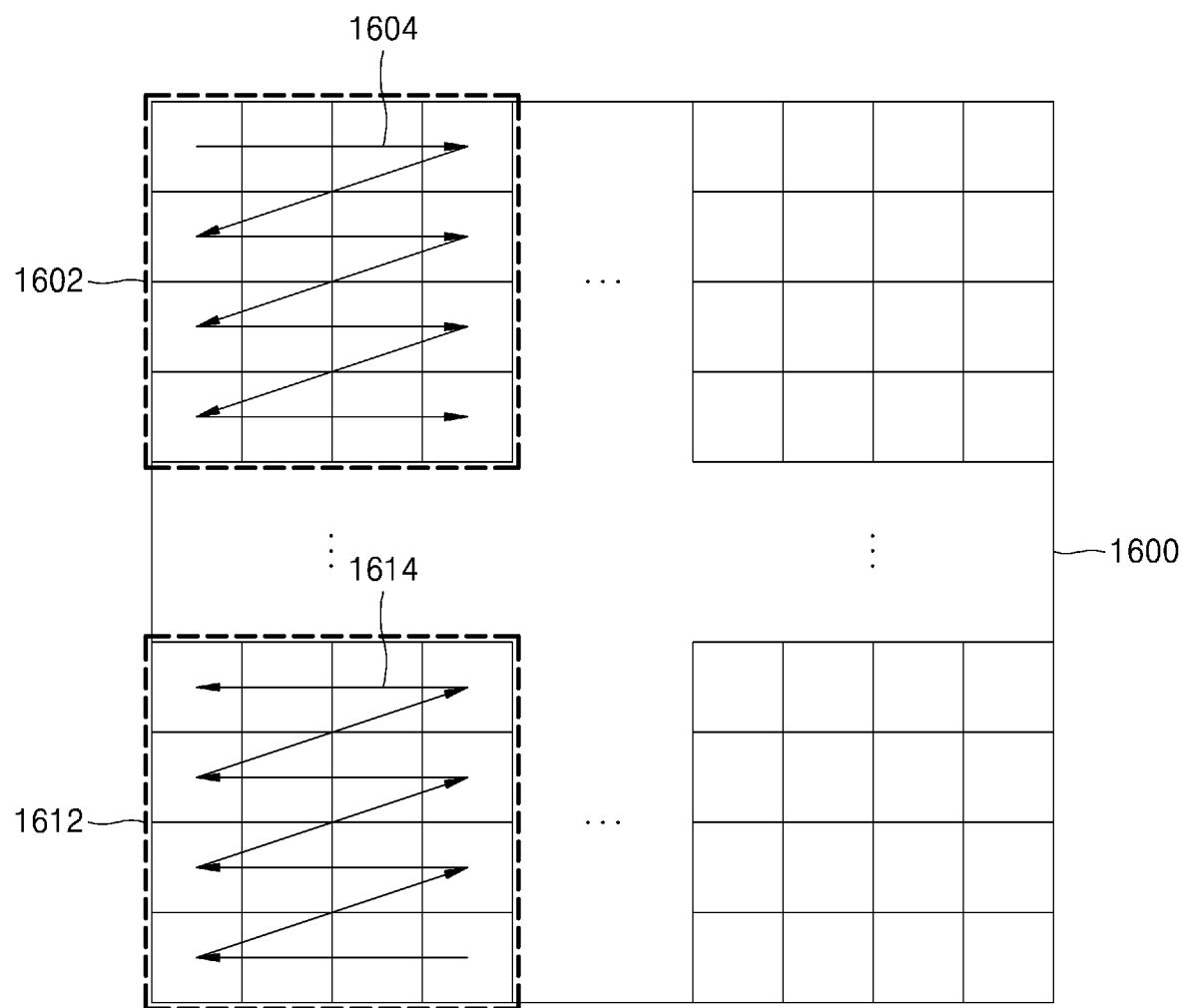
FIG. 16 illustrates a processing block serving as a unit for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the image. The image decoding apparatus 100 may obtain the processing block size information from a bitstream and may determine the size of one or more processing blocks included in the image. The size of processing blocks may be a predetermined size of data units, which is indicated by the processing block size information.

According to an embodiment, the bitstream obtainer 110 of the image decoding apparatus 100 may obtain the processing block size information from the bitstream according to each specific data unit. For example, the processing block size information may be obtained from the bitstream in a data unit such as an image, sequence, picture, slice, or slice segment. That is, bitstream obtainer 110 may obtain the processing block size information from the bitstream according to each of the various data units, the image decoding apparatus 100 may determine the size of one or more processing blocks, which are split from the picture, by using the obtained processing block size information, and the size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units included in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the bitstream obtainer 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the bitstream obtainer 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different kinds of the determination order information of reference coding units may be obtained for the processing blocks 1602 and 1612. When the determination order 1604 of reference coding units in the processing block 1602 is a raster scan order, reference coding units included in the processing block 1602 may be determined according to the raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The block shape information or the split shape mode information may be included in the bitstream related to various data units. For example, the image decoding apparatus 100 may use the block shape information or the split shape mode information included in a sequence parameter set, a picture parameter set, a video parameter set, a slice header, or a slice segment header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Figure 17:
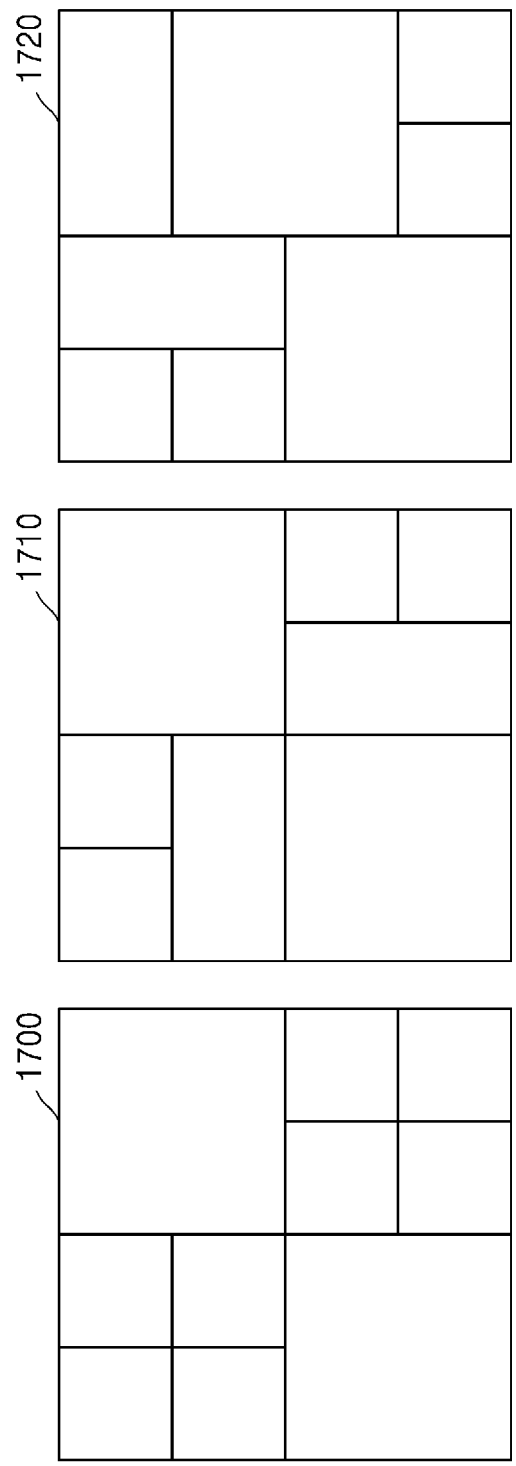
FIG. 17 illustrates coding units determinable per picture when a combination of shapes into which a coding unit is splittable is different per picture, according to an embodiment.

FIG. 17 illustrates coding units determinable per picture when a combination of shapes into which a coding unit is splittable is different per picture, according to an embodiment.

Referring to FIG. 17, the image decoding apparatus 100 may differently determine, per picture, a combination of shapes into which a coding unit is splittable. For example, the image decoding apparatus 100 may decode an image by using a picture 1700 that is splittable into 4 coding units, a picture 1710 that is splittable into 2 or 4 coding units, and a picture 1720 that is splittable into 2, 3, or 4 coding units, from among one or more pictures included in the image. In order to split the picture 1700 into a plurality of coding units, the image decoding apparatus 100 may use only split shape information indicating that the picture 1700 is split into 4 square coding units. In order to split the picture 1710, the image decoding apparatus 100 may use only split shape information indicating that the picture 1710 is split into 2 or 4 coding units. In order to split the picture 1720, the image decoding apparatus 100 may use only split shape information indicating that the picture 1720 is split into 2, 3, or 4 coding units. Because such a combination of split shapes is merely an embodiment for describing operations of the image decoding apparatus 100, the combination of split shapes should not be interpreted as being limited to the embodiment and various combinations of split shapes may be used according to predetermined data units.

According to an embodiment, the bitstream obtainer 110 of the image decoding apparatus 100 may obtain a bitstream including an index indicating a combination of split shape information according to predetermined data units (e.g., sequences, pictures, or slices). For example, the bitstream obtainer 110 may obtain the index indicating the combination of split shape information from a sequence parameter set, a picture parameter set, or a slice header. The image decoding apparatus 100 may determine a combination of split shapes into which a coding unit is splittable according to predetermined data units by using the obtained index, and thus different combinations of split shapes may be used according to predetermined data units.

FIG. 18 illustrates various shapes of a coding unit determinable based on split shape information representable as a binary code, according to an embodiment.

According to an embodiment, the image decoding apparatus 100 may split a coding unit into various shapes by using block shape information and split shape information obtained by the bitstream obtainer 110. Shapes into which a coding unit is splittable may correspond to various shapes including the shapes described with reference to the above embodiments.

Referring to FIG. 18, the image decoding apparatus 100 may split a square coding unit into at least one of a horizontal direction and a vertical direction and may split a non-square coding unit in a horizontal direction or a vertical direction, based on split shape information.

According to an embodiment, when the image decoding apparatus 100 is able to split a square coding unit in a horizontal direction and a vertical direction to obtain 4 square coding units, the number of split shapes that may be indicated by the split shape information about the square coding unit may be 4. According to an embodiment, the split shape information may be represented as a 2-digit binary code, and a binary code may be allocated to each split shape. For example, when a coding unit is not split, the split shape information may be represented as (00)b; when a coding unit is split in a horizontal direction and a vertical direction, the split shape information may be represented as (01)b; when a coding unit is split in a horizontal direction, the split shape information may be represented as (10)b; and when a coding unit is spilt in a vertical direction, the split shape information may be represented as (11)b.

According to an embodiment, when the image decoding apparatus 100 splits a non-square coding unit in a horizontal direction or a vertical direction, types of split shapes that may be indicated by the split shape information may be determined according to the number of coding units into which a coding unit is split. Referring to FIG. 18, the image decoding apparatus 100 may split a non-square coding unit into up to 3 coding units according to an embodiment. The image decoding apparatus 100 may split a coding unit into two coding units, and in this case, the split shape information may be represented as (10)b. The image decoding apparatus 100 may split a coding unit into three coding units, and in this case, the split shape information may be represented as (11)b. The image decoding apparatus 100 may determine not to split a coding unit, and in this case, the split shape information may be represented as (0)b. That is, in order to use a binary code indicating split shape information, the image decoding apparatus 100 may use variable length coding (VLC), instead of fixed length coding (FLC).

According to an embodiment, referring to FIG. 18, a binary code of the split shape information indicating that a coding unit is not split may be represented as (0)b. When a binary code of the split shape information indicating that a coding unit is not split is set to (00)b, all 2-bit binary codes of split shape information have to be used despite that there exists no split shape information set to (01)b. However, as shown in FIG. 18, when 3 split shapes are used for a non-square coding unit, the image decoding apparatus 100 may determine not to split a coding unit even by using a 1-bit binary code (0)b as the split shape information, thereby efficiently using a bitstream. However, split shapes of a non-square coding unit, which are indicated by the split shape information, should not be interpreted as being limited to 3 shapes shown in FIG. 18 and should be interpreted as being various shapes including the above embodiments.

Figure 19:
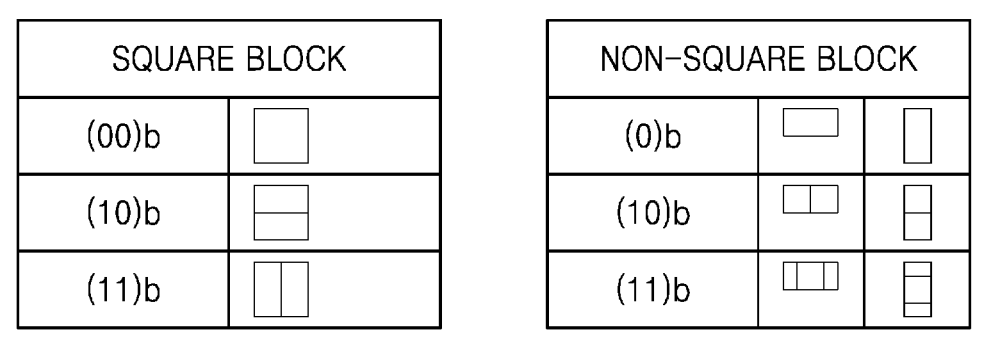

FIG. 19 illustrates other shapes of a coding unit determinable based on split shape information representable as a binary code, according to an embodiment.

Referring to FIG. 19, the image decoding apparatus 100 may split a square coding unit in a horizontal direction or a vertical direction and may split a non-square coding unit in a horizontal direction or a vertical direction, based on split shape information. That is, the split shape information may indicate that a square coding unit is split in one direction. In this case, a binary code of the split shape information indicating that a square coding unit is not split may be represented as (0)b. When a binary code of the split shape information indicating that a coding unit is not split is set to (00)b, all 2-bit binary codes of the split shape mode information have to be used despite that there exists no split shape information set to (01)b. However, as shown in FIG. 19, when 3 split shapes are used for a square coding unit, the image decoding apparatus 100 may determine not to split a coding unit even by using a 1-bit binary code (0)b as the split shape information, thereby efficiently using a bitstream. However, split shapes of a square coding unit, which are indicated by the split shape information, should not be interpreted as being limited to 3 shapes shown in FIG. 19 and should be interpreted as being various shapes including the above embodiments.

According to an embodiment, block shape information or split shape information may be represented by using a binary code, and such information may be immediately generated as a bitstream. Alternatively, block shape information or split shape information representable as a binary code may not be immediately generated as a bitstream and may be used as a binary code input during context adaptive binary arithmetic coding (CABAC).

According to an embodiment, a process, performed by the image decoding apparatus 100, of obtaining syntax about block shape information or split shape information through CABAC will be described. A bitstream including a binary code for the syntax may be obtained by the bitstream obtainer 110. The image decoding apparatus 100 may detect a syntax element indicating the block shape information or the split shape information by de-binarizing a bin string included in the obtained bitstream. According to an embodiment, the image decoding apparatus 100 may obtain a set of binary bin strings corresponding to the syntax element to be decoded and may decode each bin by using probability information, and the image decoding apparatus 100 may repeatedly perform this process until a bin string including such decoded bins is the same as one of pre-obtained bin strings. The image decoding apparatus 100 may determine the syntax element by de-binarizing the bin string.

According to an embodiment, the image decoding apparatus 100 may determine syntax about a bin string by performing a decoding process of adaptive binary arithmetic coding, and may update a probability model for bins obtained by the bitstream obtainer 110. Referring to FIG. 18, the bitstream obtainer 110 of the image decoding apparatus 100 may obtain a bitstream indicating a binary code indicating split shape information according to an embodiment. The image decoding apparatus 100 may determine syntax about the split shape information by using the obtained binary code having a size of 1 bit or 2 bits. In order to determine the syntax about the split shape information, the image decoding apparatus 100 may update a probability of each bit from among the 2 bits of the binary code. That is, the image decoding apparatus 100 may update a probability that a next bin has a value of 0 or 1 during decoding, according to whether a value of a first bin in the 2-bits of the binary code is 0 or 1.

According to an embodiment, while determining the syntax, the image decoding apparatus 100 may update a probability of the bins used in a process of decoding the bins of the bin string for the syntax, and the image decoding apparatus 100 may determine that a specific bit in the bin string has the same probability without updating the probability.

Referring to FIG. 18, while determining syntax by using a bin string indicating split shape information about a non-square coding unit, the image decoding apparatus 100 may determine the syntax about the split shape information by using one bin having a value of 0 when the non-square coding unit is not split. That is, when block shape information indicates that a current coding unit has a non-square shape, a first bin of a bin string for the split shape information may be 0 when the non-square coding unit is not split and may be 1 when the non-square coding unit is split into two or three coding units. Accordingly, a probability that the first bin of the bin string of the split shape information about the non-square coding unit is 0 may be ⅓, and a probability that the first bin of the bin string of the split shape information about the non-square coding unit is 1 may be ⅔. As described above, because the split shape information indicating that the non-square coding unit is not split may represent only a 1-bit bin string having a value of 0, the image decoding apparatus 100 may determine syntax about the split shape information by determining whether a second bin is 0 or 1 only when the first bin of the split shape information is 1. According to an embodiment, when the first bin for the split shape information is 1, the image decoding apparatus 100 may decode a bin by determining that probabilities that the second bin is 0 and 1 are the same.

According to an embodiment, the image decoding apparatus 100 may use various probabilities for each bin while determining a bin of a bin string for split shape information. According to an embodiment, the image decoding apparatus 100 may differently determine probabilities of bins for split shape information according to a direction of a non-square block. According to an embodiment, the image decoding apparatus 100 may differently determine the probabilities of the bins for the split shape information according to an area or a length of a long side of a current coding unit. According to an embodiment, the image decoding apparatus 100 may differently determine the probabilities of the bins for the split shape information according to at least one of a shape and the length of the long side of the current coding unit.

According to an embodiment, the image decoding apparatus 100 may determine that the probabilities of the bins for the split shape information are the same with respect to coding units having a predetermined size or more. For example, the image decoding apparatus 100 may determine that the probabilities of the bins for the split shape information are the same with respect to coding units having a size equal to or greater than 64 samples based on a length of a long side of each coding unit.

According to an embodiment, the image decoding apparatus 100 may determine an initial probability of bins constituting a bin string of the split shape information based on a slice type (e.g., an I-slice, a P-slice, a B-slice, or the like).

Figure 20:
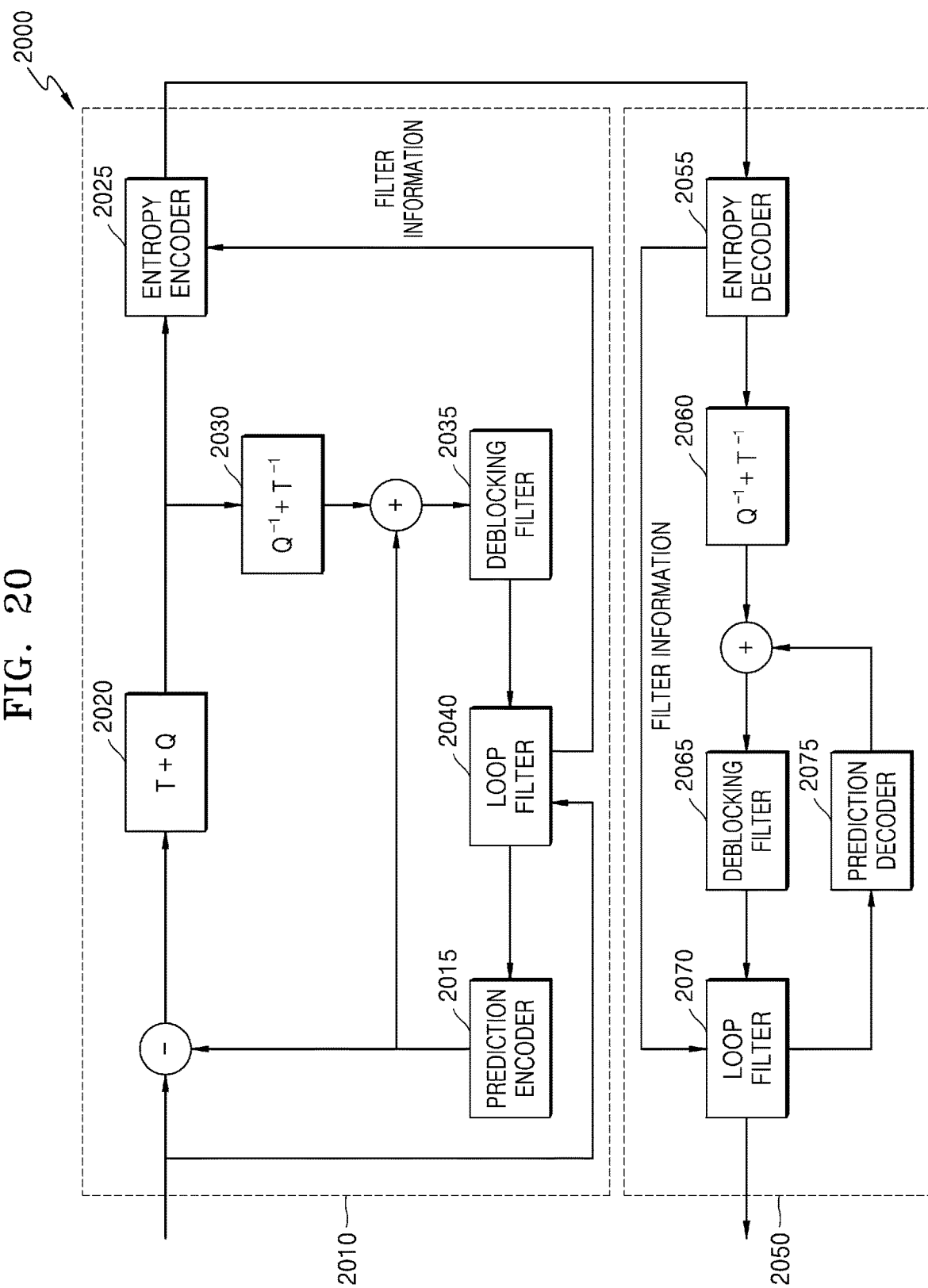
FIG. 20 is a block diagram of an image encoding and decoding system for performing loop filtering.

FIG. 20 is a block diagram of an image encoding and decoding system 2000 for performing loop filtering.

An encoding end 2010 of the image encoding and decoding system 2000 transmits an encoded bitstream of an image, and a decoding end 2050 receives and decodes the bitstream and outputs a reconstruction image. The encoding end 2010 may have a configuration similar to that of the image encoding apparatus 200 which will be described below, and the decoding end 2050 may have a configuration similar to that of the image decoding apparatus 100.

In the encoding end 2010, a prediction encoder 2015 outputs a reference image through inter prediction and intra prediction, and a transformer and quantizer 2020 quantizes residual data between the reference image and a current input image into a quantized transform coefficient and outputs the quantized transform coefficient. An entropy encoder 2025 encodes and transforms the quantized transform coefficient into a bitstream and outputs the bitstream. The quantized transform coefficient is reconstructed as data in a spatial domain by a de-quantizer and inverse converter 2030, and the reconstructed data in the spatial domain is output as a reconstruction image through a deblocking filter 2035 and a loop filter 2040. The reconstruction image may be used as a reference image of a next input image through the prediction encoder 2015.

Encoded image data from among the bitstream received by the decoding end 2050 is reconstructed as residual data in a spatial domain through an entropy decoder 2055 and a de-quantizer and inverse converter 2060. Image data in a spatial domain is formed as the residual data and a reference image output from a prediction decoder 2075 are combined, and a deblocking filter 2065 and a loop filter 2070 may filter the image data in the spatial domain and may output a reconstruction image for a current original image. The reconstruction image may be used as a reference image for a next original image by the prediction decoder 2075.

The loop filter 2040 of the encoding end 2010 performs loop filtering by using filter information input according to a user input or a system setting. The filter information used by the loop filter 2040 is output to the entropy encoder 2025, and is transmitted along with the encoded image data to the decoding end 2050. The loop filter 2070 of the decoding end 2050 may perform loop filtering based on the filter information input from the decoding end 2050.

Figure 21:
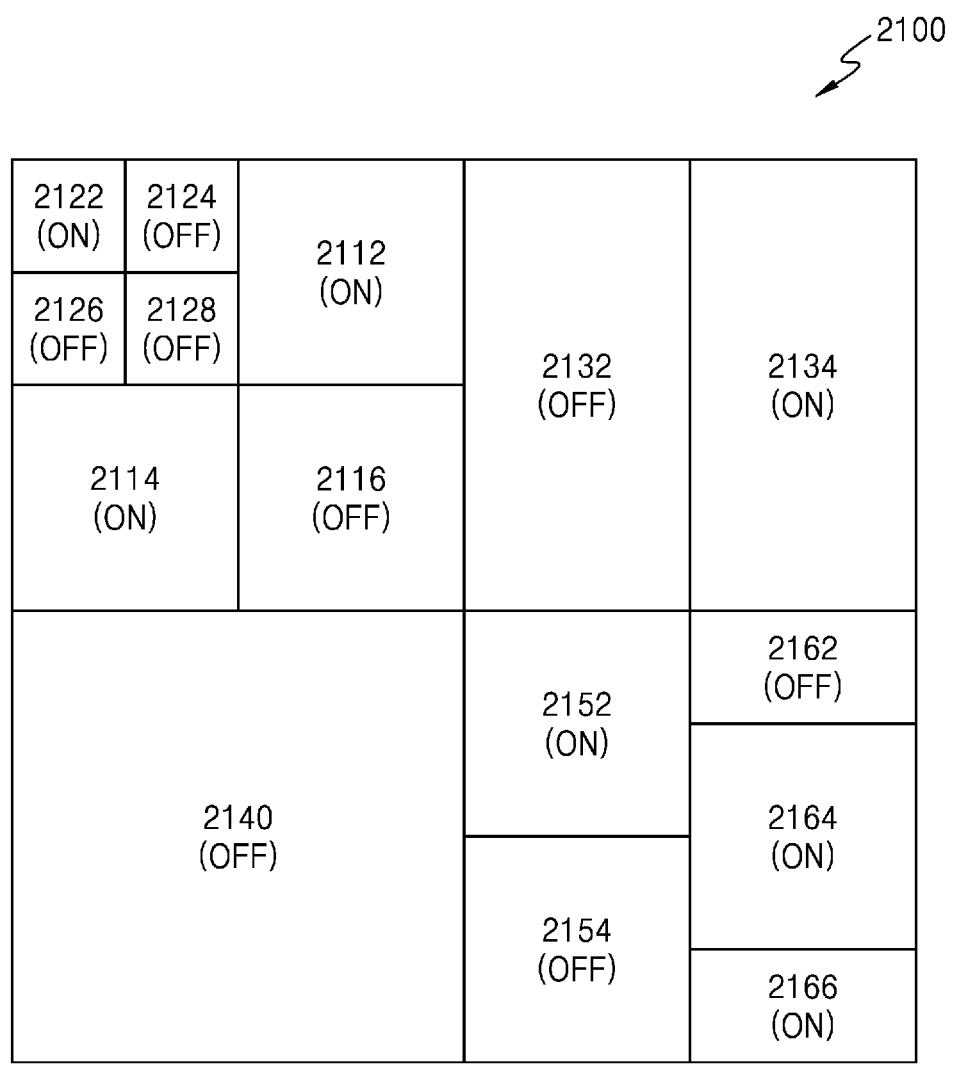
FIG. 21 is a diagram illustrating an example of filtering units included in a largest coding unit and filtering performance information of a filtering unit, according to an embodiment.
Figure 22:
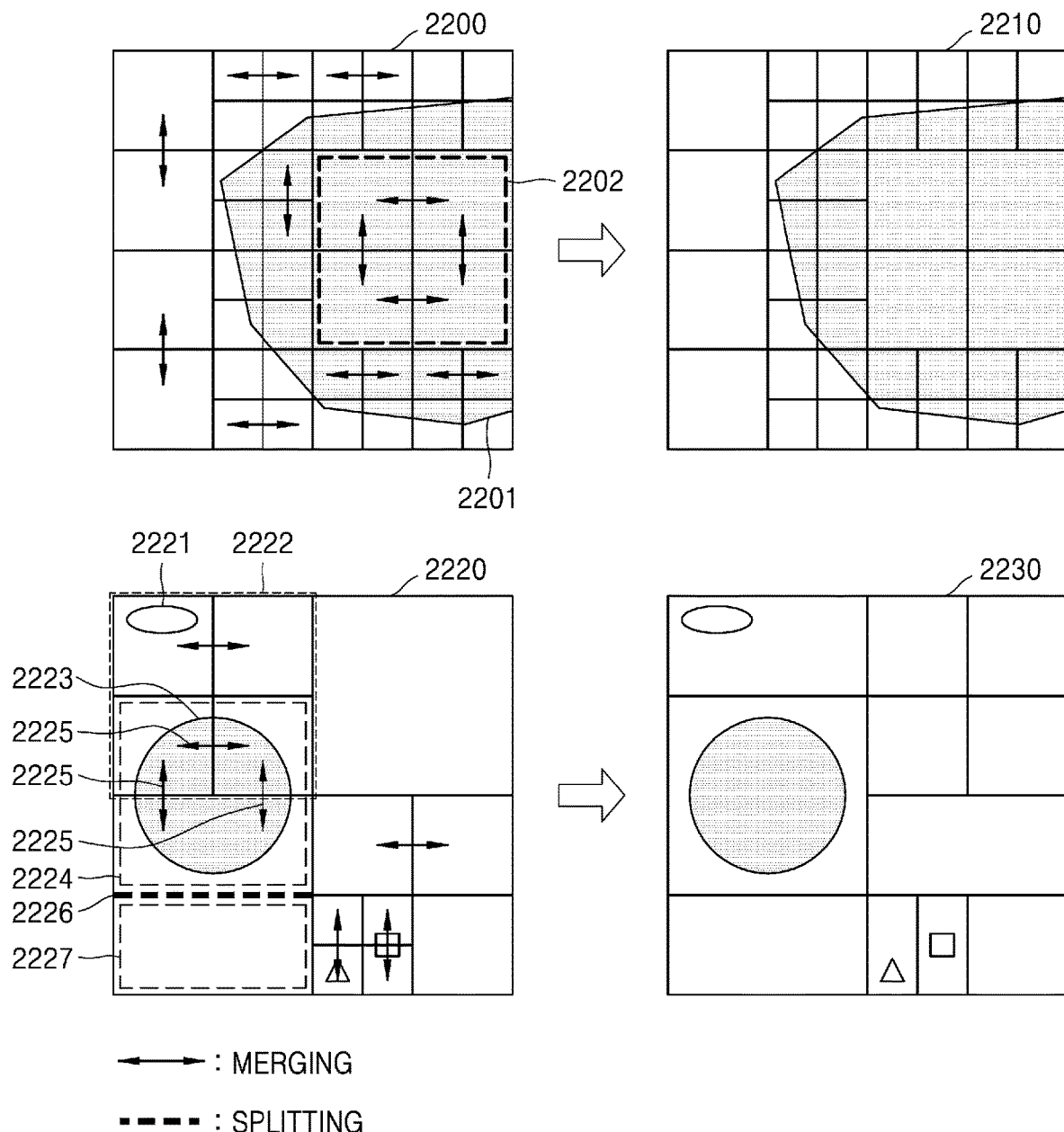
FIG. 22 illustrates a process of performing merging or splitting between coding units determined according to a predetermined encoding method, according to an embodiment.

FIG. 21 is a diagram illustrating an example of filtering units included in a largest coding unit and filtering performance information of a filtering unit, according to an embodiment.

When filtering units of the loop filter 2040 of the encoding end 2010 and the loop filter 2070 of the decoding end 2050 include data units similar to coding units according to an embodiment described with reference to FIGS. 3 through 5, filter information may include block shape information and split shape information of a data unit for indicating a filtering unit, and loop filtering performance information indicating whether loop filtering is performed on the filtering unit.

Filtering units included in a largest coding unit 2100 according to an embodiment may have the same block shape and split shape as coding units included in the largest coding unit 2100. Also, the filtering units included in the largest coding unit 2100 according to an embodiment may be split based on sizes of the coding units included in the largest coding unit 2100. Referring to FIG. 21, for example, the filtering units may include a filtering unit 2140 having a square shape and a depth of D, filtering units 2132 and 2134 having a non-square shape and a depth of D, filtering units 2112, 2114, 2116, 2152, 2154, and 2164 having a square shape and a depth of D+1, filtering units 2162 and 2166 having a non-square shape and a depth of D+1, and filtering units 2122, 2124, 2126, and 2128 having a square shape and a depth of D+2.

The block shape information, the split shape information (depth), and the loop filtering performance information of the filtering units included in the largest coding unit 2100 may be encoded as shown in Table 1.

TABLE 1

| Depth | Block Shape Information | Loop Filtering Performance Information |
|---|---|---|
| D | 0: SQUARE | 0(2140) |
|   | 1: NS_VER | 0(2132), 1(2134) |
|   | 2: NS_HOR | |
| D + 1 | 0: SQUARE | 1(2112), 1(2114), 0(2116), 1(2152), 0(2154), 1(2164) |
|   | 1: NS_VER | |
|   | 2: NS_HOR | 0(2162), 1(2166) |

TABLE 1-continued

| Depth | Block Shape Information | Loop Filtering Performance Information |
|---|---|---|
| D + 2 | 0: SQUARE | 1(2122), 0(2124), 0(2126), 0(2128) |
|   | 1: NS_VER | |
|   | 2: NS_HOR | |

A process of determining a plurality of coding units by recursively splitting a coding unit according to block shape information and block split information according to an embodiment is the same as that described with reference to FIG. 13. Loop filtering performance information of filtering units according to an embodiment indicates that loop filtering is performed on the filtering units when a flag value is 1, and indicates that loop filtering is not performed on the filtering units when a flag value is 0. Referring to Table 1, information of data units for determining filtering units to be filtered by the loop filters 2040 and 2070 may all be encoded and transmitted as filter information.

Because coding units configured according to an embodiment are coding units configured to minimize an error with an original image, it is expected to have a high spatial correlation in the coding units. Accordingly, because a filtering unit is determined based on a coding unit according to an embodiment, an operation of determining a filtering unit, separate from determining of a coding unit, may be omitted. Also, accordingly, because a filtering unit is determined based on a coding unit according to an embodiment and thus information for determining a split shape of the filtering unit may be omitted, a transfer bit rate of filter information may be saved.

Although it is described in the above embodiments that a filtering unit is determined based on a coding unit according to an embodiment, a filtering unit may be split based on a coding unit until an arbitrary depth, and thus a shape of the filtering unit may be determined up to only the arbitrary depth.

The determining of a filtering unit described in the above embodiments may be applied not only to loop filtering but also to various embodiments such as deblocking filtering and adaptive loop filtering.

According to an embodiment, the image decoding apparatus 100 may split a current coding unit by using at least one of block shape information and split shape information, and the block shape information may be pre-determined to indicate using only a square shape and the split shape information may be pre-determined to indicate that the current coding unit is not split or split into 4 square coding units. That is, coding units of the current coding unit may always have a square shape according to the block shape information and the current coding unit may not be split or may be split into 4 square coding units based on the split shape information. The image decoding apparatus 100 may obtain, by using the bitstream obtainer 110, a bitstream generated by using a predetermined encoding method that is pre-determined to only use such block shapes and split shapes, and the image decoding apparatus 100 may use only the pre-determined block shapes and split shapes. In this case, because the image decoding apparatus 100 may solve a compatibility problem with the predetermined encoding method by using a predetermined decoding method similar to the predetermined encoding method. According to an embodiment, when the image decoding apparatus 100 uses the predetermined decoding method using only the pre-determined block shapes and split shapes from among various shapes that may be indicated by the block shape information and the split shape information, the block shape information only indicates a square shape, and thus the image decoding apparatus 100 may omit a process of obtaining the block shape information from the bitstream. Syntax indicating whether to use the predetermined decoding method may be used, and such syntax may be obtained from the bitstream according to data units having various shapes that may include a plurality of coding units such as sequences, pictures, slice units, and largest coding units. That is, the bitstream obtainer 110 may determine whether syntax indicating the block shape information is to be obtained from the bitstream based on syntax indicating whether the predetermined decoding method is used.

Figure 23:
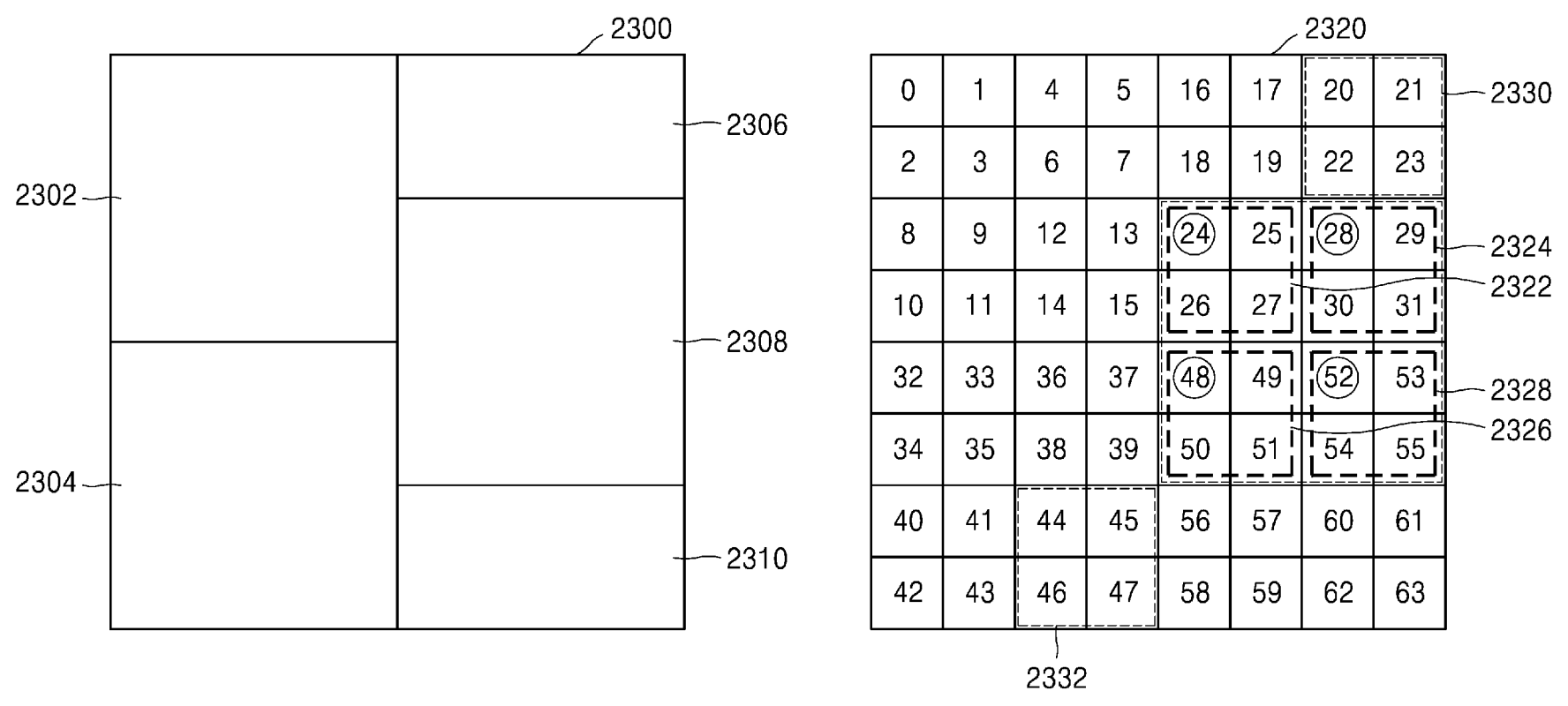

FIG. 23 illustrates an index according to a Z-scan order of a coding unit according to an embodiment.

The image decoding apparatus 100 according to an embodiment may scan lower data units included in an upper data unit according to a Z-scan order. Also, the image decoding apparatus 100 according to an embodiment may sequentially access data according to a Z-scan index in a coding unit included in a processing block or a largest coding unit.

The image decoding apparatus 100 according to an embodiment may split a reference coding unit into at least one coding unit as described with reference to FIGS. 3 and 4. In this case, coding units having a square shape and coding units having a non-square shape may co-exist in the reference coding unit. The image decoding apparatus 100 according to an embodiment may access data according to a Z-scan index included in each coding unit in the reference coding unit. In this case, a method of applying a Z-scan index may vary according to whether a coding unit having a non-square shape exists in the reference coding unit.

According to an embodiment, when a coding unit having a non-square shape does not exist in the reference coding unit, coding units of a lower depth in the reference coding unit may have continuous Z-scan indexes. For example, according to an embodiment, a coding unit of an upper depth may include four coding units of a lower depth. Boundaries of the four coding units of the lower depth may be continuous, and the coding units of the lower depth may be scanned in a Z-scan order according to indexes indicating the Z-scan order. The indexes indicating the Z-scan order according to an embodiment may be set to numbers that increase according to the Z-scan order for the coding units. In this case, deeper coding units of the same depth may be scanned according to the Z-scan order.

According to an embodiment, when at least one coding unit having a non-square shape exists in the reference coding unit, the image decoding apparatus 100 may split each of the coding units in the reference coding unit into sub-blocks, and may scan the split sub-blocks according to the Z-scan order. For example, when a coding unit having a non-square shape in a vertical direction or a horizontal direction exists in the reference coding unit, Z-scan may be performed by using split sub-blocks. Also, for example, when the reference coding unit is split into an odd number of coding units, Z-scan may be performed by using sub-blocks. A sub-block is a coding unit that is no longer split or a coding unit obtained by splitting an arbitrary coding unit, and may have a square shape. For example, four sub-blocks having a square shape may be split from a coding unit having a square shape. Also, for example, two sub-blocks having a square shape may be split from a coding unit having a non-square shape.

Referring to FIG. 23, for example, the image decoding apparatus 100 according to an embodiment may scan coding units 2302, 2304, 2306, 2308, and 2310 of a lower depth in a coding unit 2300 according to a Z-scan order. The coding unit 2300 and the coding units 2302, 2304, 2306, 2308, and 2310 are respectively an upper coding unit and lower coding units. The coding unit 2300 includes the coding units 2306 and 2310 having a non-square shape in a horizontal direction. The coding units 2306 and 2310 having a non-square shape have discontinuous boundaries with the coding units 2302 and 2304 that are adjacent to each other and have a square shape. Also, the coding unit 2308 has a square shape, and is a coding unit at the center when a coding unit having a non-square shape is split into an odd number of coding units. Like the coding units 2306 and 2310 having a non-square shape, the coding unit 2308 has discontinuous boundaries with the coding units 2302 and 2304 that are adjacent to each other and have a square shape. When the coding unit 2300 includes the coding units 2306 and 2310 having a non-square shape or the coding unit 2308 located at the center when a coding unit having a non-square shape is split into an odd number of coding units, because adjacent boundaries between coding units are discontinuous, continuous Z-scan indexes may not be set. Accordingly, the image decoding apparatus 100 may continuously set Z-scan indexes by splitting coding units into sub-blocks. Also, the image decoding apparatus 100 may perform continuous Z-scan on the coding units 2306 and 2310 having a non-square shape or the coding unit 2308 located at the center of an odd number of coding units having a non-square shape.

A coding unit 2320 of FIG. 23 is obtained by splitting the coding units 2302, 2304, 2306, 2308, and 2310 in the coding unit 2300 into sub-blocks. Because a Z-scan index may be set for each of the sub-blocks and adjacent boundaries between the sub-blocks are continuous, the sub-blocks may be scanned according to a Z-scan order. For example, in a decoding apparatus according to an embodiment, the coding unit 2308 may be split into sub-blocks 2322, 2324, 2326 and 2328. In this case, the sub-blocks 2322 and 2324 may be scanned after data processing is performed on a sub-block 2330, and the sub-blocks 2326 and 2328 may be scanned after data processing is performed on a sub-block 2332. Also, the sub-blocks may be scanned according to the Z-scan order.

In the above embodiments, data units are scanned according to a Z-scan order for data storage, data loading, and data accessing.

Also, in the above embodiments, although data units may be scanned according to a Z-scan order, a scan order of data units may be one of various orders such as a raster scan order, an N-scan order, an up-right diagonal scan order, a horizontal scan order, and a vertical scan order, and should not be limited to the Z-scan order.

Also, in the above embodiments, although coding units in a reference coding unit are scanned, the present disclosure is not limited thereto and a target to be scanned may be an arbitrary block in a processing block or a largest coding unit.

Also, in the above embodiments, although a block is split into sub-blocks and scanning is performed according to a Z-scan order only when at least one block having a non-square shape exists, a block may be split into sub-blocks and scanning may be performed according to a Z-scan order even when a block having a non-square shape does not exist for a simplified embodiment.

The image decoding apparatus 100 according to an embodiment may generate prediction data by performing inter prediction or intra prediction on a coding unit, may generate residual data by performing inverse transformation on a transform unit included in a current coding unit, and may reconstruct the current coding unit by using the generated prediction data and the residual data.

A prediction mode of a coding unit according to an embodiment may be at least one of an intra mode, an inter mode, and a skip mode. According to an embodiment, a prediction mode may be independently selected according to coding units.

When a coding unit having a 2N×2N shape is split into two coding units having a 2N×N shape or a N×2N shape according to an embodiment, inter mode prediction and intra mode prediction may be separately performed on each coding unit. Also, a skip mode may be applied to the coding units having the 2N×N or N×2N shape according to an embodiment.

The image decoding apparatus 100 according to an embodiment may allow performing bi-prediction in a skip mode of a coding unit having a 8×4 or 4×8 shape. Because only skip mode information about a coding unit is received in a skip mode, the use of residual data for the coding unit is omitted. Accordingly, in this case, an overhead of de-quantization and inverse transformation may be reduced. Instead, the image decoding apparatus 100 according to an embodiment may allow performing bi-prediction on a coding unit to which a skip mode is applied, thereby improving decoding efficiency. Also, the image decoding apparatus 100 according to an embodiment may set an interpolation tap number to a relatively small value during motion compensation while allowing performing bi-prediction on a coding unit having a 8×4 or 4×8 shape, thereby efficiently using a memory bandwidth. For example, an interpolation filter having a tap number less than 8 (e.g., a 2-tap interpolation filter), instead of an 8-tap interpolation filter, may be used.

Also, the image decoding apparatus 100 according to an embodiment may signal intra or inter prediction information about each region included in a current coding unit by splitting the region into a pre-set shape (e.g., diagonal-based split).

The image decoding apparatus 100 according to an embodiment may obtain a prediction sample of a current coding unit using an intra mode by using adjacent samples of the current coding unit. In this case, intra prediction is performed by using adjacent samples that are pre-reconstructed, and the samples are referred to as reference samples.

Figure 24:
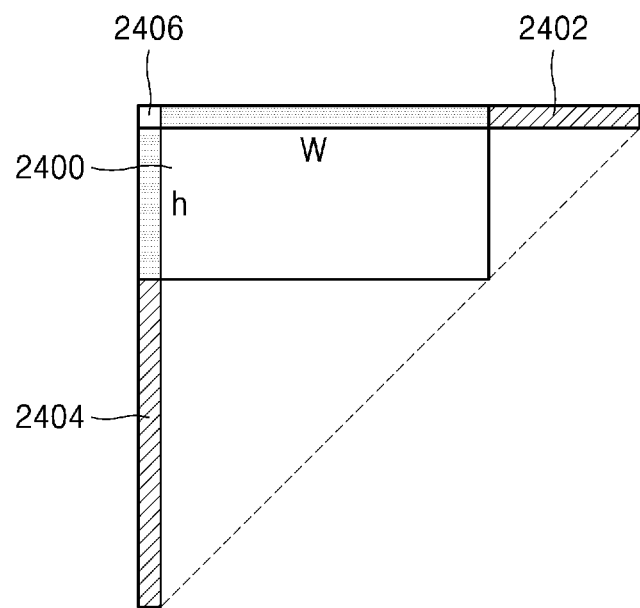
FIG. 24 is a diagram illustrating a reference sample for intra prediction of a coding unit, according to an embodiment.

FIG. 24 is a diagram of a reference sample for intra prediction of a coding unit, according to an embodiment. Referring to FIG. 24, for a coding unit 2400 where a block shape is a non-square shape, a length in a horizontal direction is w, and a length in a vertical length is h, w+h upper reference samples 2402, w+h left reference samples 2404, and one upper left reference sample 2406 are required, that is, the total number of 2(w+h)+1 reference samples are required. In order to prepare a reference sample, padding may be performed on a part where the reference sample does not exist, and a reference sample filtering process may be performed for each prediction mode to reduce a quantization error included in a reconstructed reference sample.

Although the number of reference samples when a block shape of a current coding unit is a non-square shape has been described in the above embodiments, the number of reference samples is equally applied even when a current coding unit is a rectangular block shape.

The above various embodiments describe an operation related to an image decoding method performed by the image decoding apparatus 100. An operation of the image encoding apparatus 200 for performing an image encoding method corresponding to a reverse order process of the image decoding method will be described through various embodiments.

Figure 2:
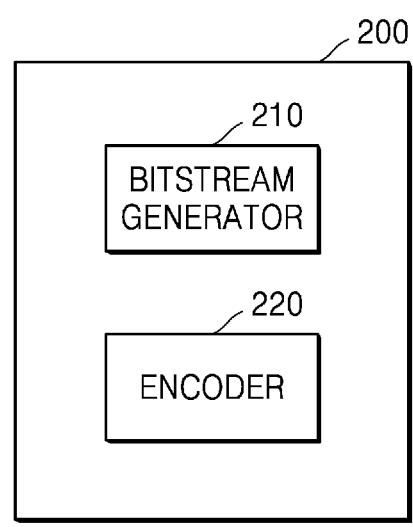
FIG. 2 is a block diagram of an image encoding apparatus capable of encoding an image based on at least one of block shape information and split shape information, according to an embodiment.

FIG. 2 is a block diagram of the image encoding apparatus 200 capable of encoding an image based on at least one of block shape information and split shape information, according to an embodiment.

The image encoding apparatus 200 may include an encoder 220 and a bitstream generator 210. The encoder 220 may receive an input image and may encode the input image. The encoder 220 may encode the input image and may obtain at least one syntax element. The syntax element may include at least one of skip flag, prediction mode, motion vector difference, motion vector prediction method (or index), transform quantized coefficient, coded block pattern, coded block flag, intra prediction mode, direct flag, merge flag, delta QP, reference index, prediction direction, and transform index. The encoder 220 may determine a context model based on block shape information including at least one of shape, a direction, a ratio between a width and a height, and a size of a coding unit.

The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of a coding unit. For example, the coding unit may have a square shape or a non-square shape, and information indicating the shape may be included in the block shape information.

According to an embodiment, the encoder 220 may determine which shape the coding unit is to be split into. The encoder 220 may determine a shape of at least one coding unit included in the coding unit, and the bitstream generator 210 may generate the bitstream including split shape information including the information about the shape of the coding unit.

According to an embodiment, the encoder 220 may determine whether the coding unit is split or not split. When the encoder 220 determines that only one coding unit is included in the coding unit or the coding unit is not split, the bitstream generator 210 may generate the bitstream including the split shape information indicating that the coding unit is not split. Also, the encoder 220 may split the coding unit into a plurality of coding units, and the bitstream generator 210 may generate the bitstream including the split shape information indicating that the coding unit is split into the plurality of coding units.

According to an embodiment, information indicating the number of coding units into which the coding unit is to be split or a direction in which the coding unit is to be split may be included in the split shape information. For example, the split shape information may indicate that the coding unit is split in at least one of a vertical direction and a horizontal direction or is not split.

The image encoding apparatus 200 determines split shape mode information based on a split shape mode of the coding unit. The image encoding apparatus 200 determines the context model based on at least one of the shape, the direction, the ratio between the width and the height, and the size of the coding unit. The image encoding apparatus 200 generates the split shape mode information for splitting the coding unit based on the context model as the bitstream.

In order to determine the context model, the image encoding apparatus 200 may obtain an arrangement for corresponding at least one of the shape, the direction, the ratio between the width and the height, and the size of the coding unit to an index for the context model. The image encoding apparatus 200 may obtain the index for the context model based on at least one of the shape, the direction, the ratio between the width and the height, and the size of the coding unit in the arrangement. The image encoding apparatus 200 may determine the context model based on the index for the context model.

In order to determine the context model, the image encoding apparatus 200 may determine the context model further based on block shape information including at least one of a shape, a direction, a ratio between a width and a height, and a size of a neighboring coding unit adjacent to the coding unit. Also, the neighboring coding unit may include at least one of coding units located at a left lower side, a left side, a left upper side, an upper side, a right upper side, a right side, or a right lower side of the coding unit.

Also, in order to determine the context model, the image encoding apparatus 200 may compare a length of a width of an upper neighboring coding unit with a length of the width of the coding unit. Also, the image encoding apparatus 200 may compare a length of a height of left and right neighboring coding units with a length of the height of the coding unit. Also, the image encoding apparatus 200 may determine the context model based on comparison results.

An operation of the image encoding apparatus 200 is similar to an operation of the image decoding apparatus 100 described with reference to FIGS. 3 through 24, and thus detailed descriptions thereof are not provided here.

A motion information decoding apparatus 2500 and method and a motion information encoding apparatus 2700 and method according to an embodiment are described with reference to FIGS. 25 through 38.

Figure 25:
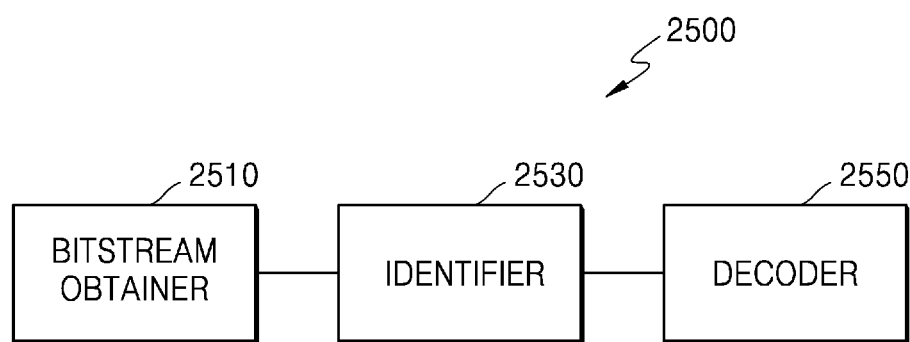
FIG. 25 is a block diagram illustrating a configuration of a motion information decoding apparatus, according to an embodiment.

Referring to FIG. 25, the motion information decoding apparatus 2500 according to an embodiment may include a bitstream obtainer 2510, an identifier 2530, and a decoder 2550.

The motion information decoding apparatus 2500 may be included in the image decoding apparatus 100. For example, the bitstream obtainer 2510 may be included in the bitstream obtainer 110 of the image decoding apparatus 100 of FIG. 1, and the identifier 2530 and the decoder 2550 may be included in the decoder 120 of the image decoding apparatus 100.

The motion information decoding apparatus 2500 may obtain pieces of motion information for decoding a block that is encoded through inter prediction. A type of the block may be square or rectangular, or an arbitrary geometric shape. The block according to an embodiment is not limited to a data unit having a predetermined size, and may include a largest coding unit, a coding unit, a prediction unit, and a transform unit from among coding units according to a tree structure.

Inter prediction in image encoding and decoding refers to a prediction method using a similarity between a current image and another image. A reference block similar to a current block of the current image is detected from a reference image that is decoded earlier than the current image, and a distance between the current block and a prediction block determined from the reference block is represented by using a motion vector. Also, a difference of pixel values between the current block and the prediction block may be represented as residual data. Image information of the current block may not be directly output, but instead, an index indicating the reference image, a motion vector, and residual data may be output, thereby improving encoding and decoding efficiency.

Figure 29:
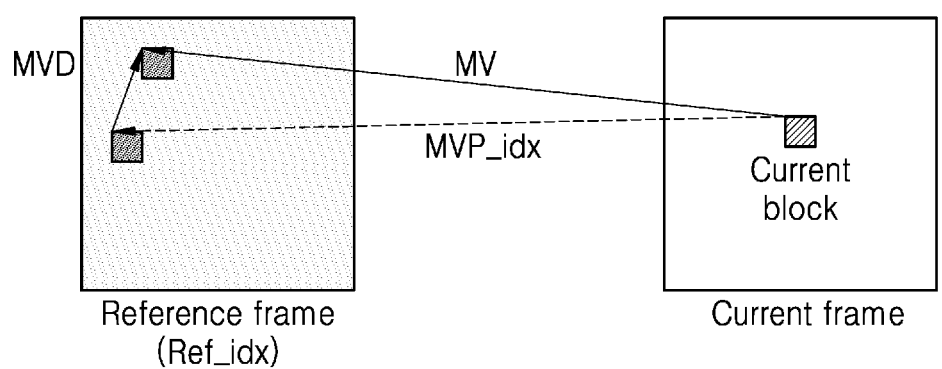
FIGS. 29 and 30 are diagrams for describing pieces of motion information used to decode an inter predicted block.

FIG. 29 is a diagram for describing a plurality of pieces of motion information used to decode a block that is unidirectionally predicted. Referring to FIG. 29, a reference image referenced by a current block is specified, according to information Ref_idx indicating the reference image. Also, a prediction candidate used as a prediction motion vector of the current block is determined from among prediction candidates according to information MVP_idx indicating the prediction motion vector. The prediction candidate may be a block spatially or temporally related to the current block or a motion vector of the block spatially or temporally related to the current block. The prediction motion vector of the current block may be determined according to information indicating the prediction motion vector, and a motion vector (MV) of the current block may be determined by combining the prediction motion vector with a motion vector difference (MVD).

When a reference block in the reference image is specified by the motion vector of the current block, the current block may be decoded by combining the specified reference block (or a prediction block determined from the reference block) with residual data.

Referring to FIG. 29, in order to decode the block that is unidirectionally inter predicted, the information Ref_idx indicating the reference image, the information MVP_idx indicating the prediction motion vector, and the motion vector difference MVD may be used as motion information.

Figure 30:
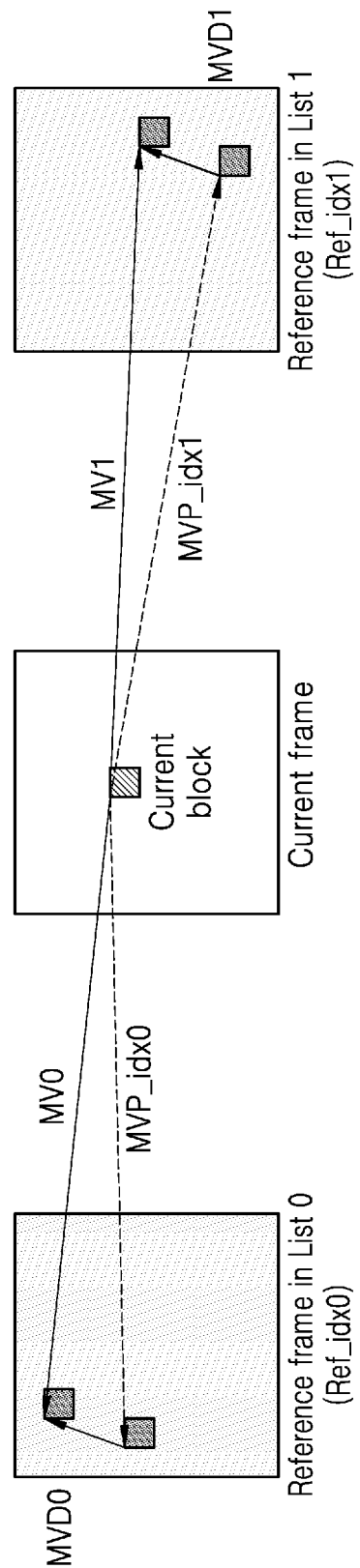

FIG. 30 is a diagram for describing a plurality of pieces of motion information used to decode a block that is bidirectionally predicted. Referring to FIG. 30, for a list 0 including at least one reference image, information Ref_idx0 indicating a reference image, information MVP_idx0 indicating a prediction motion vector, and a motion vector difference MVD0 may be used to determine a reference block in the reference image included in the list 0.

Also, for a list 1 including at least one reference image, information Ref_idx1 indicating a reference image, information MVP_idx1 indicating a prediction motion vector, and a motion vector difference MVD1 may be used to determine a reference block in the reference image included in the list 1.

A prediction block may be generated by combining the reference block corresponding to the list 0 with the reference block corresponding to the list 1, and a current block may be decoded by combining the prediction block with residual data.

Referring to FIG. 30, in order to decode a block that is bidirectionally inter predicted, the information Ref_idx0 indicating the reference image, the information MVP_idx0 indicating the prediction motion vector, and the motion vector difference MVD0 related to the list 0 and the information Ref_idx1 indicating the reference image, the information MVP_idx1 indicating the prediction motion vector, and the motion vector difference MVD1 related to the list 1 may be used as motion information.

In a codec such as HEVC, an encoder transmits all pieces of motion information for decoding an inter predicted block to a decoder, and the decoder decodes the inter predicted block based on the received pieces of motion information. However, because the amount of motion information to be transmitted to the decoder greatly increases as a resolution of an image increases, it may be inefficient in terms of bit rate.

In the present disclosure, because an encoder may omit some or all of motion information used to decode a block instead of transmitting all motion information to a decoder and the decoder may directly obtain the omitted motion information, a bit rate may be reduced.

Referring to FIG. 25, the bitstream obtainer 2510 obtains a bitstream including information for decoding an image.

In an embodiment, some motion information from among a plurality of pieces of motion information used to decode a current block may be included in the bitstream, and remaining motion information may not be included in the bitstream.

Also, in an embodiment, all of the plurality of pieces of motion information used to decode the current block may not be included in the bitstream.

In the present disclosure, motion information not included in the bitstream from among the plurality of pieces of motion information used to decode the current block is referred to as omission motion information.

The pieces of motion information used to decode the current block may include information indicating a reference image (hereinafter, referred to as reference image information), information indicating a prediction motion vector (hereinafter, referred to as prediction motion vector information), and a motion vector difference. In an embodiment, when a motion vector of the current block is determined according to a MVR selected from among multiple MVRs, information about an MVR of the current block (hereinafter, referred to as MVR information) may be further included in the motion information used to decode the current block.

When the current block is unidirectionally predicted, the number of pieces of MVR information of the current block may be 1. For example, the MVR information of the current block may include an index MVR_idx indicating one of multiple MVRs. Also, when the current block is bidirectionally predicted, the number of pieces of MVR information may be 1 or 2. For example, the MVR information of the current block may include the index MVR_idx indicating one of multiple MVRs or indexes MVR_idx0 and MVR_idx1 indicating two from among the multiple MVRs. A motion vector MV0 corresponding to the list 0 may be derived according to an MVR indicated by the index MVR_idx0, and a motion vector MV1 corresponding to the list 1 may be derived according to an MVR indicated by the index MVR_idx1.

The identifier 2530 identifies a type of the omission motion information not included in the bitstream from among the plurality of pieces of motion information used to decode the current block.

In an embodiment, the identifier 2530 may obtain some motion information from among the plurality of pieces of motion information from the bitstream, and may identify motion information not obtained from the bitstream from among the plurality of pieces of motion information as the omission motion information.

In an embodiment, when no information is obtained from the bitstream, the identifier 2530 may identify all of the plurality of pieces of motion information as the omission motion information.

In an embodiment, the identifier 2530 may determine whether a motion information omission process is applied to the current block, and when the motion information omission process is applied to the current block, the identifier 2530 may determine that there exists the omission motion information. In an embodiment, when it is determined that the motion information omission process is applied, the identifier 2530 may determine that at least some of preset kinds of motion information are not included in the bitstream. In other words, when it is determined that the motion information omission process is applied, the identifier 2530 may determine that at least some of preset types of motion information have to be obtained according to a predetermined method.

In an embodiment, whether the motion information omission process is applied to the current block may be determined based on at least one of an MVR of the current block, a prediction direction of the current block, information about the current block, information about a previously decoded neighboring block, and a flag indicating whether the motion information omission process is applied.

When the at least one of the MVR of the current block, the prediction direction of the current block, the information about the current block, and the information about the previously decoded neighboring block is used, the decoder 2550 may determine whether the motion information omission process is applied to the current block based on the same criterion as the motion information encoding apparatus 2700.

For example, when the MVR of the current block corresponds to a predetermined MVR (e.g., a ¼ pixel unit resolution), the identifier 2530 may determine that the motion information omission process is applied to the current block.

For example, when the current block is bidirectionally predicted, the identifier 2530 may determine that the motion information omission process is applied to the current block.

Also, for example, the identifier 2530 may determine whether the motion information omission process is applied based on the information about the current block. The identifier 2530 may determine whether the motion information omission process is applied by comparing a size of the current block with a preset size. In detail, when a horizontal size or a vertical size of the current block is equal to or greater than the preset size, the identifier 2530 may determine that the motion information omission process is applied to the current block.

For example, the identifier 2530 may determine whether the motion information omission process is applied, based on information about a size, an MVR, a prediction mode, or a prediction direction of the previously decoded neighboring block.

Also, for example, the identifier 2530 may determine whether the motion information omission process is applied to the current block according to the flag indicating whether the motion information omission process is applied, which is obtained from the bitstream. For example, when the flag corresponds to 1, the identifier 2530 may determine that the motion information omission process is applied to the current block.

In an embodiment, the identifier 2530 may determine an omission mode of motion information, and may identify which motion information is the omission motion information based on the determined omission mode.

The omission mode of the motion information may be determined based on at least one of the MVR of the current block, the prediction direction of the current block, the information about the current block, the information about the previously decoded neighboring block, and an index (or a flag) indicating the omission mode.

In an embodiment, when the at least one of the MVR of the current block, the prediction direction of the current block, the information about the current block, and the information about the previously decoded neighboring block is used, the decoder 2550 may determine based on the same criterion as the motion information encoding apparatus 2700.

At least one of the number and a type of omission motion information may be determined for each omission mode of motion information. For example, at least one of the number and a type of omission motion information in a first omission mode and at least one of the number and a type of omission motion information in a second omission mode may be independently determined. In an embodiment, at least one of the number and a type of omission motion information may vary according to each omission mode of motion information.

FIGS. 31 and 32 are diagrams illustrating a type of omission motion information corresponding to a motion information omission mode.

Referring to FIG. 31, the omission motion information may be the reference image information Ref_idx and the prediction motion vector information MVP_idx in a mode 1, and the omission motion information may be the reference image information Ref_idx in a mode 2. Also, the omission motion information may be the reference image information Ref_idx, the prediction motion vector information MVP_idx, and the motion vector difference MVD in a mode 3.

Referring to FIG. 32, there may be no omission motion information in the mode 1, the omission motion information may be the motion vector difference MVD0 corresponding to the list 0 in the mode 2, and the omission motion information may be the motion vector difference MVD1 corresponding to the list 1 in the mode 3.

At least one of a type and the number of omission motion information corresponding to a motion information omission mode may be individually determined when a current block is unidirectionally predicted and when the current block is bidirectionally predicted. For example, when the current block is unidirectionally predicted, the omission motion information corresponding to the mode 1 may be reference image information, and when the current block is bidirectionally predicted, the omission motion information corresponding to the mode 1 may be reference image information corresponding to the list 0 and a motion vector difference corresponding to the list 0. In other words, the identifier 2530 may determine a prediction direction of the current block and the motion information omission mode, and may identify a type of the omission motion information based on the determined prediction direction and motion information omission mode.

The number of modes, and the number and a type of omission motion information corresponding to each mode in FIGS. 31 and 323 are merely examples, and the number of modes and the number and a type of omission motion information corresponding to each mode may be modified in various ways without departing from the scope of the present disclosure.

As described above, the identifier 2530 may determine an omission mode of motion information and may identify a type of omission motion information based on the determined omission mode.

For example, the identifier 2530 may determine the omission mode of the motion information based on an MVR of the current block. For example, when the MVR of the current block is a ¼ pixel unit resolution, the identifier 2530 may determine a first mode as the omission mode, and when the MVR of the current block is a ½ pixel unit resolution, the identifier 2530 may determine a second mode as the omission mode.

Also, for example, the identifier 2530 may determine the omission mode according to whether the current block is predicted with reference to a reference image in the list 0 (i.e., unidirectional prediction), the current block is predicted with reference to a reference image in the list 1 (i.e., unidirectional prediction), or the current block is predicted with reference to the reference image in the list 0 and the reference image in the list 1 (i.e., bidirectional prediction). For example, when the current block refers to the reference image in the list 0, the identifier 2530 may determine the first mode as the omission mode; when the current block refers to the reference image in the list 1, the identifier 2530 may determine the second mode as the omission mode; and when the current block refers to the reference image in the list 0 and the reference image in the list 1, the identifier 2530 may determine a third mode as the omission mode.

Also, for example, the identifier 2530 may determine the omission mode of the motion information based on information about the current block. For example, the identifier 2530 may determine the omission mode of the motion information by comparing a size of the current block with a preset size. In detail, when a horizontal size or a vertical size of the current block is equal to or greater than the preset size, the identifier 2530 may determine the first mode as the omission mode, and the horizontal size or the vertical size of the current block is less than the preset mode, the identifier 2530 may determine the second mode as the omission mode.

Also, for example, the identifier 2530 may determine the omission mode of the motion information based on information about a previously decoded neighboring block. For example, the identifier 2530 may determine the omission mode of the motion information based on information about a size, an MVR, a prediction mode, or a prediction direction of the previously decoded neighboring block.

Also, for example, the identifier 2530 may obtain an index (or a flag) indicating the omission mode from a bitstream, and may determine the omission mode according to the obtained index (or flag). For example, when the obtained index corresponds to 0, the identifier 2530 may determine the mode 1 as the omission mode; when the index corresponds to 1, the identifier 2530 may determine the mode 2 as the omission mode; and when the index corresponds to 2, the identifier 2530 may determine the mode 3 as the omission mode.

When a type of the omission motion information is identified by the identifier 2530, the decoder 2550 obtains the omission motion information by using a predetermined method. The decoder 2550 may decode the current block by using a plurality of pieces of motion information including the omission motion information and a motion information obtainable from the bitstream.

As described above, the plurality of pieces of motion information may include reference image information, prediction motion vector information and a motion vector difference. The decoder 2550 obtains a motion vector of the current block by adding a prediction motion vector to the motion vector difference, and searches for a reference block in a reference image based on the motion vector. The decoder 2550 reconstructs the current block in a spatial domain by adding inversely quantized and inversely transformed residual data to the reference block (or prediction block). An image including the reconstructed current block may be filtered, and the filtered image may be used as a reference image of a next image.

A method, performed by the decoder 2550, of obtaining omission motion information will now be described in detail.

In an embodiment, the decoder 2550 may obtain the omission motion information by using motion information of at least one candidate block spatially or temporally related to the current block.

Figure 33:
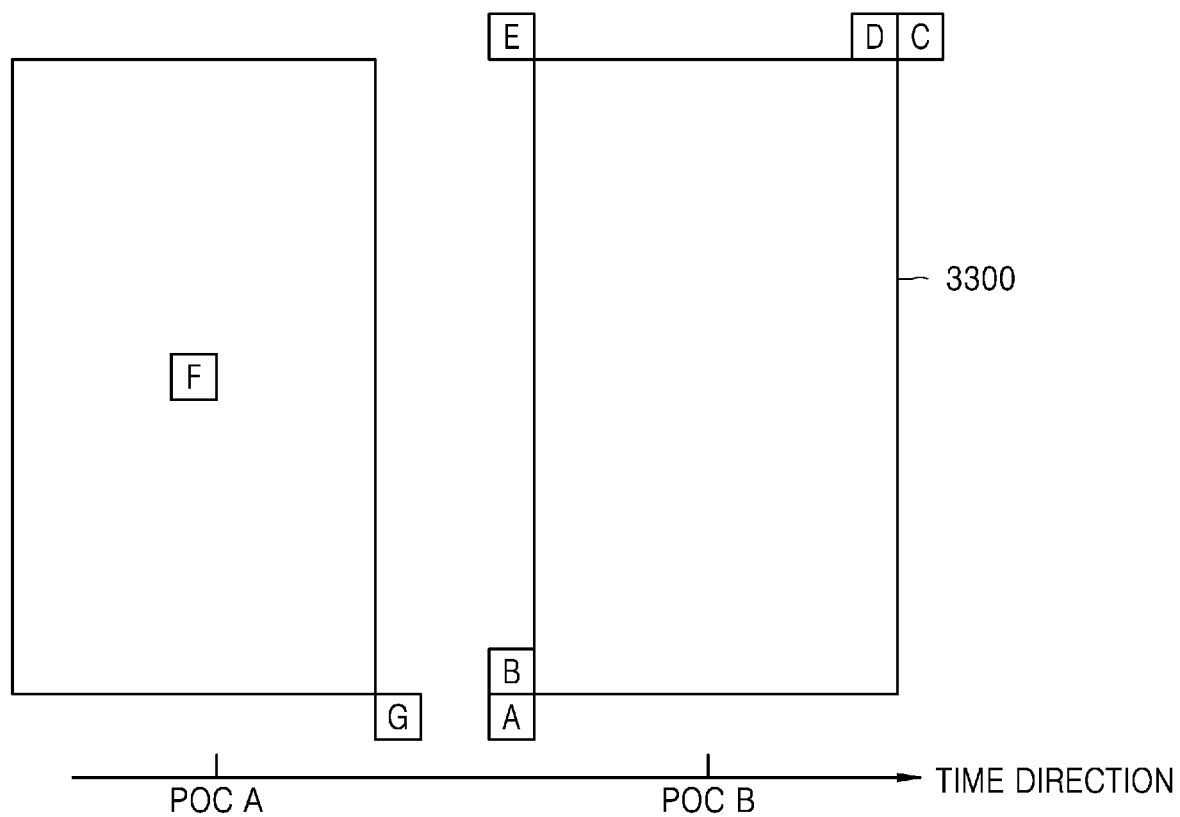
FIG. 33 is a diagram illustrating candidate blocks used to obtain omission information, according to an embodiment.

FIG. 33 illustrates candidate blocks spatially or temporally related to a current block. The candidate blocks are blocks that are decoded earlier than the current block, and spatial blocks may include at least one block spatially adjacent to the current block. Also, temporal blocks may include a block located at the same position as the current block in a reference image having a picture order count (POC) different from a POC of a current picture and at least one block spatially adjacent to the block at the same position.

Referring to FIG. 33, spatial blocks spatially related to a current block 3300 may include a left bottom outer block A, a left lower block B, a right top outer block C, an upper right block D, and a left top outer block E. Also, temporal blocks temporally related to the current block 3300 may include a block F that is located at the same position as the current block 3300 in a reference image having a POC different from that of the current block 3300 and a block G adjacent to the block F at the same position. The candidate blocks of FIG. 33 may be merely examples, and in an embodiment, one or more candidate blocks used to obtain omission motion information may include only spatial blocks spatially related to a current block or only temporal blocks temporally related to the current block.

In an embodiment, the decoder 2550 may determine whether there exists motion information of a plurality of candidate blocks spatially or temporally related to a current block according to preset priority order and may obtain omission motion information based on motion information of a candidate block whose motion information is first determined to exist. For example, when the priority order is set from the block A to the block G, the decoder 2550 sequentially searches for candidate blocks having motion information from the block A to the block G. The decoder 2550 may obtain the omission motion information by using the motion information of the candidate block whose motion information is first determined to exist. For example, when a type of the omission motion information is reference image information and prediction motion vector information, the decoder 2550 may determine motion information of the candidate block whose motion information is first determined to exist, specifically, reference image information and prediction motion vector information, and may determine the determined information as the omission motion information.

Also, in an embodiment, the decoder 2550 may obtain the omission motion information by combining pieces of motion information of a plurality of candidate blocks having motion information from among the plurality of candidate blocks spatially or temporally related to the current block. For example, the decoder 2550 may combine the pieces of motion information of the plurality of candidate blocks having the motion information according to a predetermined equation, and may obtain a combination result as the omission motion information. The predetermined equation may include an equation for deriving an average value, a median value, etc. For example, assuming that a type of the omission motion information is the reference image information Ref_idx, when the reference image information Ref_idx of the block A is 1 and the reference image information Ref_idx of the block B is 3, the decoder 2550 may obtain 2 that is an average value as the reference image information of the current block. The reference image information and the prediction motion vector information in the motion information may be represented by using integer values, and when a value derived through the predetermined equation is not an integer value, the value may be rounded up, rounded down, or rounded off and the omission motion information may be obtained. For example, when the reference image information Ref_idx of the block A is 1 and the reference image information Ref_idx of the block B is 2, the decoder 2550 may determine 2 obtained by rounding off 1.5 that is an average value therebetween as the reference image information Ref_idx of the current block.

In an embodiment, the decoder 2550 may determine the omission motion information based on preset base motion information. In an embodiment, the decoder 2550 may set the base motion information in a picture unit, a slice unit, or a block unit. Alternatively, the decoder 2550 may obtain the base motion information in a picture unit, a slice unit, or a block unit from a bitstream.

The decoder 2550 may use the base motion information to obtain the omission motion information. For example, as the base motion information, the reference image information Ref_idx may be set to 0, the prediction motion vector information MVP_idx may be set to 0, and the motion vector difference MVD may be set to 0. When a type of the omission motion information is the reference image information Ref_idx and the prediction motion vector information MVP_idx, the decoder 2550 may determine that values of the reference image information Ref_idx and the prediction motion vector information MVP_idx of the current block are 0. A value set as the base motion information may be modified in various ways without departing from the scope of the present disclosure.

Also, in an embodiment, the decoder 2550 may obtain the omission motion information based on motion information derived through decoder side motion vector derivation (DMVD). DMVD is technology that directly derives motion information at a decoder side, rather than causing motion information to be explicitly included in a bitstream and a decoder to obtain the motion information, and is technology that derives motion information of a current block through template matching or bidirectional template matching. Template matching is a method using a correlation between pixels in blocks adjacent to a prediction target block and pixels in reference images that are already decoded.

In an embodiment, when there are a plurality of methods for obtaining the omission motion information, the decoder 2550 may obtain the omission motion information by using at least one method. In an embodiment, the decoder 2550 may select a method based on a type of the omission motion information to be obtained, and may obtain the omission motion information according to the selected method. For example, when the omission motion information to be obtained is reference image information, the omission motion information may be obtained by using a first method; when the omission motion information is prediction motion vector information, the omission motion information may be obtained by using a second method; and when the omission motion information is a motion vector difference, the omission motion information may be obtained by using a third method.

Also, in an embodiment, when there are a plurality of pieces of omission motion information to be obtained, the decoder 2550 may obtain each of the plurality of pieces of omission motion information by using different methods.

In an embodiment, when a method of obtaining the omission motion information based on motion information of a candidate block is the first method, a method of obtaining the omission motion information based on base motion information is the second method, and a method of obtaining the omission motion information based on motion information determined through DMVD is the third method, each of the plurality of pieces of omission motion information may be obtained by using different methods from among the first method, the second method, and the third method. For example, the reference image information may be determined by using the first method, the prediction motion vector information may be determined by using the second method, and the motion vector difference may be determined by using the third method.

Figure 34:
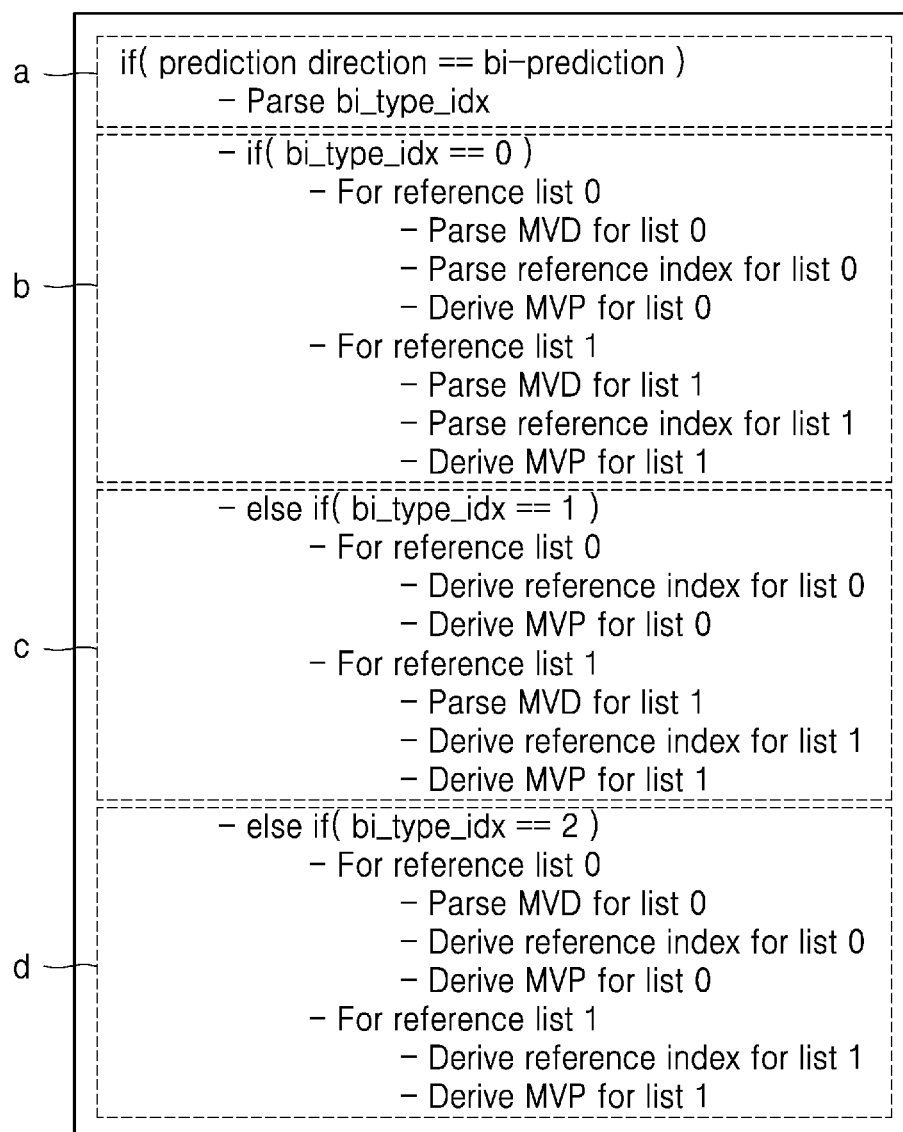
FIG. 34 illustrates syntax for obtaining omission information according to a motion information omission mode for a bidirectionally predicted block.

FIG. 34 illustrates syntax for obtaining omission motion information according to a motion information omission mode for a bidirectionally predicted block.

When it is determined that a current block is bidirectionally predicted, the syntax of FIG. 34 indicates a procedure of determining that a motion information omission process is applied to the current block, identifying a type of omission motion information according to information bi_type_idx indicating a bidirectional prediction type, and obtaining the omission motion information according to a predetermined method.

Referring to FIG. 34, in a phrase 'a', when the current block is bidirectionally predicted, bi_type_idx is extracted. When the current block is bidirectionally predicted, it may be determined that the motion information omission process is applied to the current block.

bi_type_idx is an index indicating an omission mode, and when the index bi_type_idx corresponds to 0, it is determined that the omission mode is the mode 1. Referring to a phrase 'b', in the mode 1, a motion vector difference and a reference image index corresponding to the list 0 and a motion vector difference and a reference image index corresponding to the list 1 are parsed, that is, are obtained from a bitstream. A prediction motion vector corresponding to the list 0 and a prediction motion vector corresponding to the list 1 are identified as omission motion information. The prediction motion vector corresponding to the list 0 and the prediction motion vector corresponding to the list 1 may be determined according to a predetermined method.

When bi_type_idx corresponds to 1, it is determined that the omission method is the mode 2. Referring to a phrase 'c', in the mode 2, only the motion vector difference corresponding to the list 1 is parsed. The motion vector difference, the reference image index, and the prediction motion vector corresponding to the list 0 and the reference image index and the prediction motion vector corresponding to the list 1 are determined as the omission motion information. The prediction motion vector and the reference image index corresponding to the list 0 and the prediction motion vector and the reference image index corresponding to the list 1 may be determined according to a predetermined method. In the mode 2, the motion vector difference corresponding to the list 0 may be determined as 0 (or a zero vector) that is a preset value. Accordingly, the prediction motion vector corresponding to the list 0 may be the motion vector MV0 of the current block. According to an embodiment, in the mode 2, at least one of the reference image index corresponding to the list 0 and the reference image index corresponding to the list 1 may be parsed from the bitstream, without being determined as the omission motion information.

According to an embodiment, in the mode 2, the motion vector difference corresponding to the list 0 may not be included in a plurality of pieces of motion information used to decode the current block. Accordingly, even when the motion vector difference corresponding to the list 0 is not obtainable from the bitstream, the decoder 2550 may not identify the motion vector difference corresponding to the list 0 as the omission motion information, and may search for the reference block by using only the reference image index and the prediction motion vector corresponding to the list 0.

When bi_type_idx corresponds to 2, it is determined that the omission mode is the mode 3. Referring to a phrase 'd', in the mode 3, only the motion vector difference corresponding to the list 0 is parsed. The reference image index and the prediction motion vector corresponding to the list 0 and the reference image index, the prediction motion vector, and the motion vector difference corresponding to the list 1 are determined as the omission motion information. The prediction motion vector and the reference image index corresponding to the list 0 and the prediction motion vector and the reference image index corresponding to the list 1 may be determined according to a predetermined method. In the mode 3, the motion vector difference corresponding to the list 1 may be determined as 0 (or a zero vector) that is a preset value. Accordingly, the prediction motion vector corresponding to the list 1 may be the motion vector MV1 of the current block. According to an embodiment, in the mode 3, at least one of the reference image index corresponding to the list 0 and the reference image index corresponding to the list 1 may be parsed from the bitstream, without being determined as the omission motion information.

According to an embodiment, in the mode 3, the motion vector difference corresponding to the list 1 may not be included in the plurality of pieces of motion information used to decode the current block. Accordingly, even when the motion vector difference corresponding to the list 1 is not obtainable from the bitstream, the decoder 2550 may not identify the motion vector difference corresponding to the list 1 as the omission motion information, and may search for the reference block by using only the reference image index and the prediction motion vector corresponding to the list 1.

In an embodiment, when an MVR of the current block is included in the motion information used to decode the current block, the bitstream obtainer 2510 may obtain information indicating the MVR of the current block from the bitstream.

FIG. 35 is a diagram illustrating syntax for obtaining information about an MVR from a bitstream.

Referring to FIG. 35, when a slice including a current coding unit in a phrase 'a' is not an I slice, cu_skip_flag is extracted from a phrase 'b'. cu_skip_flag indicates whether a skip mode is to be applied to the current coding unit. When it is determined that the skip mode is applied in a phrase 'c', the current coding unit is processed in the skip mode. When it is determined that the skip mode is not applied in a phrase 'd', pred_mode_flag is extracted in a phrase 'e'. pred_mode_flag indicates whether the current coding unit is intra predicted or inter predicted. When the current coding unit is not intra predicted, that is, is inter predicted in a phrase 'f', pred_mvr_idx is extracted in a phrase 'g'. pred_mvr_idx may be an index indicating an MVR of the current coding unit, and an MVR corresponding to each index may be as shown in Table 2.

TABLE 2

| MVR Index | 0 | 1 | 2 | 3 | 4 |
|---|---|---|---|---|---|
| Resolution (R) in pel | ¼ | ½ | 1 | 2 | 4 |

The MVR of the current block may refer to the precision of a position of a pixel that may be indicated by a motion vector of the current block from among pixels included in a reference image (or an interpolated reference image). The MVR of the current block may be selected from among one or more candidate MVRs. The one or more candidate MVRs may include at least one of, but not limited to, an MVR of ⅛ pixel unit, an MVR of ¼ pixel unit, an MVR of ½ pixel unit, an MVR of 1 pixel unit, an MVR of 2 pixel unit, an MVR of 4 pixel unit, and an MVR of 8 pixel unit.

In an embodiment, the bitstream obtainer 2510 may obtain information about the MVR of the current block from the bitstream in a block unit, a slice unit, or a picture unit. In an embodiment, when MVR information of the current block is identified as omission motion information, the decoder 2550 may determine the MVR of the current block according to a predetermined method.

In an embodiment, when a motion vector of the current block is determined according to a predetermined MVR, the decoder 2550 may adjust a prediction motion vector and/or a motion vector difference. When the prediction motion vector and/or the motion vector difference of the current block are adjusted, it may mean that a position of a pixel indicated by the prediction motion vector and/or the motion vector difference of the current block is changed according to the MVR of the current block. A method of adjusting the prediction motion vector and/or the motion vector difference of the current block will be described below with reference to FIGS. 36 through 38.

Figure 26:
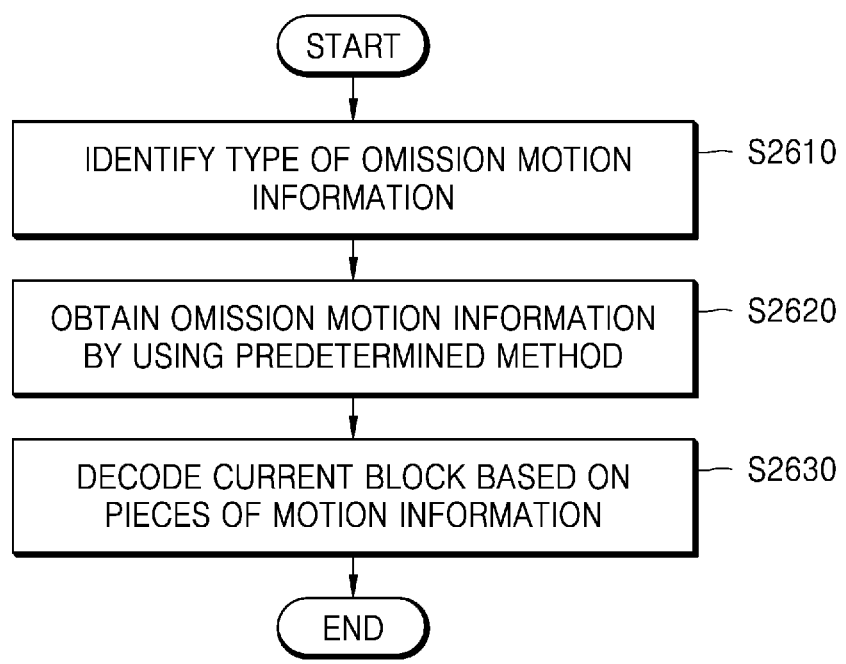
FIG. 26 is a flowchart for describing a motion information decoding method, according to an embodiment.

FIG. 26 is a flowchart for describing a motion information decoding method, according to an embodiment.

In operation S2610, the motion information decoding apparatus 2500 identifies a type of omission motion information not included in a bitstream from among a plurality of pieces of motion information used to decode a current block that is inter predicted.

In an embodiment, when it is determined that a motion information omission process is applied to the current block, the motion information decoding apparatus 2500 may recognize that there exists the omission motion information. The motion information decoding apparatus 2500 may determine a motion information omission mode, and may identify a type of the omission motion information based on the determined motion information omission mode.

In operation S2620, the motion information decoding apparatus 2500 may obtain the omission motion information based on a predetermined method.

For example, the motion information decoding apparatus 2500 may obtain the omission motion information based on motion information of at least one candidate block.

For example, the motion information decoding apparatus 2500 may obtain the omission motion information based on preset base motion information.

Also, for example, the motion information decoding apparatus 2500 may obtain the omission motion information based on motion information obtained through DMVD.

A method of obtaining the omission motion information has been described above in detail, detailed descriptions thereof will not be provided here.

The motion information decoding apparatus 250 may obtain motion information other than the omission motion information from among the plurality of pieces of motion information from the bitstream.

In operation S2630, the motion information decoding apparatus 250 decodes the current block based on the plurality of pieces of motion information including the obtained omission motion information.

Figure 27:
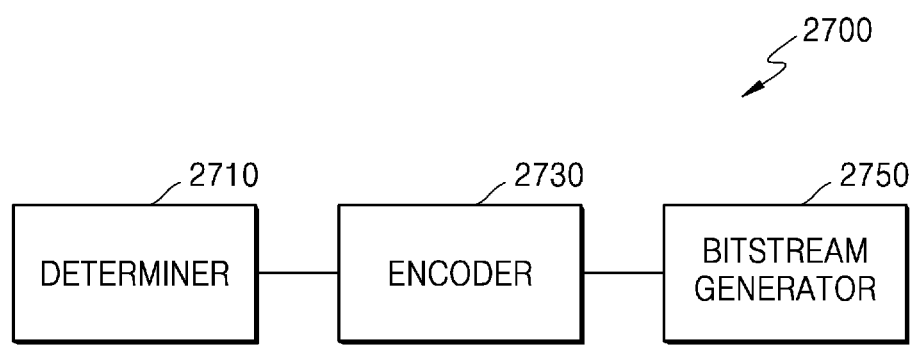
FIG. 27 is a block diagram illustrating a configuration of a motion information encoding apparatus, according to an embodiment.

FIG. 27 is a block diagram illustrating a configuration of the motion information encoding apparatus 2700, according to an embodiment.

Referring to FIG. 27, the motion information encoding apparatus 2700 according to an embodiment may include a determiner 2710, an encoder 2730, and a bitstream generator 2750. The motion information encoding apparatus 2700 may be included in the image encoding apparatus 200. For example, the determiner 2710 and the encoder 2730 of the motion information encoding apparatus 2700 may be included in the encoder 220 of the image encoding apparatus 200, and the bitstream generator 2750 of the motion information encoding apparatus 2700 may be included in the bitstream generator 210 of the image encoding apparatus 200.

The determiner 2710 determines a type of omission motion information to be omitted from a bitstream from among a plurality of pieces of motion information used to decode a current block that is to be inter predicted.

As described above, the plurality of pieces of motion information used to decode the current block may include reference image information, prediction motion vector information, and a motion vector difference, and may further include MVR information of the current block according to an embodiment.

The determiner 2710 may determine whether a motion information omission process is to be applied to the current block, before determining that some or all of the plurality of pieces of motion information is omitted.

In an embodiment, the determiner 2710 may determine whether the motion information omission process is applied according to a predetermined criterion.

In an embodiment, the determiner 2710 may determine whether the motion information omission process is applied, based on at least one of an MVR of the current block, a prediction direction of the current block, information about the current block, and information about a previously encoded neighboring block.

In an embodiment, the determiner 2710 may determine whether the motion information omission process is applied, based on the same criterion as the motion information decoding apparatus 2500, in consideration of a case where information indicating whether the motion information omission process is applied is not transmitted to the motion information decoding apparatus 2500.

For example, when the MVR of the current block corresponds to a predetermined MVR (e.g., a ¼ pixel unit resolution), the determiner 2710 may determine that the motion information omission process is applied to the current block.

For example, when the current block is bidirectionally predicted, the determiner 2710 may determine that the motion information omission process is applied to the current block.

Also, for example, the determiner 2710 may determine whether the motion information omission process is applied based on the information about the current block. The determiner 2710 may determine whether the motion information omission process is applied by comparing a size of the current block with a preset size.

For example, the determiner 2710 may determine whether the motion information omission process is applied, based on information about a size, an MVR, a prediction mode, or a prediction information of a previously decoded neighboring block.

In an embodiment, the determiner 2710 may determine a motion information omission mode of the current block, and may determine a type of the omission motion information not included in the bitstream based on the determined motion information omission mode.

In an embodiment, the determiner 2710 may determine the motion information omission mode according to a predetermined criterion.

In an embodiment, the determiner 2710 may determine the motion information omission mode based on at least one of the MVR of the current block, the prediction direction of the current block, the information about the current block, and the information about the previously encoded neighboring block.

In an embodiment, the determiner 2710 may determine the motion information omission mode based on the same criterion as the motion information decoding apparatus 2500, in consideration of a case where information indicating the motion information omission mode is not transmitted to the motion information decoding apparatus 2500.

At least one of the number and a type of omission motion information may be determined for each omission mode of motion information. For example, at least one of the number and a type of the omission motion information in a first omission mode and at least one of the number and a type of the omission motion information in a second omission mode may be individually determined. At least one of the number and a type of the omission motion information may vary according to each omission mode.

A type of the omission motion information corresponding to the motion omission information mode may be individually determined when the current block is unidirectionally predicted and when the current block is bidirectionally predicted.

In an embodiment, the determiner 2710 may determine an omission mode of motion information based on the MVR of the current block. For example, when the MVR of the current block is a ¼ pixel unit resolution, the determiner 2710 may determine the first mode as the omission mode, and when the MVR of the current block is a ½ pixel unit resolution, the determiner 2710 may determine the second mode as the omission mode.

Also, in an embodiment, the determiner 2710 may determine the omission mode according to whether the current block refers to a reference image in the list 0 (i.e., unidirectional prediction), whether the current block refers to a reference image in the list 1 (i.e., unidirectional prediction), or whether the current block refers to the reference image in the list 0 and the reference image in the list 1 (i.e., bidirectional prediction).

Also, in an embodiment, the determiner 2710 may determine the omission mode of the motion information based on the information about the current block. For example, the determiner 2710 may determine the omission mode of the motion information by comparing a size of the current block with a preset size. In detail, when a horizontal size or a vertical size of the current block is equal to or greater than the preset size, the determiner 2710 may determine the first mode as the omission mode, and when the horizontal size or the vertical size of the current block is less than the preset size, the determiner 2710 may determine the second mode as the omission mode.

Also, in an embodiment, the determiner 2710 may determine the omission mode of the motion information based on information about the previously decoded neighboring block. For example, the determiner 2710 may determine the omission mode of the motion information based on information about a size, an MVR, a prediction mode, or a prediction direction of the previously decoded neighboring block.

When a type of the omission motion information is determined by the determiner 2710, the encoder 2730 obtains the omission motion information based on a predetermined method.

In an embodiment, the encoder 2730 may obtain the omission motion information by using motion information of at least one candidate block spatially or temporally related to the current block.

In an embodiment, the encoder 2730 may determine whether there exists motion information of a plurality of candidate blocks spatially or temporally related to the current block according to preset priority order and may obtain the omission motion information based on motion information of a candidate block whose motion information is first determined to exist.

Also, in an embodiment, the encoder 2730 may obtain the omission motion information by combining pieces of motion information of a plurality of candidate blocks having motion information from among the plurality of candidate blocks spatially or temporally related to the current block. For example, the encoder 2730 may combine the pieces of motion information of the plurality of candidate blocks having the motion information according to a predetermined equation, and may obtain a combination result as the omission motion information. The predetermined equation may include an equation for deriving an average value, a median value, etc.

In an embodiment, the encoder 2730 may determine the omission motion information based on base motion information. The base motion information may be previously set in the encoder 2730. In an embodiment, the encoder 2730 may set the base motion information in a picture unit, a slice unit, or a block unit. In an embodiment, the bitstream generator 2750 may cause the base motion information determined in the picture unit, the slice unit, or the block unit to be included in the bitstream.

Also, in an embodiment, the encoder 2730 may obtain the omission motion information based on motion information derived through DMVD.

In an embodiment, when there are a plurality of methods for obtaining the omission motion information, the encoder 2730 may obtain the omission motion information by using at least one method. In an embodiment, the encoder 2730 may select a method based on a type of the omission motion information to be obtained, and may obtain the omission motion information according to the selected method. For example, when the omission motion information to be obtained is reference image information, the omission motion information may be obtained by using the first method; when the omission motion information is prediction motion vector information, the omission motion information may be obtained by using the second method; and when the omission motion information is a motion vector difference, the omission motion information may be obtained by using the third method.

Also, in an embodiment, when there are a plurality of pieces of omission motion information to be obtained, the encoder 2730 may obtain each of the plurality of pieces of omission motion information by using different methods.

Also, the encoder 2730 may determine remaining motion information based on the obtained omission motion information. For example, the encoder 2730 may determine the remaining motion information based on a cost. A rate-distortion cost may be used during cost calculation.

For example, when the omission motion information includes reference image information, a reference image referenced by the current block may be specified according to the reference image information determined based on a predetermined method, and a prediction candidate to be used as a prediction motion vector may be selected based on a cost from among one or more prediction candidates. The encoder 2730 may determine a distance between the current block and a reference block searched in a reference image as a motion vector, and may determine a difference between a motion vector of the current block and a prediction motion vector as a motion vector difference.

Also, for example, when the omission motion information includes prediction motion vector information, the encoder 2730 obtains a prediction motion vector based on a predetermined method, and determines one or more reference images for the current block based on a cost from among previously encoded images. The encoder 27360 may determine a motion vector based on the determined reference images, and may determine a difference between the prediction motion vector obtained according to a predetermined method and a motion vector of the current block as a motion vector difference.

Also, for example, when the omission motion information includes a motion vector difference, the encoder 2730 determines the motion vector difference based on a predetermined method. For example, the encoder 2730 may determine the motion vector difference as a zero vector. The encoder 2730 may determine a reference image of the current block based on a cost, and derives motion vectors corresponding to each prediction candidate by combining each prediction candidate with the motion vector difference determined according to a predetermined method. The encoder 2730 may determine one motion vector based on a cost from among the motion vectors and may determine a prediction candidate corresponding to the determined motion vector as a prediction motion vector.

Also, for example, when the omission motion information includes MVR information, the encoder 2730 may obtain an MVR of the current block based on a predetermined method, and may determine a reference image, a prediction motion vector, and a motion vector difference based on a cost.

In an embodiment, when the current block is bidirectionally predicted, the encoder 2730 may determine that a motion information omission process is applied to the current block, and may determine a motion information omission mode of the mode 1, the mode 2, or the mode 3.

For example, when the motion information omission mode is the mode 1, the encoder 2730 may determine a motion vector difference and a reference image index corresponding to the list 0 and a motion vector difference and a reference image index corresponding to the list 1 as motion information to be included in the bitstream, and may determine a prediction motion vector corresponding to the list 0 and a prediction motion vector corresponding to the list 1 as the omission motion information. The prediction motion vector corresponding to the list 0 and the prediction motion vector corresponding to the list 1 may be determined according to a predetermined method.

For example, when the motion information omission mode is the mode 2, the encoder 2730 may determine the motion vector difference corresponding to the list 1 as motion information to be included in the bitstream. The encoder 2730 may determine the motion vector difference, the reference image index, and the prediction motion vector corresponding to the list 0 and the reference image index and the prediction motion vector corresponding to the list 1 as the omission motion information. The prediction motion vector and the reference image index corresponding to the list 0 and the prediction motion vector and the reference image index corresponding to the list 1 may be determined according to a predetermined method. In the mode 2, the motion vector difference corresponding to the list 0 may be determined as 0 (or a zero vector) that is preset value. According to an embodiment, in the mode 2, the motion vector difference corresponding to the list 0 may not be included in the plurality of pieces of motion information used to decode the current block. Accordingly, even when the motion vector difference corresponding to the list 0 is not included in the bitstream, the encoder 2730 may not separately obtain the motion vector difference.

For example, when the motion information omission mode is the mode 3, the encoder 2730 may determine the motion vector difference corresponding to the list 0 as motion information to be included in the bitstream. The encoder 2730 may determine the reference image index and the prediction motion vector corresponding to the list 0, and the reference image index, the prediction motion vector, and the motion vector difference corresponding to the list 1 as the omission motion vector. The prediction motion vector and the reference image index corresponding to the list 0 and the prediction motion vector and the reference image index corresponding to the list 1 may be obtained according to a predetermined method. In the mode 3, the motion vector difference corresponding to the list 1 may be determined as 0 (or a zero vector) that is a preset value. According to an embodiment, in the mode 3, the motion vector difference corresponding to the list 1 may not be included in the plurality of pieces of motion information used to decode the current block. Accordingly, even when the motion vector difference corresponding to the list 1 is not included in the bitstream, the encoder 2730 may not separately obtain the motion vector difference.

The bitstream generator 2750 generates the bitstream including information related to the current block that is encoded according to inter prediction.

In an embodiment, the bitstream may include at least one of information indicating whether the motion information omission process is applied, information indicating the motion information omission mode, and motion information other than the omission motion information from among the plurality of pieces of motion information.

Also, the bitstream may further include information indicating the MVR of the current block that is one of motion information. The bitstream including the information indicating the MVR may have such a structure as the syntax of FIG. 35.

In an embodiment, when a motion vector of the current block is determined according to a predetermined MVR, the encoder 2730 may adjust a prediction motion vector and/or a motion vector difference. When the prediction motion vector and/or the motion vector difference of the current block is adjusted, it may mean that a position of a pixel indicated by the prediction motion vector and/or the motion vector difference of the current block is changed according to the MVR of the current block. A method of adjusting the prediction motion vector and/or the motion vector difference of the current block will be described below with reference to FIGS. 36 through 38.

Figure 28:
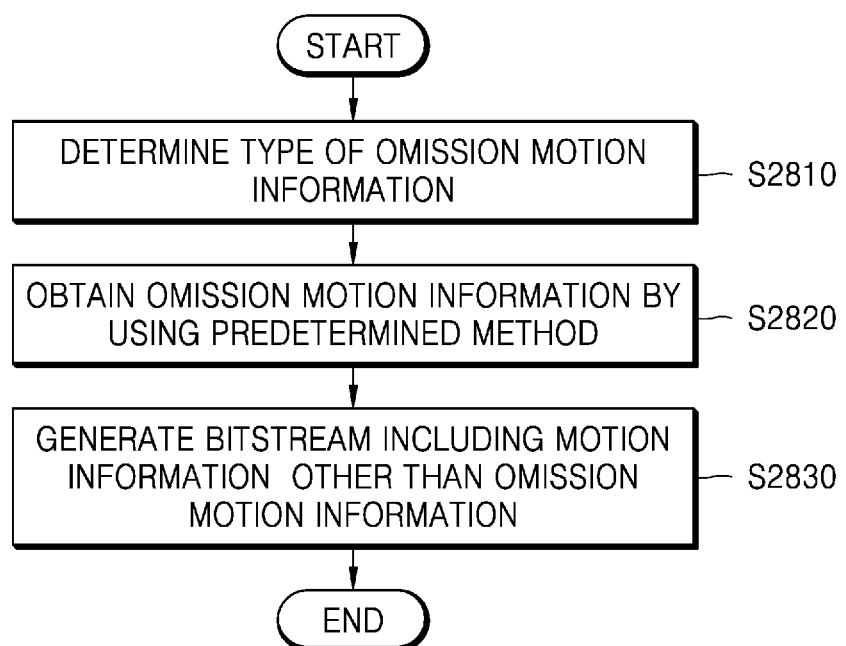
FIG. 28 is a flowchart for describing a motion information encoding method, according to an embodiment.

FIG. 28 is a flowchart for describing a motion information encoding method, according to an embodiment.

In operation S2810, the motion information encoding apparatus 2700 determines a type of omission motion information not to be included in a bitstream from among a plurality of pieces of motion information used to decode a current block.

In an embodiment, the motion information encoding apparatus 2700 may first determine whether a motion information omission process is to be applied to the current block.

In an embodiment, the motion information encoding apparatus 2700 may determine a motion information omission mode, and may determine a type of the omission motion information not to be included in the bitstream according to the determined motion information omission mode.

In an embodiment, the motion information encoding apparatus 2700 may first determine a type of the omission motion information not to be included in the bitstream, and may determine the motion information omission mode corresponding to the determined omission motion information.

In operation S2820, the motion information encoding apparatus 2700 obtains the omission motion information by using a predetermined method.

For example, the motion information encoding apparatus 2700 may obtain the omission motion information based on motion information of at least one candidate block.

For example, the motion information encoding apparatus 2700 may obtain the omission motion information based on preset base motion information.

Also, for example, the motion information encoding apparatus 2700 may obtain the omission motion information based on motion information obtained through DMVD.

A method of obtaining the omission motion information has been described above in detail, detailed descriptions thereof will not be provided here.

The motion information encoding apparatus 2700 may obtain motion information other than the omission motion information from among the plurality of pieces of motion information based on a cost.

In operation S2830, the motion information encoding apparatus 2700 generates a bitstream including motion information other than the omission motion information.

In an embodiment, the bitstream may further include at least one of information indicating whether the motion information omission process is applied and information indicating the motion information omission mode.

When an MVR is determined for the current block and a motion vector is determined according to the MVR, a method of adjusting a prediction motion vector and/or a motion vector difference will be described.

The motion information encoding apparatus 2700 and the motion information decoding apparatus 2500 may determine one candidate MVR from among one or more candidate MVRs selectable for the current block as an MVR of the current block. The motion information decoding apparatus 2500 may determine the MVR of the current block based on MVR information obtained from the bitstream. When the MVR of the current block is determined, the prediction motion vector and/or the motion vector difference may be adjusted according to the MVR of the current block.

FIG. 36 illustrates positions of pixels that may be indicated by motion vectors according to a ¼ pixel unit MVR, a ½ pixel unit MVR, a 1 pixel unit MVR, and a 2 pixel unit MVR when a selectable minimum MVR is the ¼ pixel unit MVR.

(a), (b), (c), and (d) of FIG. 36 respectively illustrate coordinates (marked by black squares) of pixels that may be indicated by motion vectors of the ¼ pixel unit MVR, the ½ pixel unit MVR, the 1 pixel unit MVR, and the 2 pixel unit MVR based on coordinates (0, 0).

When a minimum MVR is the ¼ pixel unit MVR, the coordinates of the pixel that may be indicated by the motion vector of the ¼ pixel unit MVR are (a/4, b/4) (a and b are integers), the coordinates of the pixel that may be indicated by the motion vector of the ½ pixel unit MVR are (2c/4, 2d/4) (c and d are integers), the coordinates of the pixel that may be indicated by the motion vector of the 1 pixel unit MVR are (4e/4, 4f/4) (e and f are integers), and the coordinates of the pixel that may be indicated by the motion vector of the 2 pixel unit MVR are (8g/4, 8h/4) (g and h are integers). That is, when a minimum MVR has a $2^m$ (m is an integer) pixel unit, coordinates of a pixel that may be indicated by a $2^n$ (n is an integer) pixel unit MVR are ($2^{n-m}*i/2^{-m}$, $2^{n-m}*j/2^{-m}$) (i and j are integers). Although a motion vector is determined according to a specific MVR, the motion vector is represented by coordinates in an image interpolated according to a ¼ pixel unit that is a minimum MVR.

In an embodiment, because the motion information encoding apparatus 2700 determines a motion vector in an image interpolated according to a minimum MVR, in order to represent the motion vector by using an integer, the motion vector of an integer unit may be represented by multiplying the motion vector by a reciprocal of a pixel unit value of the minimum MVR, for example, $2^{-m}$ when the minimum MVR has a $2^m$ (m is an integer) pixel unit. The motion vector of the integer unit multiplied by $2^{-m}$ may be used in the motion information encoding apparatus 2700 and the motion information decoding apparatus 2500.

When the motion vector of the ½ pixel unit MVR starting from the coordinates (0, 0) indicates coordinates (2/4, 6/4) and the minimum MVR has a ¼ pixel unit, the motion information encoding apparatus 2700 may determine (2, 6), which is obtained by multiplying the motion vector by an integer 4, as a motion vector.

When an MVR of the current block is greater than a minimum MVR from among selectable candidate MVRs, the motion information encoding apparatus 2700 and the motion information decoding apparatus 2500 may adjust a prediction motion vector of the current block. When the MVR of the current block is greater than the minimum MVR, it may mean that a pixel unit of the MVR of the current block is greater than a pixel unit of the minimum MVR. For example, an MVR of 1 pixel unit is greater than an MVR of ½ pixel unit, and the MVR of ½ pixel unit is greater than an MVR of ¼ pixel unit.

In order to adjust the prediction motion vector represented by coordinates in an image interpolated according to the minimum MVR by using the MVR of the current block, the motion information encoding apparatus 2700 and the motion information decoding apparatus 2500 may adjust the prediction motion vector to indicate neighboring pixels instead of a pixel indicated by the prediction motion vector.

Figure 37:
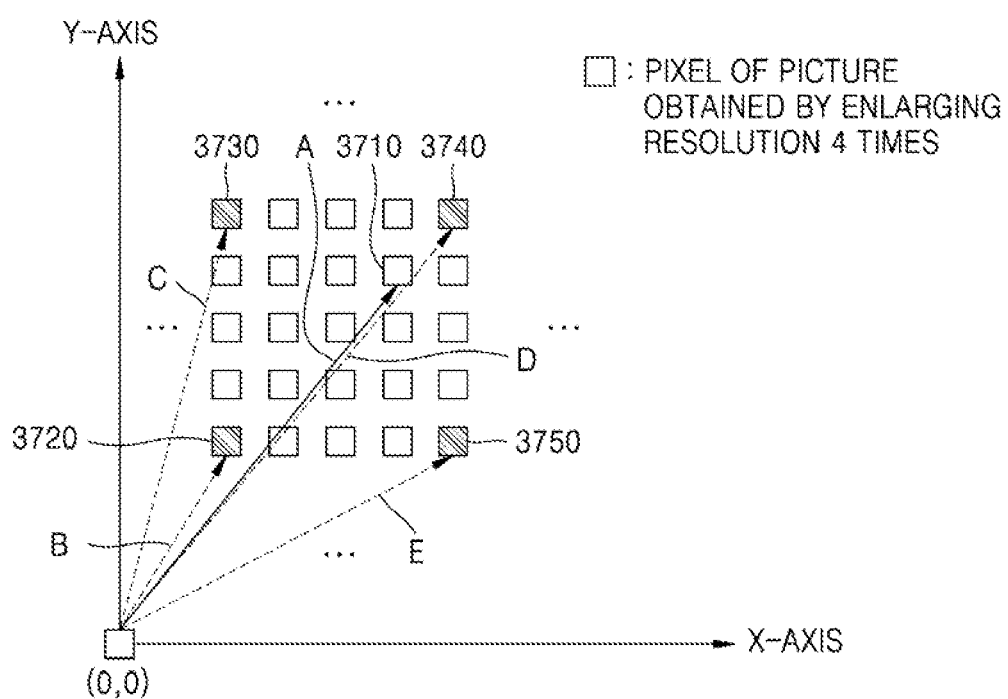
FIGS. 37 and 38 are diagrams for describing a method of adjusting a prediction motion vector or a motion vector difference.

For example, in order to adjust a prediction motion vector A indicating a pixel 3710 of coordinates (19, 27) based on coordinates (0, 0) in FIG. 37 to a 1 pixel unit MVR that is the MVR of the current block, the coordinates (19, 27) of the pixel 3710 indicated by the prediction motion vector A may be divided by an integer 4 (that is, may be downscaled), and coordinates (19/4, 27/4) obtained as a division result may not indicate an integer pixel unit.

The motion information encoding apparatus 2700 and the motion information decoding apparatus 2500 may adjust the downscaled prediction motion vector to indicate an integer pixel unit. For example, coordinates of neighboring integer pixels around the coordinates (19/4, 27/4) are (16/4, 28/4), (16/4, 24/4), (20/4, 28/4), and (20/4, 24/4). In this case, the motion information encoding apparatus 2700 and the motion information decoding apparatus 2500 may adjust the downscaled prediction motion vector A to indicate the coordinates (20/4, 28/4) located at the right-top instead of the coordinates (19/4, 27/4) and may multiply an integer 4 (i.e., upscale) so that a finally adjusted prediction motion vector D indicates a pixel 3740 corresponding to the coordinates (20, 28).

In an embodiment, the motion information encoding apparatus 2700 and the motion information decoding apparatus 2500 may adjust the downscaled prediction motion vector to indicate coordinates located at the left-bottom, coordinates located at the right-top, or coordinates at the right-bottom.

In an embodiment, when any one of an x-coordinate value and a y-coordinate value indicated by the downscaled prediction motion vector corresponds to an integer, the motion information encoding apparatus 2700 and the motion information decoding apparatus 2500 may increase or decrease only the coordinate value not corresponding to an integer to correspond to an integer. That is, when only the x-coordinate value indicated by the downscaled prediction motion vector corresponds to an integer, the motion information encoding apparatus 2700 and the motion information decoding apparatus 2500 may cause the adjusted prediction motion vector to indicate an integer pixel located at the top or the bottom of the pixel indicated by the prediction motion vector before adjustment. Alternatively, when only the y-coordinate value indicated by the downscaled prediction motion vector corresponds to an integer, the motion information encoding apparatus 2700 and the motion information decoding apparatus 2500 may cause the adjusted prediction motion vector to indicate an integer pixel located at the left or the right of the pixel indicated by the prediction motion vector before adjustment.

When the prediction motion vector is adjusted, the motion information encoding apparatus 2700 and the motion information decoding apparatus 2500 may differently select a point indicated by the adjusted prediction motion vector according to the MVR of the current block.

Figure 38:
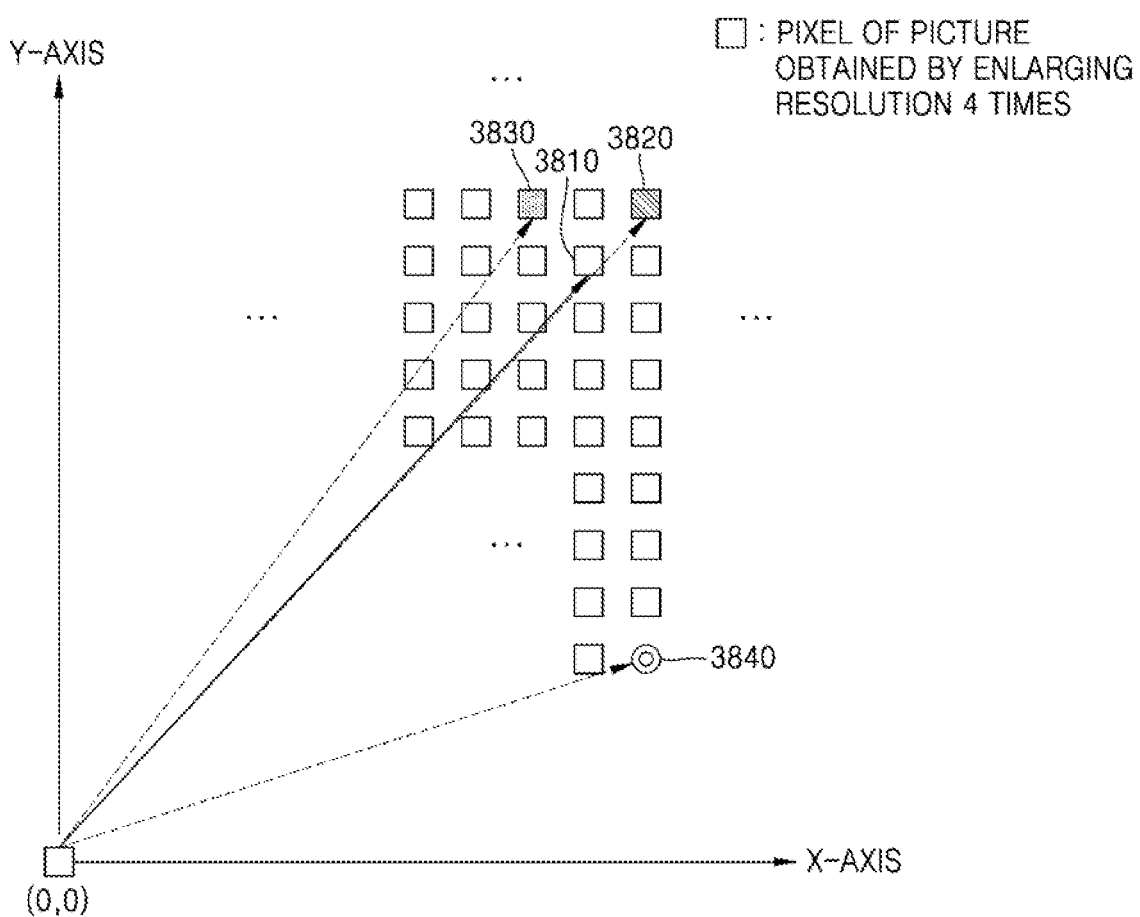

For example, as shown in FIG. 38, when the MVR of the current block is a ½ pixel unit MVR, the motion information encoding apparatus 2700 and the motion information decoding apparatus 2500 may cause the adjusted prediction motion vector to indicate a pixel 3830 at the left-top of a pixel indicated by the prediction motion vector before adjustment; when the MVR of the current block is a 1 pixel unit MVR, the motion information encoding apparatus 2700 and the motion information decoding apparatus 2500 may cause the adjusted prediction motion vector to indicate a pixel 3820 at the right-top of the pixel indicated by the prediction motion vector before adjustment; and when the MVR of the current block is a 2 pixel unit MVR, the motion information encoding apparatus 2700 and the motion information decoding apparatus 2500 may cause the adjusted prediction motion vector to indicate a pixel 3840 at the right-bottom of the pixel indicated by the prediction motion vector before adjustment.

A process of adjusting a prediction motion vector described with reference to FIGS. 37 and 38 may also be applied to a process of adjusting a motion vector difference. When the motion vector difference is determined as omission motion information and is derived according to a predetermined method by the motion information encoding apparatus 2700 and the motion information decoding apparatus 2500, because the derived motion vector difference indicates coordinates in an image that is interpolated according to a minimum MVR like the prediction motion vector, the precision of the motion vector difference corresponds to the precision of a motion vector of the current block.

When the prediction motion vector is adjusted in consideration of the MVR of the current block and the minimum MVR, the motion information encoding apparatus 2700 and the motion information decoding apparatus 2500 may adjust the prediction motion vector according to Equation 1.

$$MVP' = ((MVP \gg k) + \text{offset}) \ll k \qquad [\text{Equation 1}]$$

In Equation 1, MVP' denotes the adjusted prediction motion vector, and k that is a value determined according to a difference between the MVR of the current block and the minimum MVR may be m-n when the MVR of the current block is a $2^m$ pixel unit (m is an integer), the minimum MVR is a $2^n$ pixel unit (n is an integer), and m>n. In an embodiment, k may be an index of an MVR, and when candidate MVRs include a ¼ pixel unit MVR, a ½ pixel unit MVR, a 1 pixel unit MVR, a 2 pixel unit MVR, and a 4 pixel unit MVR, MVRs corresponding to indexes are as shown in Table 2. When an MVR index is received from a bitstream, the motion information decoding apparatus 2500 may adjust the prediction motion vector according to Equation 1 by using the MVR index as k.

Also, in Equation 1, $\gg$ or $\ll$ that is a bit shift operation refers to an operation of reducing or increasing a size of the prediction motion vector. Also, offset denotes a value added or subtracted to indicate an integer pixel when the prediction motion vector downscaled according to a k value does not indicate an integer pixel. offset may be differently determined according to each of an x-coordinate value and a y-coordinate value of the prediction motion vector.

When the motion vector difference is adjusted, Equation 1 may be modified to Equation 1-1.

$$MVD' = ((MVD \gg k) + \text{offset}) \ll k \qquad [\text{Equation 1-1}]$$

In Equation 1, MVD' denotes an adjusted motion vector difference, and MVD denotes the motion vector difference before adjustment obtained according to a predetermined method.

In an embodiment, when the downscaled prediction motion vector (or motion vector difference) is changed to indicate an integer pixel, the motion information encoding apparatus 2700 and the motion information decoding apparatus 2500 may change the downscaled prediction motion vector according to the same criterion.

In an embodiment, when an x-coordinate value and a y-coordinate value of the downscaled prediction motion vector (or motion vector difference) do not indicate an integer pixel, the motion information encoding apparatus 2700 and the motion information decoding apparatus 2500 may always increase or decrease the x-coordinate value and the y-coordinate value of the downscaled prediction motion vector (or motion vector difference) to indicate an integer pixel. Alternatively, the motion information encoding apparatus 2700 and the motion information decoding apparatus 2500 may round off the x-coordinate value and the y-coordinate value of the downscaled prediction motion vector (or motion vector difference) to indicate an integer pixel.

In an embodiment, when the prediction motion vector (or the motion vector difference) is adjusted, the motion information encoding apparatus 2700 and the motion information decoding apparatus 2500 may omit downscaling and upscaling of the prediction motion vector (or the motion vector difference), and may adjust the prediction motion vector (or the motion vector difference) in a coordinate plane in a reference image interpolated according to the minimum MVR to indicate a pixel unit corresponding to the MVR of the current block.

Also, in an embodiment, when the prediction motion vector and the motion vector difference are adjusted in consideration of the MVR of the current block and the minimum MVR, the motion information encoding apparatus 2700 and the motion information decoding apparatus 2500 may adjust the prediction motion vector and the motion vector difference according to Equation 2 and Equation 2-1, instead of Equation 1 and Equation 1-1.

$$MVP'=((MVP+\text{offset})>>k)<<k \quad \text{[Equation 2]}$$

$$MVD'=((MVD+\text{offset})>>k)<<k \quad \text{[Equation 2-1]}$$

Although Equation 2 and Equation 2-1 are similar to Equation 1 and Equation 1-1, unlike in Equation 1 and Equation 1-1 where offset is applied to the downscaled prediction motion vector and the downscaled motion vector difference, offset is applied to the original prediction motion vector and the original motion vector difference and then is downscaled according to k.

When the motion vector difference is included in the bitstream, the motion information encoding apparatus 2700 may downscale the motion vector difference as in Equation 3, and may cause information indicating the downscaled motion vector difference to be included in the bitstream.

$$MVD'=(MVD>>k) \quad \text{[Equation 3]}$$

In Equation 3, MVD' denotes the downscaled motion vector difference, and k that is a value determined according to a difference between the minimum MVR and the MVR of the current block is the same as k in Equation 1.

In an embodiment, the motion information encoding apparatus 2700 may downscale the motion vector of the current block and the adjusted prediction motion vector according to a k value and then may encode a difference between the downscaled motion vector and the downscaled adjusted prediction motion vector as the motion vector difference.

In an embodiment, the motion information encoding apparatus 2700 may calculate the downscaled motion vector difference according to Equation 4, instead of Equation 3.

$$MVD'=(MV-PMV')/(R*S) \quad \text{[Equation 4]}$$

In Equation 4, MVD' denotes the downscaled motion vector difference, MV denotes the motion vector of the current block, and PMV' denotes the adjusted prediction motion vector. Also, R denotes a pixel unit value of the MVR of the current block (e.g., ¼ when the MVR of the current block is a ¼ pixel unit MVR). Also, S denotes a reciprocal of a pixel unit value of the minimum MVR (e.g., 4 when the minimum MVR is a ¼ pixel unit MVR).

When the MVR of the current block is greater than the minimum MVR, the motion information decoding apparatus 2500 may upscale residual motion data obtained from the bitstream as in Equation 5.

$$MVD''=(MVD'<<k) \quad \text{[Equation 5]}$$

In Equation 5, MVD' denotes the motion vector difference downscaled by an encoding apparatus, and MVD" denotes an upscaled motion vector difference. k that is a value determined according to a difference between the minimum MVR and the MVR of the current block is the same as k in Equation 1.

In an embodiment, the motion information decoding apparatus 2500 may determine the upscaled motion vector difference according to Equation 6, instead of Equation 5.

$$MVD''=MVD'*(R*S) \quad \text{[Equation 6]}$$

In Equation 6, MVD' denotes the downscaled motion vector difference, and R denotes pixel unit value of the MVR of the current block (e.g., ¼ when the MVR of the current block is a ¼ pixel unit MVR). Also, S denotes a reciprocal of a pixel unit value of the minimum MVR (e.g., 4 when the minimum MVR is a ¼ pixel unit MVR).

The embodiments may be implemented as a computer-executable program, and the program may be stored in a medium.

The medium may continuously store the computer-executable program, or may temporally store the computer-executable program to execute or download the computer-executable program. Also, the medium may be any of various recording means or storage means including single hardware or a combination of a plurality of hardware, and may be distributed in a network without being limited to a medium directly connected to a computer system. The medium may be configured to store program instructions, and examples of the medium may include a magnetic medium such as a hard disk, a floppy disk, or a magnetic tape, an optical recording medium such as a compact disc read-only memory (CD-ROM) or a digital versatile disc (DVD), a magneto-optical medium such as a floptical disk, a ROM, a random-access memory (RAM), and a flash memory. Also, other examples of the medium may include a recording medium and a storage medium managed by an application store that distributes applications or a site or a server that supplies or distributes various other software.

While the present disclosure has been particularly shown and described with reference to embodiments thereof, it will be understood by one of ordinary skill in the art that various changes in form and details may be made therein without departing from the spirit and scope of the present disclosure as defined by the appended claims.

The invention claimed is:

1. A method of decoding motion information, the method comprising:
    when a current block is bi-predicted, obtaining, from a bitstream, information indicating whether motion information is omitted or not;
    if the information indicates that the motion information is not omitted, obtaining, from the bitstream, a motion vector difference for list 0 and a motion vector difference for list 1;
    if the information indicates that the motion information is omitted:
        obtaining, from the bitstream, the motion vector difference for list 0; and determining the motion vector difference for list 1, that is not included in the bitstream, using a predetermined method.

2. The method of claim 1, wherein the method further comprises adjusting a motion vector of a neighboring block according to a motion vector resolution of the current block.

3. The method of claim 1, the method further comprising:
   if the information indicates that the motion information is omitted,
      determining a first predetermined picture as a reference picture of the list 0; and
      determining a second predetermined picture as a reference picture of the list 1.

\* \* \* \* \*